US012763578B2

(12) United States Patent
Makitani et al.

(10) Patent No.: US 12,763,578 B2
(45) Date of Patent: Oct. 13, 2026

(54) UNBALANCED THREE-PHASE POWER SUPPLY DEVICE AND POWER SUPPLY FOR EVALUATION

(71) Applicant: SANSHA ELECTRIC MANUFACTURING CO., LTD., Osaka (JP)

(72) Inventors: Atsushi Makitani, Osaka (JP); Kazuo Suekane, Osaka (JP); Kazunori Doi, Osaka (JP)

(73) Assignee: SANSHA ELECTRIC MANUFACTURING CO., LTD., Osaka (JP)

( * ) Notice: Subject to any disclaimer, the term of this patent is extended or adjusted under 35 U.S.C. 154(b) by 111 days.

(21) Appl. No.: 19/028,313

(22) Filed: Jan. 17, 2025

(65) Prior Publication Data

US 2025/0253662 A1 Aug. 7, 2025

(30) Foreign Application Priority Data

Feb. 2, 2024 (JP) ................................ 2024-014521

(51) Int. Cl.
*H02J 3/26* (2026.01)
*H02J 3/16* (2026.01)
*H02M 7/49* (2007.01)

(52) U.S. Cl.
CPC .................. *H02J 3/26* (2013.01); *H02J 3/16* (2013.01); *H02M 7/49* (2013.01)

(58) Field of Classification Search
CPC ................. H02J 3/16; H02J 3/26; H02M 7/49
See application file for complete search history.

(56) References Cited

U.S. PATENT DOCUMENTS 6,058,032 A * 5/2000 Yamanaka .............. B60L 50/51 363/71
6,137,704 A * 10/2000 Ito ......................... H02M 5/458 363/132

(Continued)

FOREIGN PATENT DOCUMENTS

JP 2016063576 A 4/2016

*Primary Examiner* — Gary A Nash
(74) *Attorney, Agent, or Firm* — Alleman Hall LLP

(57) ABSTRACT

An unbalanced three-phase power supply device of the present disclosure includes: a control circuit including a voltage command generation unit and a pulse modulation signal generation circuit; and a main circuit including a DC power supply, a three-phase inverter device, and a three-phase transformation device, in which the control circuit and the main circuit output, from the three-phase transformation device, an external zero-phase-containing unbalanced three-phase voltage including an external U-phase voltage, an external V-phase voltage, and an external W-phase voltage having phases, frequencies, and amplitudes respectively corresponding to phase command values and amplitude command values of a U-phase, a V-phase, and a W-phase of a predetermined zero-phase-containing unbalanced three-phase voltage of unbalanced three-phase voltage information received by the voltage command generation unit. The DC power supply, the three-phase inverter device, and the three-phase transformation device have respective forms and a mutual connection relationship that can output a zero-phase component.

14 Claims, 17 Drawing Sheets

(56) References Cited

U.S. PATENT DOCUMENTS

| | | | | |
|---|---|---|---|---|
| 8,625,307 | B2 * | 1/2014 | Iwata | H02M 7/501<br>363/40 |
| 2013/0107588 | A1 * | 5/2013 | Katayama | H02M 7/49<br>363/37 |
| 2020/0185960 | A1 * | 6/2020 | Toyoda | H02M 7/487 |

* cited by examiner

UNBALANCED THREE-PHASE POWER SUPPLY DEVICE AND POWER SUPPLY FOR EVALUATION

CROSS-REFERENCE TO RELATED APPLICATION(S)

This application claims the benefit of foreign priority to Japanese Patent Application No. JP2024-014521, filed Feb. 2, 2024, which is incorporated by reference in its entirety.

FIELD OF THE INVENTION

The present invention relates to an unbalanced three-phase power supply device and a power supply for evaluation.

DESCRIPTION OF RELATED ART

In a distributed power supply system such as a solar power generation system, a power conditioner (PCS) which is a power conversion device is installed between a power generation device such as a solar power generation panel and a power system. The power conditioner includes an inverter that converts generated power into an alternating current (AC) power matching to a system frequency, and a control device for the inverter. Such a power conditioner is required to have, in addition to a power conversion operation, a single operation preventing function of causing individual distributed power supply systems to be paralleled off from the system when a power failure or the like occurs in the system, and a low voltage ride through (LVRT) function of preventing unnecessary paralleling off due to the above function at the time of momentary voltage drop (momentary low voltage) (see paragraph of JP 2016-063576 A).

SUMMARY OF THE INVENTION

Incidentally, a test for evaluating a momentary low voltage operation continuation function is defined for the distributed power supply system. In order to perform such a test, voltage or current generated at the time of a short circuit or a ground fault in the system needs to be supplied to the power conditioner that is a device to be tested. Conventionally, an unbalanced three-phase voltage or an unbalanced three-phase current containing such a zero-phase component has been supplied, for example, by artificially short-circuiting or grounding a distribution line. However, a test environment for creating a desired short circuit or ground fault state has been difficult to be constructed by using such a method.

The present invention has been made to solve the above problem, and an object thereof is to provide a power supply device that can easily construct a test environment using an unbalanced three-phase voltage or an unbalanced three-phase current containing a zero-phase component.

In order to achieve the above object, an unbalanced three-phase power supply device according to an aspect of the present disclosure comprises: a control circuit including: a voltage command generation unit that receives unbalanced three-phase voltage information including phase command values and amplitude command values of a U-phase, a V-phase, and a W-phase of a predetermined zero-phase-containing unbalanced three-phase voltage which is an unbalanced three-phase voltage containing a zero-phase component, and generates a U-phase voltage command, a V-phase voltage command, and a W-phase voltage command having phases, frequencies, and amplitudes respectively corresponding to the phase command values and the amplitude command values of the U-phase, the V-phase and the W-phase of the predetermined zero-phase-containing unbalanced three-phase voltage on the basis of the unbalanced three-phase voltage information; and a pulse modulation signal generation circuit that outputs a U-phase pulse modulation signal, a V-phase pulse modulation signal, and a W-phase pulse modulation signal corresponding to the U-phase voltage command, the V-phase voltage command, and the W-phase voltage command that are generated in the voltage command generation unit; and a main circuit including: a direct current (DC) power supply that outputs a predetermined DC voltage; a three-phase inverter device that includes a U-phase inverter unit, a V-phase inverter unit, and a W-phase inverter unit, and in which, in accordance with the U-phase pulse modulation signal, the V-phase pulse modulation signal, and the W-phase pulse modulation signal from the pulse modulation signal generation circuit and by using the predetermined DC voltage from the DC power supply, the U-phase inverter unit, the V-phase inverter unit, and the W-phase inverter unit generate a U-phase voltage, a V-phase voltage, and a W-phase voltage having phases, frequencies, and amplitudes respectively corresponding to the phase command values and the amplitude command values of the U-phase, the V-phase and the W-phase of the predetermined zero-phase-containing unbalanced three-phase voltage, and outputs an internal zero-phase-containing unbalanced three-phase voltage including the U-phase voltage, the V-phase voltage, and the W-phase voltage; and a three-phase transformation device that includes a U-phase winding part, a V-phase winding part, a W-phase winding part, and a secondary winding neutral point, and in which a secondary winding of the U-phase winding part, a secondary winding of the V-phase winding part, and a secondary winding of the W-phase winding part are connected in Y-connection and the secondary winding neutral point is a neutral point of the Y-connection, and the U-phase voltage, the V-phase voltage and the W-phase voltage of the predetermined internal zero-phase-containing unbalanced three-phase voltage from the three-phase inverter device arc input to a primary winding of the U-phase winding part, a primary winding of the V-phase winding part, and a primary winding of the W-phase winding part, respectively, wherein the DC power supply, the three-phase inverter device, and the three-phase transformation device of the main circuit have respective forms and a mutual connection relationship that enable output of a zero-phase component of an external zero-phase-containing unbalanced three-phase voltage obtained by converting the internal zero-phase-containing unbalanced three-phase voltage according to a winding number ratio in the three-phase transformation device, and the external zero-phase-containing unbalanced three-phase voltage is output by the secondary winding of the U-phase winding part, the secondary winding of the V-phase winding part, and the secondary winding of the W-phase winding part connected in Y-connection, and the secondary winding neutral point, of the three-phase transformation device.

Furthermore, a power supply for evaluation according to another aspect of the present disclosure comprises the above unbalanced three-phase power supply device, wherein the DC power supply is a converter that converts a three-phase voltage of a power system into a DC voltage, and a secondary side of the three-phase transformation device is an output terminal to which an evaluation target device is connected.

Furthermore, an unbalanced three-phase power supply device according to still another aspect of the present disclosure comprises: a control circuit including: a current command generation unit that receives unbalanced three-phase current information including phase command values and amplitude command values of a U-phase, a V-phase, and a W-phase of a predetermined zero-phase-containing unbalanced three-phase current which is an unbalanced three-phase current containing a zero-phase component, and generates a U-phase current command, a V-phase current command, and a W-phase current command having phases, frequencies, and active component and reactive component amplitudes respectively corresponding to the phase command values and the amplitude command values of the U-phase, the V-phase and the W-phase of the predetermined zero-phase-containing unbalanced three-phase current on the basis of the unbalanced three-phase current information; and a pulse modulation signal generation circuit that outputs a U-phase pulse modulation signal, a V-phase pulse modulation signal, and a W-phase pulse modulation signal corresponding to the U-phase current command, the V-phase current command, and the W-phase current command that are generated in the current command generation unit; and a main circuit including: a direct current (DC) power supply that outputs a predetermined DC voltage or DC current; a three-phase inverter device that includes a U-phase inverter unit, a V-phase inverter unit, and a W-phase inverter unit, and in which, in accordance with the U-phase pulse modulation signal, the V-phase pulse modulation signal, and the W-phase pulse modulation signal from the pulse modulation signal generation circuit and by using the predetermined DC voltage or DC current from the DC power supply, the U-phase inverter unit, the V-phase inverter unit, and the W-phase inverter unit generate a U-phase current, a V-phase current, and a W-phase current having phases, frequencies, and amplitudes respectively corresponding to the phase command values and the active component and reactive component amplitude command values of the U-phase, the V-phase and the W-phase of the predetermined zero-phase-containing unbalanced three-phase current, and thereby outputs an internal zero-phase-containing unbalanced three-phase current including the U-phase current, the V-phase current, and the W-phase current; and a three-phase transformation device that includes a U-phase winding part, a V-phase winding part, a W-phase winding part, and a secondary winding neutral point, and in which a secondary winding of the U-phase winding part, a secondary winding of the V-phase winding part, and a secondary winding of the W-phase winding part are connected in Y-connection and the secondary winding neutral point is a neutral point of the Y-connection, and the U-phase current, the V-phase current and the W-phase current of the predetermined internal zero-phase-containing unbalanced three-phase current from the three-phase inverter device are input to a primary winding of the U-phase winding part, a primary winding of the V-phase winding part, and a primary winding of the W-phase winding part, respectively, wherein the DC power supply, the three-phase inverter device, and the three-phase transformation device of the main circuit have respective forms and a mutual connection relationship that enable output of a zero-phase component of an external zero-phase-containing unbalanced three-phase current obtained by converting the internal zero-phase-containing unbalanced three-phase current according to a winding number ratio in the three-phase transformation device, and the external zero-phase-containing unbalanced three-phase current is output by the secondary winding of the U-phase winding part, the secondary winding of the V-phase winding part, and the secondary winding of the W-phase winding part connected in Y-connection, and the secondary winding neutral point, of the three-phase transformation device.

Furthermore, a power supply for evaluation according to another aspect of the present disclosure comprises the above unbalanced three-phase power supply device, wherein the DC power supply is a converter that converts a three-phase voltage or three-phase current of a power system into a DC voltage or DC current, and a secondary side of the three-phase transformation device is an output terminal to which an evaluation target device is connected.

The present disclosure has an effect of easily constructing a test environment using an unbalanced three-phase voltage or an unbalanced three-phase current containing a zero-phase component.

DETAILED DESCRIPTION OF EMBODIMENTS

Figure 1:
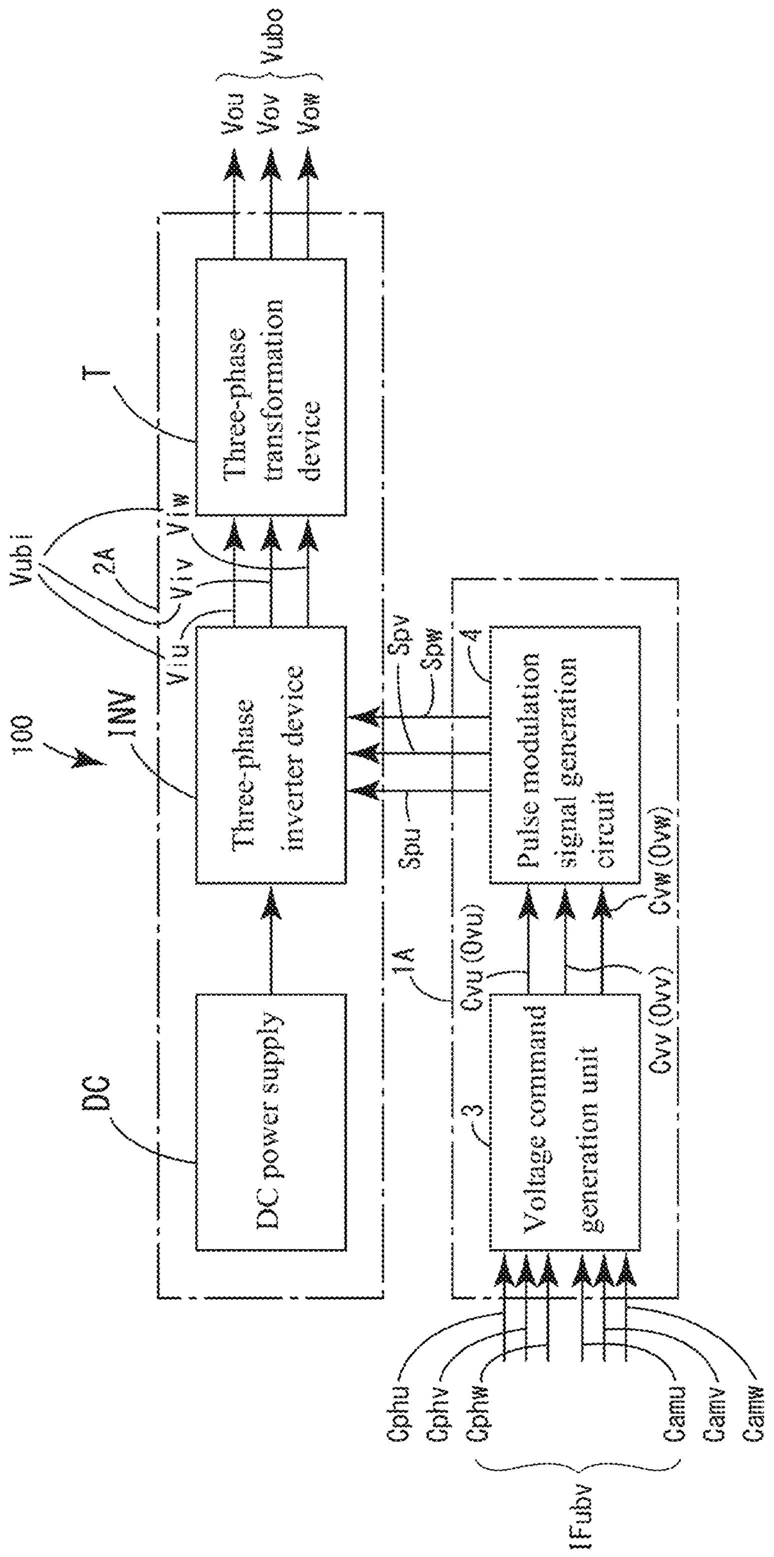
FIG. 1 is a functional block diagram illustrating an example of a configuration of an unbalanced three-phase power supply device according to a first embodiment of the present disclosure.

An unbalanced three-phase power supply device according to an aspect of the present disclosure includes: a control circuit including: a voltage command generation unit that receives unbalanced three-phase voltage information including phase command values and amplitude command values of a U-phase, a V-phase, and a W-phase of a predetermined zero-phase-containing unbalanced three-phase voltage which is an unbalanced three-phase voltage containing a zero-phase component, and generates a U-phase voltage command, a V-phase voltage command, and a W-phase voltage command having phases, frequencies, and amplitudes respectively corresponding to the phase command values and the amplitude command values of the U-phase, the V-phase and the W-phase of the predetermined zero-phase-containing unbalanced three-phase voltage on the basis of the unbalanced three-phase voltage information; and a pulse modulation signal generation circuit that outputs a U-phase pulse modulation signal, a V-phase pulse modulation signal, and a W-phase pulse modulation signal corresponding to the U-phase voltage command, the V-phase voltage command, and the W-phase voltage command that are generated in the voltage command generation unit; and a main circuit including: a direct current (DC) power supply that outputs a predetermined DC voltage; a three-phase inverter device that includes a U-phase inverter unit, a V-phase inverter unit, and a W-phase inverter unit, and in which, in accordance with the U-phase pulse modulation signal, the V-phase pulse modulation signal, and the W-phase pulse modulation signal from the pulse modulation signal generation circuit and by using the predetermined DC voltage from the DC power supply, the U-phase inverter unit, the V-phase inverter unit, and the W-phase inverter unit generate a U-phase voltage, a V-phase voltage, and a W-phase voltage having phases, frequencies, and amplitudes respectively corresponding to the phase command values and the amplitude command values of the U-phase, the V-phase and the W-phase of the predetermined zero-phase-containing unbalanced three-phase voltage, and thereby outputs an internal zero-phase-containing unbalanced three-phase voltage including the U-phase voltage, the V-phase voltage, and the W-phase voltage; and a three-phase transformation device that includes a U-phase winding part, a V-phase winding part, a W-phase winding part, and a secondary winding neutral point, and in which a secondary winding of the U-phase winding part, a secondary winding of the V-phase winding part, and a secondary winding of the W-phase winding part are connected in Y-connection and the secondary winding neutral point is a neutral point of the Y-connection, and the U-phase voltage, the V-phase voltage and the W-phase voltage of the predetermined internal zero-phase-containing unbalanced three-phase voltage from the three-phase inverter device are input to a primary winding of the U-phase winding part, a primary winding of the V-phase winding part, and a primary winding of the W-phase winding part, respectively, in which the DC power supply, the three-phase inverter device, and the three-phase transformation device of the main circuit have respective forms and a mutual connection relationship that enable output of a zero-phase component of an external zero-phase-containing unbalanced three-phase voltage obtained by converting the internal zero-phase-containing unbalanced three-phase voltage according to a winding number ratio in the three-phase transformation device, and the external zero-phase-containing unbalanced three-phase voltage is output by the secondary winding of the U-phase winding part, the secondary winding of the V-phase winding part, and the secondary winding of the W-phase winding part connected in Y-connection, and the secondary winding neutral point, of the three-phase transformation device. Here, the "winding number ratio" means a ratio of the number of windings on the primary side to the number of windings on the secondary side in the three-phase transformation device. The "pulse modulation signal" is a modulation signal modulated by using a pulse, that is, a rectangular wave, and includes at least a pulse width modulation signal (PWM signal), a pulse amplitude modulation signal (PAM signal), a pulse frequency modulation signal (PFM signal), a pulse position modulation signal (PPM signal), and a pulse density modulation signal (PDM signal).

According to this configuration, the voltage command generation unit generates the U-phase voltage command, the V-phase voltage command, and the W-phase voltage command having phases, frequencies, and amplitudes respectively corresponding to the phase command values and the amplitude command values of the U-phase, the V-phase, and the W-phase of the predetermined zero-phase-containing unbalanced three-phase voltage received by the voltage command generation unit.

Then, the pulse modulation signal generation circuit outputs the U-phase pulse modulation signal, the V-phase pulse modulation signal, and the W-phase pulse modulation signal corresponding to the U-phase voltage command, the V-phase voltage command, and the W-phase voltage command, respectively, which are generated by the voltage command generation unit.

Then, in accordance with the U-phase pulse modulation signal, the V-phase pulse modulation signal, and the W-phase pulse modulation signal from the pulse modulation signal generation circuit, the U-phase inverter unit, the V-phase inverter unit, and the W-phase inverter unit of the three-phase inverter device generate the U-phase voltage, the V-phase voltage, and the W-phase voltage having phases, frequencies, and amplitudes respectively corresponding to the phase command values and the amplitude command values of the U-phase, the V-phase, and the W-phase of the predetermined zero-phase-containing unbalanced three-phase voltage by using the predetermined DC voltage from the DC power supply, to output the internal zero-phase-containing unbalanced three-phase voltage including the U-phase voltage, the V-phase voltage, and the W-phase voltage.

Then, in the three-phase transformation device, the U-phase voltage, the V-phase voltage, and the W-phase voltage of the internal zero-phase-containing unbalanced three-phase voltage from the three-phase inverter device are input to the primary winding of the U-phase winding part, the primary winding of the V-phase winding part, and the primary winding of the W-phase winding part, respectively. Here, because the DC power supply, the three-phase inverter device, and the three-phase transformation device of the main circuit have the forms and the mutual connection relationship in which the zero-phase component of the external zero-phase-containing unbalanced three-phase voltage obtained by converting the internal zero-phase-containing unbalanced three-phase voltage according to the winding number ratio in the three-phase transformation device can be output, the external zero-phase-containing unbalanced three-phase voltage is output by the secondary winding of the U-phase winding part, the secondary winding of the V-phase winding part, the secondary winding of the W-phase winding part, which are connected in Y-connection, and the secondary winding neutral point, of the three-phase transformation device.

In other words, according to the above configuration, the phase command values and the amplitude command values of the U-phase, the V-phase, and the W-phase of the received predetermined zero-phase-containing unbalanced three-phase voltage are processed independently of each other for each of the U-phase, the V-phase, and the W-phase in the unbalanced three-phase power supply device. Therefore, the external zero-phase-containing unbalanced three-phase voltage corresponding to the predetermined zero-phase-containing unbalanced three-phase voltage can be generated. Furthermore, the DC power supply, the three-phase inverter device, and the three-phase transformation device have respective forms and the mutual connection relationship that enable output of the zero-phase component of the generated external zero-phase-containing unbalanced three-phase voltage. Therefore, the zero-phase component of the external zero-phase-containing unbalanced three-phase voltage can be output. Therefore, the unbalanced three-phase power supply device that can output the unbalanced three-phase voltage containing the desired zero-phase component can be provided by setting a desired zero-phase-containing three-phase unbalanced voltage to the predetermined zero-phase-containing unbalanced three-phase voltage. Because the unbalanced three-phase power supply device generates the unbalanced three-phase voltage containing the zero-phase component by the three-phase inverter device, the environment of the test using the unbalanced three-phase voltage containing the zero-phase component can be easily constructed by using the unbalanced three-phase power supply device.

The main circuit may include a voltage sensor unit that detects voltages of the U-phase, the V-phase, and the W-phase of the internal zero-phase-containing unbalanced three-phase voltage or the external zero-phase-containing unbalanced three-phase voltage, the control circuit may further include a voltage feedback control unit, the voltage command generation unit may include: a phase command value generation unit that adds the phase command values of the U-phase, the V-phase and the W-phase of the predetermined zero-phase-containing unbalanced three-phase voltage to respective phases of the U-phase, the V-phase and the W-phase of a reference internal three-phase sine wave, respectively, and outputs a U-phase phase command value, a V-phase phase command value, and a W-phase phase command value obtained by the addition; a three-phase sine wave generation unit that collates the U-phase phase command value, the V-phase phase command value, and the W-phase phase command value generated by the phase command value generation unit and respective input timings of the U-phase phase command value, the V-phase phase command value, and the W-phase phase command value with a sin table, and thereby generates a U-phase sine wave, a V-phase sine wave, and a W-phase sine wave having phases, frequencies, and reference amplitudes corresponding to the U-phase phase command value, the V-phase phase command value, and the W-phase phase command value, respectively; and a voltage command amplitude determination unit that determines an amplitude of the U-phase sine wave, an amplitude of the V-phase sine wave, and an amplitude of the W-phase sine wave by multiplying an amplitude value of the U-phase sine wave, an amplitude value of the V-phase sine wave, and an amplitude value of the W-phase sine wave by the amplitude command values of the U-phase, the V-phase, and the W-phase of the predetermined zero-phase-containing unbalanced three-phase voltage, respectively, to generate the U-phase voltage command, the V-phase voltage command, and the W-phase voltage command, the voltage feedback control unit may include: a voltage error generation unit that generates a U-phase voltage error, a V-phase voltage error, and a W-phase voltage error that are errors of voltages of the U-phase, the V-phase, and the W-phase of the internal zero-phase-containing unbalanced three-phase voltage or the external zero-phase-containing unbalanced three-phase voltage detected by the voltage sensor unit, the error being generated with respect to the U-phase voltage command, the V-phase voltage command, and the W-phase voltage command generated by the voltage command amplitude determination unit; and a voltage compensation unit that generates a U-phase voltage manipulated variable, a V-phase voltage manipulated variable, and a W-phase voltage manipulated variable by respectively applying compensation to the U-phase voltage error, the V-phase voltage error, and the W-phase voltage error generated by the voltage error generation unit, and the pulse modulation signal generation circuit may be constituted as a circuit that generates the U-phase pulse modulation signal, the V-phase pulse modulation signal, and the W-phase pulse modulation signal respectively corresponding to the U-phase voltage manipulated variable, the V-phase voltage manipulated variable, and the W-phase voltage manipulated variable generated by the voltage compensation unit.

According to this configuration, a configuration for generating the voltage command and the pulse modulation signal can be suitably constructed. In addition, by the voltages of the U-phase, the V-phase, and the W-phase of the internal zero-phase-containing unbalanced three-phase voltage being feedback-controlled, a suitable external zero-phase-containing unbalanced three-phase voltage is obtained.

The DC power supply may include a U-phase DC power supply unit, a V-phase DC power supply unit, and a W-phase DC power supply unit that respectively output the predetermined DC voltage, the three-phase inverter device may be constituted as a three-phase inverter unit including: a U-phase inverter of single-phase that constitutes the U-phase inverter unit, and in accordance with the U-phase pulse modulation signal from the pulse modulation signal generation circuit and by using the predetermined DC voltage from the U-phase DC power supply unit, generates an internal U-phase voltage having a phase, a frequency and an amplitude corresponding to the phase command value and the amplitude command value of the U-phase of the predetermined zero-phase-containing unbalanced three-phase voltage; a V-phase inverter of single-phase that constitutes the V-phase inverter unit, and in accordance with the V-phase pulse modulation signal from the pulse modulation signal generation circuit and by using the predetermined DC voltage from the V-phase DC power supply unit, generates an internal V-phase voltage having a phase, a frequency and an amplitude corresponding to the phase command value and the amplitude command value of the V-phase of the predetermined zero-phase-containing unbalanced three-phase voltage; and a W-phase inverter of single-phase that constitutes the W-phase inverter unit, and in accordance with the W-phase pulse modulation signal from the pulse modulation signal generation circuit and by using the predetermined DC voltage from the W-phase DC power supply unit, generates an internal W-phase voltage having a phase, a frequency and an amplitude corresponding to the phase command value and the amplitude command value of the W-phase of the predetermined zero-phase-containing unbalanced three-phase voltage, and in which the U-phase inverter, the V-phase inverter, and the W-phase inverter output the internal zero-phase-containing unbalanced three-phase voltage including the internal U-phase voltage, the internal V-phase voltage, and the internal W-phase voltage as the U-phase voltage, the V-phase voltage, and the W-phase voltage, respectively, the three-phase transformation device may be constituted as a three-phase transformer unit including a U-phase transformer of single-phase constituting the U-phase winding part, a V-phase transformer of single-phase constituting the V-phase winding part, and a W-phase transformer of single-phase constituting the W-phase winding part, and in which a secondary winding of the U-phase transformer, a secondary winding of the V-phase transformer, and a secondary winding of the W-phase transformer are connected in Y-connection and a neutral point of the Y-connection is the secondary winding neutral point, the internal U-phase voltage, the internal V-phase voltage, and the internal W-phase voltage from the three-phase inverter unit may be input to a primary winding of the U-phase transformer, a primary winding of the V-phase transformer, and a primary winding of the W-phase transformer, respectively, and the internal zero-phase-containing unbalanced three-phase voltage may be converted to an external zero-phase-containing unbalanced three-phase voltage according to a winding number ratio, the external zero-phase-containing unbalanced three-phase voltage being output by the secondary winding of the U-phase transformer, the secondary winding of the V-phase transformer, and the secondary winding of the W-phase transformer, which are connected in Y-connection, and the secondary winding neutral point of the secondary windings, of the three-phase transformer unit.

According to this configuration, the internal zero-phase-containing unbalanced three-phase voltage is generated in the main circuit, and the DC power supply corresponding to the three phases, the three inverter units of the three-phase inverter device, and the three winding parts of the three-phase transformation device are constituted of the three DC power supply units of the DC power supply, the three single-phase inverters of the three-phase inverter unit, and the three single-phase transformers of the three-phase transformer unit, which are respectively independent of each other. Therefore, the current of the zero-phase component of the internal zero-phase-containing unbalanced three-phase voltage flows through the DC power supply units, the single-phase inverters, the primary windings of the single-phase transformers, correspondingly to the respective phases according to the phase voltages of the three phases which are unbalanced with each other. Then, because the secondary windings of the single-phase transformers corresponding to the three phases are connected in Y-connection, the external zero-phase-containing unbalanced three-phase voltage obtained by converting the internal zero-phase-containing unbalanced three-phase voltage according to the winding number ratio is output by the secondary windings, which correspond to the three phases and are connected in Y-connection, and the secondary winding neutral point, of the single-phase transformer. As a result, a combination of the DC power supply, the three-phase inverter device, and the three-phase transformation device can be suitably constructed, the combination enabling output of the zero-phase component of the external zero-phase-containing unbalanced three-phase voltage.

The DC power supply may include a U-phase DC power supply unit, a V-phase DC power supply unit, and a W-phase DC power supply unit that respectively output the predetermined DC voltage, the three-phase inverter device may be constituted as a three-phase inverter unit including: a U-phase inverter of single-phase that constitutes the U-phase inverter unit, and in accordance with the U-phase pulse modulation signal from the pulse modulation signal generation circuit and by using the predetermined DC voltage from the U-phase DC power supply unit, generates an internal U-phase voltage having a phase, a frequency and an amplitude corresponding to the phase command value and the amplitude command value of the U-phase of the predetermined zero-phase-containing unbalanced three-phase voltage; a V-phase inverter of single-phase that constitutes the V-phase inverter unit, and in accordance with the V-phase pulse modulation signal from the pulse modulation signal generation circuit and by using the predetermined DC voltage from the V-phase DC power supply unit, generates an internal V-phase voltage having a phase, a frequency and an amplitude corresponding to the phase command value and the amplitude command value of the V-phase of the predetermined zero-phase-containing unbalanced three-phase voltage; and a W-phase inverter of single-phase that constitutes the W-phase inverter unit, and in accordance with the W-phase pulse modulation signal from the pulse modulation signal generation circuit and by using the predetermined DC voltage from the W-phase DC power supply unit, generates an internal W-phase voltage having a phase, a frequency and an amplitude corresponding to the phase command value and the amplitude command value of the W-phase of the predetermined zero-phase-containing unbalanced three-phase voltage, and in which the U-phase inverter, the V-phase inverter, and the W-phase inverter output the internal zero-phase-containing unbalanced three-phase voltage including the internal U-phase voltage, the internal V-phase voltage, and the internal W-phase voltage as the U-phase voltage, the V-phase voltage, and the W-phase voltage, respectively, the three-phase transformation device may be constituted as a three-phase five-legged iron core transformer including a three-phase five-legged iron core having a U-phase leg, a V-phase leg, a W-phase leg, and a pair of magnetic leakage legs, the U-phase winding part provided on the U-phase leg, the V-phase winding part provided on the V-phase leg, and the W-phase winding part provided on the W-phase leg, and in which a secondary winding of the U-phase winding part, a secondary winding of the V-phase winding part, and a secondary winding of the W-phase winding part are connected in Y-connection and a neutral point of the Y-connection is the secondary winding neutral point, the internal U-phase voltage, the internal V-phase voltage, and the internal W-phase voltage from the three-phase inverter unit may be input to a primary winding of the U-phase winding part, a primary winding of the V-phase winding part, and a primary winding of the W-phase winding part of the three-phase five-legged iron core transformer, respectively, and the internal zero-phase-containing unbalanced three-phase voltage may be converted to an external zero-phase-containing unbalanced three-phase voltage according to a winding number ratio, the external zero-phase-containing unbalanced three-phase voltage being output by the secondary winding of the U-phase winding part, the secondary winding of the V-phase winding part, and the secondary winding of the W-phase winding part, which are connected in Y-connection, and the secondary winding neutral point of the secondary windings, of the three-phase five-legged iron core transformer.

According to this configuration, the internal zero-phase-containing unbalanced three-phase voltage is generated in the main circuit, and the DC power supply, the inverter unit, and the winding parts corresponding to the three phases are constituted of the DC power supply units, the single-phase inverters, and the phase winding parts of the three-phase five-legged iron core transformer, which are respectively independent of each other. Therefore, the current of the zero-phase component of the internal zero-phase-containing unbalanced three-phase voltage flows through the DC power supply units, the single-phase inverters, the primary windings of the phase winding parts of the three-phase five-legged iron core transformers corresponding to respective phases, according to the phase voltages of respective phases which are unbalanced with each other. In addition, the magnetic flux corresponding to the current of the zero-phase component flows through the magnetic leakage leg of the three-phase five-legged iron core. Then, because the secondary windings of the three winding parts of the three-phase five-legged iron core transformer are connected in Y-connection, the external zero-phase-containing unbalanced three-phase voltage obtained by converting the internal zero-phase-containing unbalanced three-phase voltage according to the winding number ratio is output by the secondary windings of the three winding parts, which are connected in Y-connection, and the secondary winding neutral point, of the three-phase five-legged iron core transformer. As a result, a combination of the DC power supply, the three-phase inverter device, and the three-phase transformation device can be suitably constructed, the combination enabling output of the zero-phase component of the external zero-phase-containing unbalanced three-phase voltage.

The DC power supply may include a positive DC power supply unit and a negative DC power supply unit that are connected to each other in series at a power supply neutral point and each output a predetermined DC voltage, the three-phase inverter device may be constituted as a three-phase four-wired inverter including: the U-phase inverter unit that generates, in accordance with the U-phase pulse modulation signal from the pulse modulation signal generation circuit and by using the predetermined DC voltage from the positive DC power supply unit and the negative DC power supply unit, an internal U-phase voltage having a phase, a frequency and an amplitude corresponding to the phase command value and the amplitude command value of the U-phase of the predetermined zero-phase-containing unbalanced three-phase voltage; the V-phase inverter unit that generates, in accordance with the V-phase pulse modulation signal from the pulse modulation signal generation circuit and by using the predetermined DC voltage from the positive DC power supply unit and the negative DC power supply unit, an internal V-phase voltage having a phase, a frequency and an amplitude corresponding to the phase command value and the amplitude command value of the V-phase of the predetermined zero-phase-containing unbalanced three-phase voltage; and the W-phase inverter unit that generates, in accordance with the W-phase pulse modulation signal from the pulse modulation signal generation circuit and by using the predetermined DC voltage from the positive DC power supply unit and the negative DC power supply unit, an internal W-phase voltage having a phase, a frequency and an amplitude corresponding to the phase command value and the amplitude command value of the W-phase of the predetermined zero-phase-containing unbalanced three-phase voltage, and in which the U-phase inverter unit, the V-phase inverter unit, and the W-phase inverter unit are connected between a positive electrode of the positive DC power supply unit and a negative electrode of the negative DC power supply unit, and output the internal zero-phase-containing unbalanced three-phase voltage including the internal U-phase voltage, the internal V-phase voltage, and the internal W-phase voltage as the U-phase voltage, the V-phase voltage, and the W-phase voltage, respectively, the three-phase transformation device may be constituted as a three-phase transformer unit including a U-phase transformer of single-phase constituting the U-phase winding part, a V-phase transformer of single-phase constituting the V-phase winding part, and a W-phase transformer of single-phase constituting the W-phase winding part, and in which one end of a primary winding of the U-phase transformer, one end of a primary winding of the V-phase transformer, and one end of a primary winding of the W-phase transformer are connected in Y connection at a primary winding neutral point, and a secondary winding of the U-phase transformer, a secondary winding of the V-phase transformer, and a secondary winding of the W-phase transformer are connected in Y-connection at the secondary winding neutral point, and the primary winding neutral point is connected to the power supply neutral point of the DC power supply, the internal U-phase voltage, the internal V-phase voltage, and the internal W-phase voltage from the three-phase four-wired inverter may be input to another end of the primary winding of the U-phase transformer, another end of the primary winding of the V-phase transformer, and another end of the primary winding of the W-phase transformer, respectively, and the internal zero-phase-containing unbalanced three-phase voltage may be converted to an external zero-phase-containing unbalanced three-phase voltage according to a winding number ratio, the external zero-phase-containing unbalanced three-phase voltage being output by the secondary winding of the U-phase transformer, the secondary winding of the V-phase transformer, and the secondary winding of the W-phase transformer, which are connected in Y-connection, and the secondary winding neutral point of the secondary windings, of the three-phase transformer unit.

According to this configuration, the three inverter units of the three-phase four-wired inverter are connected in Y-connection at the power supply neutral point via the common positive DC power supply unit and negative DC power supply unit, and the three inverter units, which are connected in Y-connection, and the positive DC power supply unit and the negative DC power supply unit are connected in Y-Y connection to the primary windings of the three single-phase transformers, which are connected in Y-connection, of the three-phase transformer unit. With this configuration, the internal zero-phase-containing unbalanced three-phase voltage output from the three inverter units of the three-phase four-wired inverter is applied to the primary windings of the three single-phase transformers of the three-phase transformer unit, and the current of the zero-phase component of the internal zero-phase-containing unbalanced three-phase voltage flows through the current path between the primary winding neutral point and the power supply neutral point. In addition, because the secondary windings of the single-phase transformers corresponding to the three phases are connected in Y-connection, the external zero-phase-containing unbalanced three-phase voltage obtained by converting the internal zero-phase-containing unbalanced three-phase voltage according to the winding number ratio is output by the secondary windings, which correspond to the three phases and are connected in Y-connection, and the secondary winding neutral point, of the single-phase transformer. As a result, a combination of the DC power supply, the three-phase inverter device, and the three-phase transformation device can be suitably constructed, the combination enabling output of the zero-phase component of the external zero-phase-containing unbalanced three-phase voltage.

The DC power supply may include a positive DC power supply unit and a negative DC power supply unit that are connected to each other in series at a power supply neutral point and each output a predetermined DC voltage, the three-phase inverter device may be constituted as a three-phase four-wired inverter including: the U-phase inverter unit that generates, in accordance with the U-phase pulse modulation signal from the pulse modulation signal generation circuit and by using the predetermined DC voltage from the positive DC power supply unit and the negative DC power supply unit, an internal U-phase voltage having a phase, a frequency and an amplitude corresponding to the phase command value and the amplitude command value of the U-phase of the predetermined zero-phase-containing unbalanced three-phase voltage; the V-phase inverter unit that generates, in accordance with the V-phase pulse modulation signal from the pulse modulation signal generation circuit and by using the predetermined DC voltage from the positive DC power supply unit and the negative DC power supply unit, an internal V-phase voltage having a phase, a frequency and an amplitude corresponding to the phase command value and the amplitude command value of the V-phase of the predetermined zero-phase-containing unbalanced three-phase voltage; and the W-phase inverter unit that generates, in accordance with the W-phase pulse modulation signal from the pulse modulation signal generation circuit and by using the predetermined DC voltage from the positive DC power supply unit and the negative DC power supply unit, an internal W-phase voltage having a phase, a frequency and an amplitude corresponding to the phase command value and the amplitude command value of the W-phase of the predetermined zero-phase-containing unbalanced three-phase voltage, and in which the U-phase inverter unit, the V-phase inverter unit, and the W-phase inverter unit are connected between a positive electrode of the positive DC power supply unit and a negative electrode of the negative DC power supply unit, and output the internal zero-phase-containing unbalanced three-phase voltage including the internal U-phase voltage, the internal V-phase voltage, and the internal W-phase voltage as the U-phase voltage, the V-phase voltage, and the W-phase voltage, respectively, the three-phase transformation device may be constituted as a three-phase five-legged iron core transformer including a three-phase five-legged iron core having a U-phase leg, a V-phase leg, a W-phase leg, and a pair of magnetic leakage legs, the U-phase winding part provided on the U-phase leg, the V-phase winding part provided on the V-phase leg, and the W-phase winding part provided on the W-phase leg, and in which one end of a primary winding of the U-phase winding part, one end of a primary winding of the V-phase winding part, and one end of a primary winding of the W-phase winding part are connected in Y connection at a primary winding neutral point, a secondary winding of the U-phase winding part, a secondary winding of the V-phase winding part, and a secondary winding of the W-phase winding part are connected in Y-connection at the secondary winding neutral point, and the primary winding neutral point is connected to the power supply neutral point of the DC power supply, the internal U-phase voltage, the internal V-phase voltage, and the internal W-phase voltage from the three-phase four-wired inverter may be input to another end of the primary winding of the U-phase winding part, another end of the primary winding of the V-phase winding part, and another end of the primary winding of the W-phase winding part of the three-phase five-legged iron core transformer, respectively, and the internal zero-phase-containing unbalanced three-phase voltage may be converted to an external zero-phase-containing unbalanced three-phase voltage according to a winding number ratio, the external zero-phase-containing unbalanced three-phase voltage being output by the secondary winding of the U-phase winding part, the secondary winding of the V-phase winding part, and the secondary winding of the W-phase winding part, which are connected in Y-connection, and the secondary winding neutral point of the secondary windings, of the three-phase five-legged iron core transformer.

According to this configuration, the three inverter units of the three-phase four-wired inverter are connected in Y-connection at the power supply neutral point via the common positive DC power supply unit and negative DC power supply unit, and the three inverter units, which are connected in Y-connection, and the positive DC power supply unit and the negative DC power supply unit are connected in Y-Y connection to the primary windings of the three winding parts, which are connected in Y-connection, of the three-phase five-legged iron core transformer. With this configuration, the internal zero-phase-containing unbalanced three-phase voltage output from the three inverter units of the three-phase four-wired inverter is applied to the primary windings of the three winding parts of the three-phase five-legged iron core transformer, and the current of the zero-phase component of the internal zero-phase-containing unbalanced three-phase voltage flows through the current path between the primary winding neutral point and the power supply neutral point. In addition, the magnetic flux corresponding to the current of the zero-phase component flows through the magnetic leakage leg of the three-phase five-legged iron core. Then, because the secondary windings of the three winding parts of the three-phase five-legged iron core transformer are connected in Y-connection, the external zero-phase-containing unbalanced three-phase voltage obtained by converting the internal zero-phase-containing unbalanced three-phase voltage according to the winding number ratio is output by the secondary windings of the three winding parts, which are connected in Y-connection, and the secondary winding neutral point, of the three-phase five-legged iron core transformer. As a result, a combination of the DC power supply, the three-phase inverter device, and the three-phase transformation device can be suitably constructed, the combination enabling output of the zero-phase component of the external zero-phase-containing unbalanced three-phase voltage.

Furthermore, a power supply for evaluation according to another aspect of the present disclosure includes the unbalanced three-phase power supply device described in any of the above, in which the DC power supply is a converter that converts a three-phase voltage of a power system into a DC voltage, and a secondary side of the three-phase transformation device is an output terminal to which an evaluation target device is connected.

According to this configuration, under a test environment that can be easily constructed, the capability of the evaluation target device with respect to the unbalanced three-phase voltage containing the zero-phase component can be evaluated.

Furthermore, an unbalanced three-phase power supply device according to still another aspect of the present disclosure comprises: a control circuit including: a current command generation unit that receives unbalanced three-phase current information including phase command values and amplitude command values of a U-phase, a V-phase, and a W-phase of a predetermined zero-phase-containing unbalanced three-phase current which is an unbalanced three-phase current containing a zero-phase component, and generates a U-phase current command, a V-phase current command, and a W-phase current command having phases, frequencies, and active component and reactive component amplitudes respectively corresponding to the phase command values and the amplitude command values of the U-phase, the V-phase and the W-phase of the predetermined zero-phase-containing unbalanced three-phase current on the basis of the unbalanced three-phase current information; and a pulse modulation signal generation circuit that outputs a U-phase pulse modulation signal, a V-phase pulse modulation signal, and a W-phase pulse modulation signal corresponding to the U-phase current command, the V-phase current command, and the W-phase current command that are generated in the current command generation unit; and a main circuit including: a direct current (DC) power supply that outputs a predetermined DC voltage or DC current; a three-phase inverter device that includes a U-phase inverter unit, a V-phase inverter unit, and a W-phase inverter unit, and in which, in accordance with the U-phase pulse modulation signal, the V-phase pulse modulation signal, and the W-phase pulse modulation signal from the pulse modulation signal generation circuit and by using the predetermined DC voltage or DC current from the DC power supply, the U-phase inverter unit, the V-phase inverter unit, and the W-phase inverter unit generate a U-phase current, a V-phase current, and a W-phase current having phases, frequencies, and amplitudes respectively corresponding to the phase command values and the active component and reactive component amplitude command values of the U-phase, the V-phase and the W-phase of the predetermined zero-phase-containing unbalanced three-phase current, and thereby outputs an internal zero-phase-containing unbalanced three-phase current including the U-phase current, the V-phase current, and the W-phase current; and a three-phase transformation device that includes a U-phase winding part, a V-phase winding part, a W-phase winding part, and a secondary winding neutral point, and in which a secondary winding of the U-phase winding part, a secondary winding of the V-phase winding part, and a secondary winding of the W-phase winding part are connected in Y-connection and the secondary winding neutral point is a neutral point of the Y-connection, and the U-phase current, the V-phase current and the W-phase current of the predetermined internal zero-phase-containing unbalanced three-phase current from the three-phase inverter device are input to a primary winding of the U-phase winding part, a primary winding of the V-phase winding part, and a primary winding of the W-phase winding part, respectively, wherein the DC power supply, the three-phase inverter device, and the three-phase transformation device of the main circuit have respective forms and a mutual connection relationship that enable output of a zero-phase component of an external zero-phase-containing unbalanced three-phase current obtained by converting the internal zero-phase-containing unbalanced three-phase current according to a winding number ratio in the three-phase transformation device, and the external zero-phase-containing unbalanced three-phase current is output by the secondary winding of the U-phase winding part, the secondary winding of the V-phase winding part, and the secondary winding of the W-phase winding part connected in Y-connection, and the secondary winding neutral point, of the three-phase transformation device. Here, the "winding number ratio" means a ratio of the number of windings on the primary side to the number of windings on the secondary side in the three-phase transformation device. The "pulse modulation signal" includes at least a PWM signal, a PAM signal, a PFM signal, a PPM signal, and a PDM signal.

According to this configuration, the current command generation unit generates the U-phase current command, the V-phase current command, and the W-phase current command having phases, frequencies, and amplitudes respectively corresponding to the phase command values and the active component and reactive component amplitude command values of the U-phase, the V-phase, and the W-phase of the predetermined zero-phase-containing unbalanced three-phase current input from the outside.

Then, the pulse modulation signal generation circuit outputs the U-phase pulse modulation signal, the V-phase pulse modulation signal, and the W-phase pulse modulation signal corresponding to the U-phase current command, the V-phase current command, and the W-phase current command, respectively, which are generated by the current command generation unit.

Then, in accordance with the U-phase pulse modulation signal, the V-phase pulse modulation signal, and the W-phase pulse modulation signal from the pulse modulation signal generation circuit, the U-phase inverter unit, the V-phase inverter unit, and the W-phase inverter unit of the three-phase inverter device generate the U-phase current, the V-phase current, and the W-phase current having phases, frequencies, and amplitudes respectively corresponding to the phase command values and the active component and reactive component amplitude command values of the U-phase, the V-phase, and the W-phase of the predetermined zero-phase-containing unbalanced three-phase voltage by using the predetermined DC voltage or DC current from the DC power supply, to output the internal zero-phase-containing unbalanced three-phase current including the U-phase current, the V-phase current, and the W-phase current.

Then, in the three-phase transformation device, the U-phase current, the V-phase current, and the W-phase current of the internal zero-phase-containing unbalanced three-phase current from the three-phase inverter device are input to the primary winding of the U-phase winding part, the primary winding of the V-phase winding part, and the primary winding of the W-phase winding part, respectively. Here, because the DC power supply, the three-phase inverter device, and the three-phase transformation device have the forms and the mutual connection relationship in which the zero-phase component of the external zero-phase-containing unbalanced three-phase current obtained by converting the internal zero-phase-containing unbalanced three-phase current according to the winding number ratio in the three-phase transformation device can be output, the external zero-phase-containing unbalanced three-phase current is output by the secondary winding of the U-phase winding part, the secondary winding of the V-phase winding part, the secondary winding of the W-phase winding part, which are connected in Y-connection, and the secondary winding neutral point, of the three-phase transformation device.

In other words, according to the above configuration, the phase command values and the active component and reactive component amplitude command values of the U-phase, the V-phase, and the W-phase of the received predetermined zero-phase-containing unbalanced three-phase current are processed independently of each other for each of the U-phase, the V-phase, and the W-phase in the unbalanced three-phase power supply device. Therefore, the external zero-phase-containing unbalanced three-phase current corresponding to the predetermined zero-phase-containing unbalanced three-phase current can be generated. Furthermore, the DC power supply, the three-phase inverter device, and the three-phase transformation device have respective forms and the mutual connection relationship that enable output of the zero-phase component of the generated external zero-phase-containing unbalanced three-phase current. Therefore, the zero-phase component of the external zero-phase-containing unbalanced three-phase current can be output. Therefore, the unbalanced three-phase power supply device that can output a desired zero-phase-containing unbalanced three-phase current can be provided by setting a desired zero-phase-containing three-phase unbalanced current to the predetermined zero-phase-containing unbalanced three-phase current. Because the unbalanced three-phase power supply device generates the unbalanced three-phase current containing the zero-phase component by the three-phase inverter device, the environment of the test using the unbalanced three-phase current containing the zero-phase component can be easily constructed by using the unbalanced three-phase power supply device.

The main circuit may include a current sensor unit that detects currents of the U-phase, the V-phase, and the W-phase of the internal zero-phase-containing unbalanced three-phase current or the external zero-phase-containing unbalanced three-phase current, the control circuit may further include a current feedback control unit, the current command generation unit may include: a phase command value generation unit that adds the phase command values of the U-phase, the V-phase and the W-phase of the predetermined zero-phase-containing unbalanced three-phase current to respective phases of the U-phase, the V-phase and the W-phase of a reference internal three-phase sine wave, respectively, and outputs a U-phase phase command value, a V-phase phase command value, and a W-phase phase command value obtained by the addition; a three-phase sine wave generation unit that collates the U-phase phase command value, the V-phase phase command value, and the W-phase phase command value generated by the phase command value generation unit and respective input timings of the U-phase phase command value, the V-phase phase command value, and the W-phase phase command value with a sin table, and thereby generates a U-phase sine wave, a V-phase sine wave, and a W-phase sine wave having phases, frequencies, and reference amplitudes corresponding to the U-phase phase command value, the V-phase phase command value, and the W-phase phase command value, respectively; a three-phase cosine wave generation unit that collates the U-phase phase command value, the V-phase phase command value, and the W-phase phase command value generated by the phase command value generation unit and respective input timings of the U-phase phase command value, the V-phase phase command value, and the W-phase phase command value with a cos table, and thereby generates a U-phase cosine wave, a V-phase cosine wave, and a W-phase cosine wave having phases, frequencies and reference amplitudes corresponding to the U-phase phase command value, the V-phase phase command value, and the W-phase phase command value, respectively; a sine wave amplitude determination unit that determines an amplitude of the U-phase sine wave, an amplitude of the V-phase sine wave, and an amplitude of the W-phase sine wave by multiplying an amplitude value of the U-phase sine wave, an amplitude value of the V-phase sine wave, and an amplitude value of the W-phase sine wave by active component amplitude command values of the U-phase, the V-phase, and the W-phase of the predetermined zero-phase-containing unbalanced three-phase current, respectively, to generate the U-phase sine wave command, the V-phase sine wave command, and the W-phase sine wave command; a cosine wave amplitude determination unit that determines an amplitude of the U-phase cosine wave, an amplitude of the V-phase cosine wave, and an amplitude of the W-phase cosine wave by multiplying an amplitude value of the U-phase cosine wave, an amplitude value of the V-phase cosine wave, and an amplitude value of the W-phase cosine wave by reactive component amplitude command values of the U-phase, the V-phase, and the W-phase of the predetermined zero-phase-containing unbalanced three-phase current, respectively, to generate the U-phase cosine wave command, the V-phase cosine wave command, and the W-phase cosine wave command; and a current command amplitude determination unit that generates the U-phase current command, the V-phase current command, and the W-phase current command by adding the U-phase cosine wave command, the V-phase cosine wave command, and the W-phase cosine wave command generated by the cosine wave amplitude determination unit to the U-phase sine wave command, the V-phase sine wave command, and the W-phase sine wave command generated by the sine wave amplitude determination unit, respectively, the current feedback control unit may include: a current error generation unit that generates a U-phase current error, a V-phase current error, and a W-phase current error that are errors of currents of the U-phase, the V-phase, and the W-phase of the internal zero-phase-containing unbalanced three-phase current or the external zero-phase-containing unbalanced three-phase current detected by the current sensor unit, the error being generated with respect to the U-phase current command, the V-phase current command, and the W-phase current command generated by the current command amplitude determination unit; and a current compensation unit that generates a U-phase current manipulated variable, a V-phase current manipulated variable, and a W-phase current manipulated variable by respectively applying compensation to the U-phase current error, the V-phase current error, and the W-phase current error generated by the current error generation unit, and the pulse modulation signal generation circuit may be constituted as a circuit that generates the U-phase pulse modulation signal, the V-phase pulse modulation signal, and the W-phase pulse modulation signal respectively corresponding to the U-phase current manipulated variable, the V-phase current manipulated variable, and the W-phase current manipulated variable generated by the current compensation unit.

According to this configuration, a configuration for generating the current command and the pulse modulation signal can be suitably constructed. In addition, by the currents of the U-phase, the V-phase, and the W-phase of the internal zero-phase-containing unbalanced three-phase current being feedback-controlled, a suitable external zero-phase-containing unbalanced three-phase current is obtained.

The DC power supply may include a U-phase DC power supply unit, a V-phase DC power supply unit, and a W-phase DC power supply unit that respectively output the predetermined DC voltage or DC current, the three-phase inverter device may be constituted as a three-phase inverter unit including: a U-phase inverter of single-phase that constitutes the U-phase inverter unit, and in accordance with the U-phase pulse modulation signal from the pulse modulation signal generation circuit and by using the predetermined DC voltage or DC current from the U-phase DC power supply unit, generates an internal U-phase current having a phase, a frequency and an amplitude corresponding to the phase command value and the amplitude command value of the U-phase of the predetermined zero-phase-containing unbalanced three-phase current; a V-phase inverter of single-phase that constitutes the V-phase inverter unit, and in accordance with the V-phase pulse modulation signal from the pulse modulation signal generation circuit and by using the predetermined DC voltage or DC current from the V-phase DC power supply unit, generates an internal V-phase current having a phase, a frequency and an amplitude corresponding to the phase command value and the amplitude command value of the V-phase of the predetermined zero-phase-containing unbalanced three-phase current; and a W-phase inverter of single-phase that constitutes the W-phase inverter unit, and in accordance with the W-phase pulse modulation signal from the pulse modulation signal generation circuit and by using the predetermined DC voltage or DC current from the W-phase DC power supply unit, generates an internal W-phase current having a phase, a frequency and an amplitude corresponding to the phase command value and the amplitude command value of the W-phase of the predetermined zero-phase-containing unbalanced three-phase current, and in which the U-phase inverter, the V-phase inverter, and the W-phase inverter output the internal zero-phase-containing unbalanced three-phase current including the internal U-phase current, the internal V-phase current, and the internal W-phase current as the U-phase current, the V-phase current, and the W-phase current, respectively, the three-phase transformation device may be constituted as a three-phase transformer unit including a U-phase transformer of single-phase constituting the U-phase winding part, a V-phase transformer of single-phase constituting the V-phase winding part, and a W-phase transformer of single-phase constituting the W-phase winding part, and in which a secondary winding of the U-phase transformer, a secondary winding of the V-phase transformer, and a secondary winding of the W-phase transformer are connected in Y-connection and a neutral point of the Y-connection is the secondary winding neutral point, the internal U-phase current, the internal V-phase current, and the internal W-phase current from the three-phase inverter unit may be input to a primary winding of the U-phase transformer, a primary winding of the V-phase transformer, and a primary winding of the W-phase transformer, respectively, and the internal zero-phase-containing unbalanced three-phase current may be converted to an external zero-phase-containing unbalanced three-phase current according to a winding number ratio, the external zero-phase-containing unbalanced three-phase current being output by the secondary winding of the U-phase transformer, the secondary winding of the V-phase transformer, and the secondary winding of the W-phase transformer, which are connected in Y-connection, and the secondary winding neutral point of the secondary windings, of the three-phase transformer unit.

According to this configuration, the internal zero-phase-containing unbalanced three-phase current is generated in the main circuit, and the DC power supply corresponding to the three phases, the three inverter units of the three-phase inverter device, and the three winding parts of the three-phase transformation device are constituted of the three DC power supply units of the DC power supply, the three single-phase inverters of the three-phase inverter unit, and the three single-phase transformers of the three-phase transformer unit, which are respectively independent of each other. Therefore, the current of the zero-phase component of the internal zero-phase-containing unbalanced three-phase current flows through the DC power supply units, the single-phase inverters, the primary windings of the single-phase transformers, correspondingly to the respective phases according to the phase currents of the three phases which are unbalanced with each other. Then, because the secondary windings of the single-phase transformers corresponding to the three phases are connected in Y-connection, the external zero-phase-containing unbalanced three-phase current obtained by converting the internal zero-phase-containing unbalanced three-phase current according to the winding number ratio is output by the secondary windings, which correspond to the three phases and are connected in Y-connection, and the secondary winding neutral point, of the single-phase transformer. As a result, a combination of the DC power supply, the three-phase inverter device, and the three-phase transformation device can be suitably constructed, the combination enabling output of the zero-phase component of the external zero-phase-containing unbalanced three-phase current.

The DC power supply may include a U-phase DC power supply unit, a V-phase DC power supply unit, and a W-phase DC power supply unit that respectively output the predetermined DC voltage or DC current, the three-phase inverter device may be constituted as a three-phase inverter unit including: a U-phase inverter of single-phase that constitutes the U-phase inverter unit, and in accordance with the U-phase pulse modulation signal from the pulse modulation signal generation circuit and by using the predetermined DC voltage or DC current from the U-phase DC power supply unit, generates an internal U-phase current having a phase, a frequency and an amplitude corresponding to the phase command value and the amplitude command value of the U-phase of the predetermined zero-phase-containing unbalanced three-phase current; a V-phase inverter of single-phase that constitutes the V-phase inverter unit, and in accordance with the V-phase pulse modulation signal from the pulse modulation signal generation circuit and by using the predetermined DC voltage or DC current from the V-phase DC power supply unit, generates an internal V-phase current having a phase, a frequency and an amplitude corresponding to the phase command value and the amplitude command value of the V-phase of the predetermined zero-phase-containing unbalanced three-phase current; and a W-phase inverter of single-phase that constitutes the W-phase inverter unit, and in accordance with the W-phase pulse modulation signal from the pulse modulation signal generation circuit and by using the predetermined DC voltage or DC current from the W-phase DC power supply unit, generates an internal W-phase current having a phase, a frequency and an amplitude corresponding to the phase command value and the amplitude command value of the W-phase of the predetermined zero-phase-containing unbalanced three-phase current, and in which the U-phase inverter, the V-phase inverter, and the W-phase inverter output the internal zero-phase-containing unbalanced three-phase current including the internal U-phase current, the internal V-phase current, and the internal W-phase current as the U-phase current, the V-phase current, and the W-phase current, respectively, the three-phase transformation device may be constituted as a three-phase five-legged iron core transformer including a three-phase five-legged iron core having a U-phase leg, a V-phase leg, a W-phase leg, and a pair of magnetic leakage legs, the U-phase winding part provided on the U-phase leg, the V-phase winding part provided on the V-phase leg, and the W-phase winding part provided on the W-phase leg, and in which a secondary winding of the U-phase winding part, a secondary winding of the V-phase winding part, and a secondary winding of the W-phase winding part are connected in Y-connection and a neutral point of the Y-connection is the secondary winding neutral point, the internal U-phase current, the internal V-phase current, and the internal W-phase current from the three-phase inverter unit may be input to a primary winding of the U-phase winding part, a primary winding of the V-phase winding part, and a primary winding of the W-phase winding part of the three-phase five-legged iron core transformer, respectively, and the internal zero-phase-containing unbalanced three-phase current may be converted to an external zero-phase-containing unbalanced three-phase current according to a winding number ratio, the external zero-phase-containing unbalanced three-phase current being output by the secondary winding of the U-phase winding part, the secondary winding of the V-phase winding part, and the secondary winding of the W-phase winding part, which are connected in Y-connection, and the secondary winding neutral point of the secondary windings, of the three-phase five-legged iron core transformer.

According to this configuration, the internal zero-phase-containing unbalanced three-phase current is generated in the main circuit, and the DC power supply, the inverter unit, and the winding parts corresponding to the three phases are constituted of the DC power supply units, the single-phase inverters, and the phase winding parts of the three-phase five-legged iron core transformer, which are respectively independent of each other. Therefore, the current of the zero-phase component of the internal zero-phase-containing unbalanced three-phase current flows through the DC power supply units, the single-phase inverters, the primary windings of the phase winding parts of the three-phase five-legged iron core transformers corresponding to respective phases, according to the phase currents of respective phases which are unbalanced with each other. In addition, the magnetic flux corresponding to the current of the zero-phase component flows through the magnetic leakage leg of the three-phase five-legged iron core. Then, because the secondary windings of the three winding parts of the three-phase five-legged iron core transformer are connected in Y-connection, the external zero-phase-containing unbalanced three-phase current obtained by converting the internal zero-phase-containing unbalanced three-phase current according to the winding number ratio is output by the secondary windings of the three winding parts, which are connected in Y-connection, and the secondary winding neutral point, of the three-phase five-legged iron core transformer. As a result, a combination of the DC power supply, the three-phase inverter device, and the three-phase transformation device can be suitably constructed, the combination enabling output of the zero-phase component of the external zero-phase-containing unbalanced three-phase current.

The DC power supply may include a positive DC power supply unit and a negative DC power supply unit that are connected to each other in series at a power supply neutral point and each output a predetermined DC voltage or DC current, the three-phase inverter device may be constituted as a three-phase four-wired inverter including: the U-phase inverter unit that generates, in accordance with the U-phase pulse modulation signal from the pulse modulation signal generation circuit and by using the predetermined DC voltage or DC current from the positive DC power supply unit and the negative DC power supply unit, an internal U-phase current having a phase, a frequency and an amplitude corresponding to the phase command value and the amplitude command value of the U-phase of the predetermined zero-phase-containing unbalanced three-phase current; the V-phase inverter unit that generates, in accordance with the V-phase pulse modulation signal from the pulse modulation signal generation circuit and by using the predetermined DC voltage or DC current from the positive DC power supply unit and the negative DC power supply unit, an internal V-phase current having a phase, a frequency and an amplitude corresponding to the phase command value and the amplitude command value of the V-phase of the predetermined zero-phase-containing unbalanced three-phase current; and the W-phase inverter unit that generates, in accordance with the W-phase pulse modulation signal from the pulse modulation signal generation circuit and by using the predetermined DC voltage or DC current from the positive DC power supply unit and the negative DC power supply unit, an internal W-phase current having a phase, a frequency and an amplitude corresponding to the phase command value and the amplitude command value of the W-phase of the predetermined zero-phase-containing unbalanced three-phase current, and in which the U-phase inverter unit, the V-phase inverter unit, and the W-phase inverter unit are connected between a positive electrode of the positive DC power supply unit and a negative electrode of the negative DC power supply unit, and output the internal zero-phase-containing unbalanced three-phase current including the internal U-phase current, the internal V-phase current, and the internal W-phase current as the U-phase current, the V-phase current, and the W-phase current, respectively, the three-phase transformation device may be constituted as a three-phase transformer unit including a U-phase transformer of single-phase constituting the U-phase winding part, a V-phase transformer of single-phase constituting the V-phase winding part, and a W-phase transformer of single-phase constituting the W-phase winding part, and in which one end of a primary winding of the U-phase transformer, one end of a primary winding of the V-phase transformer, and one end of a primary winding of the W-phase transformer are connected in Y connection at a primary winding neutral point, and a secondary winding of the U-phase transformer, a secondary winding of the V-phase transformer, and a secondary winding of the W-phase transformer are connected in Y-connection at the secondary winding neutral point, and the primary winding neutral point is connected to the power supply neutral point of the DC power supply, the internal U-phase current, the internal V-phase current, and the internal W-phase current from the three-phase four-wired inverter may be input to the primary winding of the U-phase transformer, the primary winding of the V-phase transformer, and the primary winding of the W-phase transformer, respectively, and the internal zero-phase-containing unbalanced three-phase current may be converted to an external zero-phase-containing unbalanced three-phase current according to a winding number ratio, the external zero-phase-containing unbalanced three-phase current being output by the secondary winding of the U-phase transformer, the secondary winding of the V-phase transformer, and the secondary winding of the W-phase transformer, which are connected in Y-connection, and the secondary winding neutral point of the secondary windings, of the three-phase transformer unit.

According to this configuration, the three inverter units of the three-phase four-wired inverter are connected in Y-connection at the power supply neutral point via the common positive DC power supply unit and negative DC power supply unit, and the three inverter units, which are connected in Y-connection, and the positive DC power supply unit and the negative DC power supply unit are connected in Y-Y connection to the primary windings of the three single-phase transformers, which are connected in Y-connection, of the three-phase transformer unit. With this configuration, the internal zero-phase-containing unbalanced three-phase current output from the three inverter units of the three-phase four-wired inverter is applied to the primary windings of the three single-phase transformers of the three-phase transformer unit, and the current of the zero-phase component of the internal zero-phase-containing unbalanced three-phase current flows through the current path between the primary winding neutral point and the power supply neutral point. In addition, because the secondary windings of the single-phase transformers corresponding to the three phases are connected in Y-connection, the external zero-phase-containing unbalanced three-phase current obtained by converting the internal zero-phase-containing unbalanced three-phase current according to the winding number ratio is output by the secondary windings, which correspond to the three phases and are connected in Y-connection, and the secondary winding neutral point, of the single-phase transformer. As a result, a combination of the DC power supply, the three-phase inverter device, and the three-phase transformation device can be suitably constructed, the combination enabling output of the zero-phase component of the external zero-phase-containing unbalanced three-phase current.

The DC power supply may include a positive DC power supply unit and a negative DC power supply unit that are connected to each other in series at a power supply neutral point and each output a predetermined DC voltage or DC current, the three-phase inverter device may be constituted as a three-phase four-wired inverter including: the U-phase inverter unit that generates, in accordance with the U-phase pulse modulation signal from the pulse modulation signal generation circuit and by using the predetermined DC voltage or DC current from the positive DC power supply unit and the negative DC power supply unit, an internal U-phase current having a phase, a frequency and an amplitude corresponding to the phase command value and the amplitude command value of the U-phase of the predetermined zero-phase-containing unbalanced three-phase current; the V-phase inverter unit that generates, in accordance with the V-phase pulse modulation signal from the pulse modulation signal generation circuit and by using the predetermined DC voltage or DC current from the positive DC power supply unit and the negative DC power supply unit, an internal V-phase current having a phase, a frequency and an amplitude corresponding to the phase command value and the amplitude command value of the V-phase of the predetermined zero-phase-containing unbalanced three-phase current; and the W-phase inverter unit that generates, in accordance with the W-phase pulse modulation signal from the pulse modulation signal generation circuit and by using the predetermined DC voltage or DC current from the positive DC power supply unit and the negative DC power supply unit, an internal W-phase current having a phase, a frequency and an amplitude corresponding to the phase command value and the amplitude command value of the W-phase of the predetermined zero-phase-containing unbalanced three-phase current, and in which the U-phase inverter unit, the V-phase inverter unit, and the W-phase inverter unit are connected between a positive electrode of the positive DC power supply unit and a negative electrode of the negative DC power supply unit, and output the internal zero-phase-containing unbalanced three-phase current including the internal U-phase current, the internal V-phase current, and the internal W-phase current as the U-phase current, the V-phase current, and the W-phase current, respectively, the three-phase transformation device may be constituted as a three-phase five-legged iron core transformer including a three-phase five-legged iron core having a U-phase leg, a V-phase leg, a W-phase leg, and a pair of magnetic leakage legs, the U-phase winding part provided on the U-phase leg, the V-phase winding part provided on the V-phase leg, and the W-phase winding part provided on the W-phase leg, and in which one end of a primary winding of the U-phase winding part, one end of a primary winding of the V-phase winding part, and one end of a primary winding of the W-phase winding part are connected in Y connection at a primary winding neutral point, a secondary winding of the U-phase winding part, a secondary winding of the V-phase winding part, and a secondary winding of the W-phase winding part are connected in Y-connection at the secondary winding neutral point, and the primary winding neutral point is connected to the power supply neutral point of the DC power supply, the internal U-phase current, the internal V-phase current, and the internal W-phase current from the three-phase four-wired inverter may be input to the primary winding of the U-phase winding part, the primary winding of the V-phase winding part, and the primary winding of the W-phase winding part of the three-phase five-legged iron core transformer, respectively, and the internal zero-phase-containing unbalanced three-phase current may be converted to an external zero-phase-containing unbalanced three-phase current according to a winding number ratio, the external zero-phase-containing unbalanced three-phase current being output by the secondary winding of the U-phase winding part, the secondary winding of the V-phase winding part, and the secondary winding of the W-phase winding part, which are connected in Y-connection, and the secondary winding neutral point of the secondary windings, of the three-phase five-legged iron core transformer.

According to this configuration, the three inverter units of the three-phase four-wired inverter are connected in Y-connection at the power supply neutral point via the common positive DC power supply unit and negative DC power supply unit, and the three inverter units, which are connected in Y-connection, and the positive DC power supply unit and the negative DC power supply unit are connected in Y-Y connection to the primary windings of the three winding parts, which are connected in Y-connection, of the three-phase five-legged iron core transformer. With this configuration, the internal zero-phase-containing unbalanced three-phase current output from the three inverter units of the three-phase four-wired inverter is applied to the primary windings of the three winding parts of the three-phase five-legged iron core transformer, and the current of the zero-phase component of the internal zero-phase-containing unbalanced three-phase current flows through the current path between the primary winding neutral point and the power supply neutral point. In addition, the magnetic flux corresponding to the current of the zero-phase component flows through the magnetic leakage leg of the three-phase five-legged iron core. Then, because the secondary windings of the three winding parts of the three-phase five-legged iron core transformer are connected in Y-connection, the external zero-phase-containing unbalanced three-phase current obtained by converting the internal zero-phase-containing unbalanced three-phase current according to the winding number ratio is output by the secondary windings of the three winding parts, which are connected in Y-connection, and the secondary winding neutral point, of the three-phase five-legged iron core transformer. As a result, a combination of the DC power supply, the three-phase inverter device, and the three-phase transformation device can be suitably constructed, the combination enabling output of the zero-phase component of the external zero-phase-containing unbalanced three-phase current.

Furthermore, a power supply for evaluation according to another aspect of the present disclosure comprises the unbalanced three-phase power supply device according to any of the above, wherein the DC power supply is a converter that converts a three-phase voltage or three-phase current of a power system into a DC voltage or DC current, and a secondary side of the three-phase transformation device is an output terminal to which an evaluation target device is connected.

According to this configuration, under a test environment that can be easily constructed, the capability of the evaluation target device with respect to the unbalanced three-phase voltage containing the zero-phase component can be evaluated.

Hereinafter, specific embodiments of the present disclosure will be described with reference to the drawings. Note that, hereinafter, the same or corresponding elements are denoted by the same reference signs throughout all the drawings, and redundant description thereof will be omitted. In addition, because the following drawings are diagrams for describing the present disclosure, there are cases where elements unrelated to the present disclosure are omitted, dimensions are not accurate due to exaggeration or the like, dimensions are simplified, forms of elements corresponding to each other in a plurality of drawings do not match, waveforms of signals or the like are not accurate, and the like. Furthermore, the present disclosure is not limited to the following embodiments.

(Unbalanced Three-Phase Electrical Quantity Vector Containing Zero-Phase Component)

First, an unbalanced three-phase electrical quantity vector containing a zero-phase component discussed in the present disclosure will be described. In the present specification, the "electrical quantity" is a concept including "voltage" and "current". The "zero-phase" means a zero-phase component in the symmetric coordinate method. In another expression, the "zero-phase" means "a three-phase electrical quantity vector that is unbalanced and has a non-zero sum".

Figure 7:
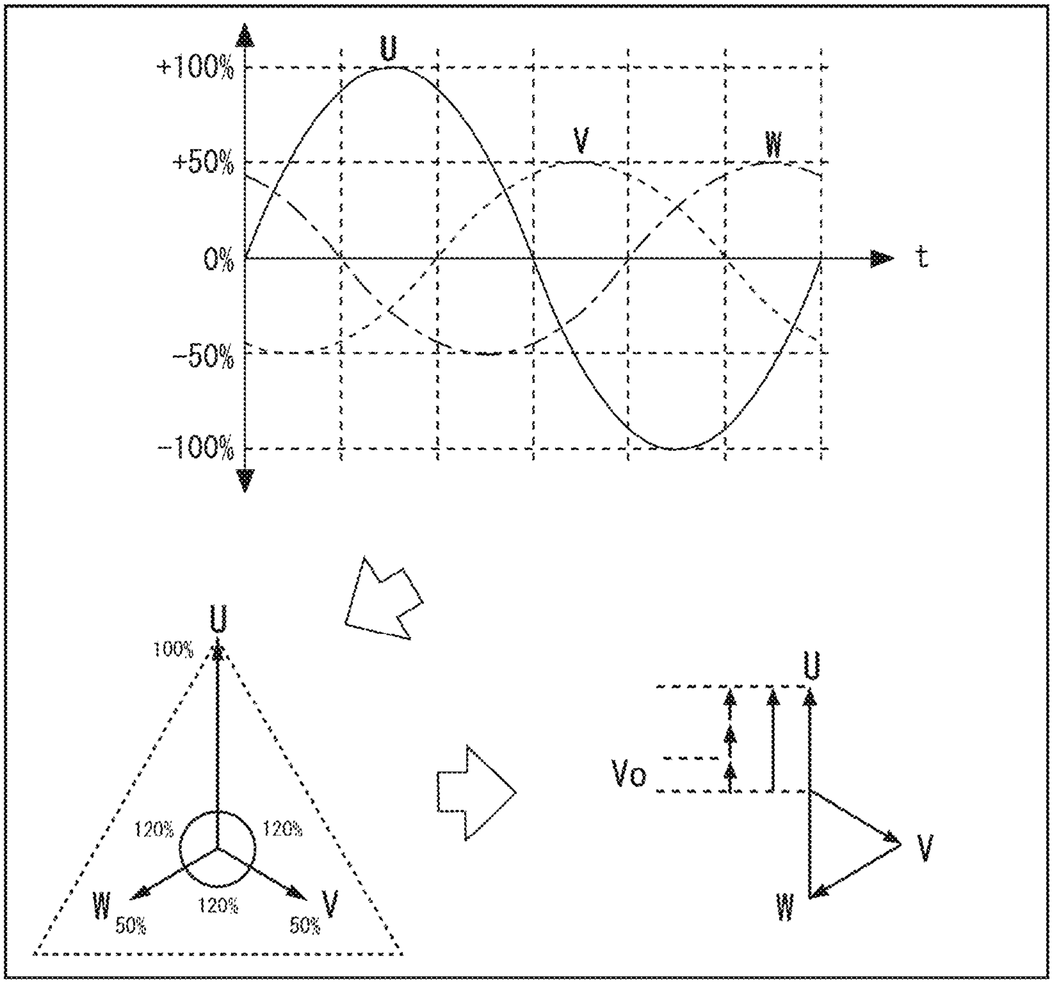
FIG. 7 is an explanatory diagram for explaining an unbalanced three-phase electrical quantity vector containing a zero-phase component.

FIG. 7 is an explanatory diagram for explaining the unbalanced three-phase electrical quantity vector containing the zero-phase component. Referring to FIG. 7, a waveform chart is illustrated in the upper part. This waveform chart indicates waveforms of the three-phase electrical quantity containing the zero-phase component. In this waveform chart, in a case where the amplitude of a U-phase electrical quantity is 100%, the amplitude of a V-phase electrical quantity is 50%, and the amplitude of a W-phase electrical quantity is 50%. The phase difference between the electrical quantities of the three phases is 120°.

By expressing each of the electrical quantities indicated by these three waveforms as a vector, the electrical quantity is expressed as a vector diagram on the lower left side in FIG. 7. By decomposing and translating the U-phase vector, the V-phase vector, and the W-phase vector of the vector diagram to obtain the sum of the U-phase vector, the V-phase vector, and the W-phase vector, a temporary balanced vector having a sum of zero and a vector which is the remaining U-phase vector are obtained as illustrated in the lower right side in FIG. 7. A vector obtained by dividing this remaining vector into three equal parts is defined as the "zero-phase".

For example, the unbalanced three-phase voltage vector containing the zero-phase component expressed by a symmetric coordinate method is expressed as the following formulas.

[Mathematical Formula 1]

$$\dot{V}_0 = \frac{1}{3}(\dot{V}_a + \dot{V}_b + \dot{V}_c)$$

$$\dot{V}_1 = \frac{1}{3}(\dot{V}_a + a\dot{V}_b + a^2\dot{V}_c)$$

$$\dot{V}_2 = \frac{1}{3}(\dot{V}_a + a^2\dot{V}_b + a\dot{V}_c)$$

The formula of the first stage represents the zero-phase voltage, the formula of the second stage represents a positive-phase voltage, and the formula of the third-stage represents an opposite-phase voltage. The zero-phase represents a fourth-phase component such as a ground fault, the positive phase represents a balanced component, and the opposite phase represents an unbalanced component. Note that the formula of the symmetric coordinate method of the unbalanced three-phase current vector containing the zero-phase component can be obtained by replacing "V" with "I" in the above formula.

Point of View and Features of the Present Invention

A problem of the present invention is that, in a test for evaluating the low voltage ride through function of a distributed power supply system, when a conventional method of supplying voltage or current containing a zero-phase component by artificially short-circuiting or grounding a distribution line is used, it is difficult to construct a test environment for creating a desired short-circuit or ground fault state. In the course of intensive studies on this problem, the inventors of the present invention have focused on the fact that, conventionally, a three-phase sine wave is generated at the time when a direct current (DC) is converted into an AC by an inverter.

In general, such a three-phase sine wave is generated by pulse-width modulating a reference sine wave that is a signal to be modulated for each phase to generate a pulse-width modulated (PWM) signal for each phase, and inputting the PWM signal for each phase to the three-phase inverter. However, a general inverter cannot output a zero-phase component of the three-phase sine wave. The reason is as follows.

In the first place, the general inverter is not assumed to output the zero-phase component generated at the time of ground fault or the like. Therefore, the reference sine wave of one of the three phases is generated from the remaining two reference sine waves. Specifically, as understood from the vector diagram on the lower left side in FIG. 7 described above, in a case where there is no zero-phase component, the sum of the sine wave vectors of the three phases is zero. Therefore, by using this relationship, a reference sine wave (phase vector) of one phase among the three phases is generated by adding the remaining two reference sine waves (phase vectors) to each other and inverting the resulting sine wave. For example, assuming the V-phase vector is the one phase vector, because U-phase vector+V-phase vector+W-phase vector=0, V-phase vector=−(U-phase vector+W-phase vector) is obtained. Therefore, the general inverter cannot output the zero-phase component of the three-phase sine wave.

Note that, in a case where the three-phase sine wave is subjected to feedback control or feedforward control, a voltage command or a current command (sine wave signal) corresponding to the reference sine wave is generated, a manipulated variable PWM signal obtained by performing the pulse width modulation on the manipulated variable (sine wave signal) based on the command is generated, and the manipulated variable PWM signal is input to the inverter. Even in this case, the above circumstances apply. In addition, the above-described pulse modulation signal can be generally used as a signal for controlling the inverter to generate the reference sine wave.

Therefore, the inventors of the present invention have conceived of generating U-phase, V-phase, and W-phase voltage commands or current commands corresponding to an unbalanced three-phase sine wave containing a predetermined zero-phase component, inputting a manipulated-variable pulse modulation signal based on the U-phase, V-phase, and W-phase voltage commands or current commands to a three-phase inverter device, and outputting a zero-phase-containing unbalanced three-phase sine wave corresponding to an unbalanced three-phase sine wave containing a predetermined zero-phase component from the three-phase inverter device.

Incidentally, a three-phase three-wire inverter and a three-phase tripod transformer of an inner iron core type which are generally used cannot output the zero-phase component of the three-phase sine wave. This is because there is no path for transmitting the zero-phase component of the three-phase sine wave. Therefore, the inventors of the present invention have specified the form of each of the DC power supply, the three-phase inverter device, and the three-phase transformation device that can output the zero-phase component of the three-phase sine wave, and the mutual connection relationship. The matters thus conceived and specified are features of the present invention.

Unity of Invention and Unity of Application

An unbalanced three-phase power supply device of the present disclosure includes: an electrical quantity command generation unit that generates U-phase, V-phase, and W-phase electrical quantity commands of a predetermined zero-phase-containing unbalanced three-phase electrical quantity; a pulse modulation signal generation circuit that outputs a U-phase pulse modulation signal, a V-phase pulse modulation signal, and a W-phase pulse modulation signal corresponding to the U-phase, V-phase, and W-phase electrical quantity commands; a DC power supply; a three-phase inverter device that outputs an internal zero-phase-containing unbalanced three-phase electrical quantity including a U-phase electrical quantity, a V-phase electrical quantity, and a W-phase electrical quantity respectively corresponding to the U-phase, V-phase, and W-phase electrical quantity commands of the predetermined zero-phase-containing unbalanced three-phase electrical quantity by using a DC voltage or a DC current from the DC power supply in accordance with the U-phase pulse modulation signal, the V-phase pulse modulation signal, and the W-phase pulse modulation signal; and a three-phase transformation device that converts the internal zero-phase-containing unbalanced three-phase electrical quantity into an external zero-phase-containing unbalanced three-phase electrical quantity according to a winding number ratio, and outputs the external zero-phase-containing unbalanced three-phase electrical quantity from a secondary side connected in Y-connection.

Hereinafter, an unbalanced three-phase power supply device that uses voltage among the electrical quantity is exemplified in a first embodiment, and an unbalanced three-phase power supply device that uses current among the electrical quantity is exemplified in a third embodiment. A voltage command generation unit, a pulse modulation signal generation circuit, a DC power supply, a three-phase inverter device, and a three-phase transformation device of the unbalanced three-phase power supply device of the first embodiment and a current command generation unit, a pulse modulation signal generation circuit, a DC power supply, a three-phase inverter device, and a three-phase transformation device of the third embodiment have configurations similar to each other.

Therefore, the invention related to the unbalanced three-phase power supply device of the first embodiment and the invention related to the unbalanced three-phase power supply device of the third embodiment have the unity of the invention and the unity of the application.

First Embodiment

Schematic Configuration

FIG. 1 is a functional block diagram illustrating an example of a configuration of an unbalanced three-phase power supply device 100 according to the first embodiment of the present disclosure. Referring to FIG. 1, the unbalanced three-phase power supply device 100 includes a control circuit 1A and a main circuit 2A. The control circuit 1A includes a voltage command generation unit 3 and a pulse modulation signal generation circuit 4. The main circuit 2A includes a DC power supply DC, a three-phase inverter device INV, and a three-phase transformation device T.

The voltage command generation unit 3 receives unbalanced three-phase voltage information IFubv including: a U-phase phase command value Cphu, a V-phase phase command value Cphv, a W-phase phase command value Cphw, a U-phase amplitude command value Camu, a V-phase amplitude command value Camv, and a W-phase amplitude command value Camw of a predetermined zero-phase-containing unbalanced three-phase voltage which is the unbalanced three-phase voltage containing a zero-phase component, and on the basis of the unbalanced three-phase voltage information IFubv, generates a U-phase voltage command Cvu, a V-phase voltage command Cvv, and a W-phase voltage command Cvw having phases, frequencies, and amplitudes corresponding to the U-phase phase command value Cphu, the V-phase phase command value Cphv, the W-phase phase command value Cphw, the U-phase amplitude command value Camu, the V-phase amplitude command value Camv, and the W-phase amplitude command value Camw of the predetermined zero-phase-containing unbalanced three-phase voltage, respectively.

The pulse modulation signal generation circuit 4 outputs a U-phase pulse modulation signal Spu, a V-phase pulse modulation signal Spv, and a W-phase pulse modulation signal Spw corresponding to the U-phase voltage command Cvu, the V-phase voltage command Cvv, and the W-phase voltage command Cvw, respectively, which are generated by the voltage command generation unit 3.

The DC power supply DC outputs a predetermined DC voltage.

The three-phase inverter device INV includes a U-phase inverter unit INVu (see FIG. 2), a V-phase inverter unit INVv (see FIG. 2), and a W-phase inverter unit INVw (see FIG. 2), and according to the U-phase pulse modulation signal Spu, the V-phase pulse modulation signal Spv, and the W-phase pulse modulation signal Spw from the pulse modulation signal generation circuit 4, and by using a predetermined DC voltage from the DC power supply DC, the U-phase inverter unit INVu, the V-phase inverter unit INVv, and the W-phase inverter unit INVw generate an internal U-phase voltage Viu, an internal V-phase voltage Viv, and an internal W-phase voltage Viw respectively having phases, frequencies, and amplitudes corresponding to the U-phase phase command value Cphu, the V-phase phase command value Cphv, the W-phase phase command value Cphw, the U-phase amplitude command value Camu, the V-phase amplitude command value Camv, and the W-phase amplitude command value Camw of the predetermined zero-phase-containing unbalanced three-phase voltage, respectively. With this configuration, the three-phase inverter device INV outputs an internal zero-phase-containing unbalanced three-phase voltage Vubi including the internal U-phase voltage Viu, the internal V-phase voltage Viv, and the internal W-phase voltage Viw.

Figure 2:
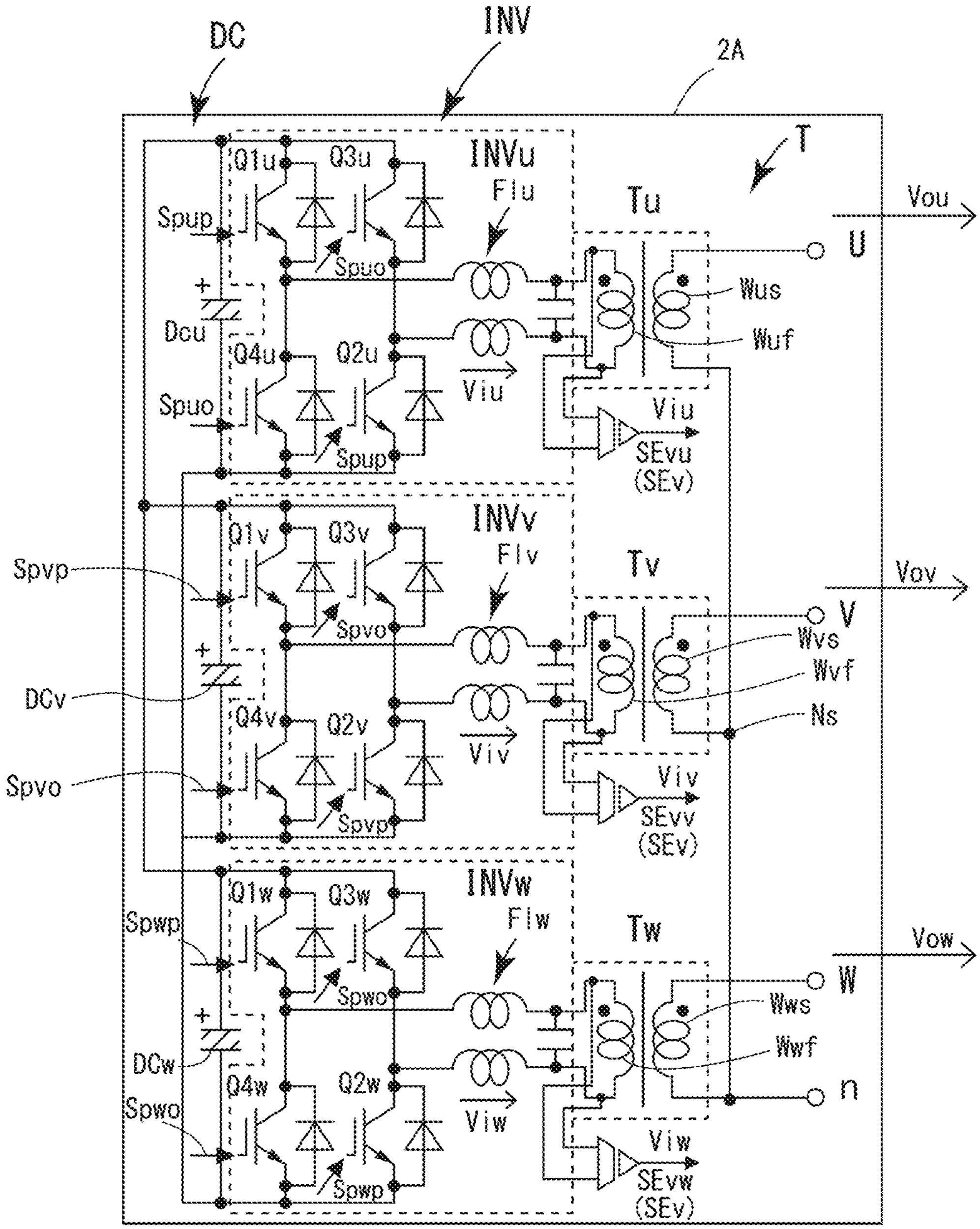
FIG. 2 is a circuit diagram illustrating details of a main circuit in FIG. 1 including a first zero-phase output configuration.

The three-phase transformation device T includes a U-phase winding part Tu (see FIG. 2), a V-phase winding part Tv (see FIG. 2), a W-phase winding part Tw (see FIG. 2), and a secondary winding neutral point Ns (see FIG. 2). A secondary winding Wus (see FIG. 2) of the U-phase winding part Tu, a secondary winding Wvs (see FIG. 2) of the V-phase winding part Tv, and a secondary winding Wws (see FIG. 2) of the W-phase winding part Tw are connected in Y-connection, and the secondary winding neutral point Ns is a neutral point of the Y-connection. The internal U-phase voltage Viu, the internal V-phase voltage Viv, and the internal W-phase voltage Viw of the internal zero-phase-containing unbalanced three-phase voltage Vubi from the three-phase inverter device INV are input to a primary winding Wuf (see FIG. 2) of the U-phase winding part Tu, a primary winding Wvf (see FIG. 2) of the V-phase winding part Tv, and a primary winding Wwf (see FIG. 2) of the W-phase winding part Tw, respectively.

The DC power supply DC, the three-phase inverter device INV, and the three-phase transformation device T of the main circuit 2A have respective forms and the mutual connection relationship that enable output of a zero-phase component of an external zero-phase-containing unbalanced three-phase voltage Vubo obtained by converting, in the three-phase transformation device T, the internal zero-phase-containing unbalanced three-phase voltage Vubi according to the winding number ratio of the three-phase transformation device T. The external zero-phase-containing unbalanced three-phase voltage Vubo is output by the secondary winding Wus of the U-phase winding part Tu, the secondary winding Wvs of the V-phase winding part Tv, and the secondary winding Wws of the W-phase winding part Tw, which are connected in Y-connection, and the secondary winding neutral point Ns, of the three-phase transformation device T. The external zero-phase-containing unbalanced three-phase voltage Vubo includes an external U-phase voltage Vou, an external V-phase voltage Vov, and an external W-phase voltage Vow obtained by converting the internal U-phase voltage Viu, the internal V-phase voltage Viv, and the internal W-phase voltage Viw of the internal zero-phase-containing unbalanced three-phase voltage Vubi according to the winding number ratio.

Note that the control of the internal zero-phase-containing unbalanced three-phase voltage Vubi or the external zero-phase-containing unbalanced three-phase voltage Vubo may be either feedforward control or feedback control. The configuration in a case where the feedforward control is performed is generally as described above.

In a case where the feedback control is performed, in the control circuit 1A, a voltage feedback control unit 5 (see FIG. 6) is provided between the voltage command generation unit 3 and the pulse modulation signal generation circuit 4. The voltage feedback control unit 5 generates a U-phase voltage manipulated variable Ovu, a V-phase voltage manipulated variable Ovv, and a W-phase voltage manipulated variable Ovw based on the errors of the internal U-phase voltage Viu, the internal V-phase voltage Viv, and the internal W-phase voltage Viw of the internal zero-phase-containing unbalanced three-phase voltage Vubi with respect to the U-phase voltage command Cvu, the V-phase voltage command Cvv, and the W-phase voltage command Cvw from the voltage command generation unit 3, or generates the U-phase voltage manipulated variable Ovu, the V-phase voltage manipulated variable Ovv, and the W-phase voltage manipulated variable Ovw based on the errors of the external U-phase voltage Vou, the external V-phase voltage Vov, and the external W-phase voltage Vow of the external zero-phase-containing unbalanced three-phase voltage Vubo with respect to the U-phase voltage command Cvu, the V-phase voltage command Cvv, and the W-phase voltage command Cvw from the voltage command generation unit 3. The pulse modulation signal generation circuit 4 outputs the U-phase pulse modulation signal Spu, the V-phase pulse modulation signal Spv, and the W-phase pulse modulation signal Spw corresponding to the U-phase voltage manipulated variable Ovu, the V-phase voltage manipulated variable Ovv, and the W-phase voltage manipulated variable Ovw generated by the voltage feedback control unit 5.

Detailed Configuration

Hereinafter, the detailed configuration of the unbalanced three-phase power supply device 100 will be described in order of the main circuit 2A and the control circuit 1A. Hereinafter, a circuit configuration in which the pulse modulation signal is a PWM signal will be exemplified. A circuit configuration in which the pulse modulation signal is a pulse modulation signal other than the PWM signal can also be constructed by replacing the circuit that generates the PWM signal illustrated in the pulse modulation signal generation circuit 4 in FIG. 6 with a circuit that generates a pulse modulation signal other than the PWM signal. In addition, hereinafter, the PWM signal is referred to as a pulse modulation signal which is a superordinate concept thereof.

{Main Circuit 2A}

Referring to FIGS. 2 to 5, it is required for the main circuit 2A that "the DC power supply DC, the three-phase inverter device INV, and the three-phase transformation device T have respective forms and the mutual connection relationship that enable output of a zero-phase component of the external zero-phase-containing unbalanced three-phase voltage Vubo obtained by converting, in the three-phase transformation device T, the internal zero-phase-containing unbalanced three-phase voltage Vubi according to the winding number ratio of the three-phase transformation device T". Hereinafter, this requirement is referred to as a "zero-phase outputtable requirement". The zero-phase outputtable requirement includes the following three items.

a. Each phase can be controlled individually, and a main circuit of each phase is independent of (but does not mean "insulated from") the others.

b. A transformer is independent of the others or the transformer has a five-legged iron core of the outer core type.

c. In the transformer, at least the secondary side is connected in Y-connection and has a neutral point (in general Y-Y connection, a Δ winding is necessary for suppressing the third harmonic, but is unnecessary in this case).

As a practical circuit configuration that satisfies this zero-phase outputtable requirement, the following four types of circuit configurations have been specified.

First zero-phase output configuration: Three single-phase inverters+Three single-phase transformers Second zero-phase output configuration: Three single-phase inverters+One three-phase five-legged iron core transformer Third zero-phase output configuration: One three-phase four-wired inverter+Three single-phase transformers Fourth zero-phase output configuration: One three-phase four-wired inverters+One three-phase five-legged iron core transformer Here, the following points should be noted. As is apparent from the content of the "zero-phase outputtable requirement" described above, the first zero-phase output configuration to the fourth zero-phase output configuration define only a combination of the DC power supply DC, the three-phase inverter device INV, and the three-phase transformation device T. On the other hand, FIGS. 2 to 5 for explaining the first zero-phase output configuration to the fourth zero-phase output configuration illustrate low-pass filters Flu, Flv, and Flw and a voltage sensor unit SEv in addition to the DC power supply DC, the three-phase inverter device INV, and the three-phase transformation device T. However, the low-pass filters Flu, Flv, and Flw and the voltage sensor unit SEv are elements unrelated to the "zero-phase outputtable requirement", and are not included in the first zero-phase output configuration to the fourth zero-phase output configuration.

The low-pass filters Flu, Flv, and Flw are provided to remove the frequency component of the carrier of the pulse modulation signal from the voltage (internal zero-phase-containing unbalanced three-phase voltage Vubi or external zero-phase-containing unbalanced three-phase voltage Vubo) output from the three-phase inverter device INV. Each of the low-pass filters Flu, Flv, and Flw includes a reactor and a capacitor disposed on the output side of the reactor. In general, the reactor is disposed on the primary side of the three-phase transformation device T, and the capacitor is disposed on the primary side or the secondary side of the three-phase transformation device T. A configuration in which the capacitor is disposed on the primary side of the three-phase transformation device T is referred to as "primary-side control", and a configuration in which the capacitor is disposed on the secondary side of the three-phase transformation device T is referred to as "secondary-side control". However, in a case where the three-phase transformation device T is constituted by a leakage transformer, the reactor is omitted, and the capacitor is disposed on the secondary side of the three-phase transformation device T, resulting in the "secondary-side control".

The control targets of the "primary-side control" and the "secondary-side control" are voltages (internal zero-phase-containing unbalanced three-phase voltage Vubi or external zero-phase-containing unbalanced three-phase voltage Vubo) output from the three-phase inverter device INV. Therefore, in the case of the "primary-side control", the voltage sensor unit SEv is provided on the output side of the capacitor of the low-pass filter on the primary side of the three-phase transformation device T in order to detect the internal zero-phase-containing unbalanced three-phase voltage Vubi, and in the case of the "secondary-side control", the voltage sensor unit SEv is provided on the output side of the capacitor of the low-pass filter on the secondary side of the three-phase transformation device T in order to detect the external zero-phase-containing unbalanced three-phase voltage Vubo.

Hereinafter, the main circuit 2A including each of first zero-phase output configuration to the fourth zero-phase output configuration will be sequentially described.

<<Main Circuit 2A including First Zero-Phase Output Configuration>>

FIG. 2 is a circuit diagram illustrating details of the main circuit 2A in FIG. 1 including the first zero-phase output configuration. Hereinafter, the contents of the main circuit 2A including the first zero-phase output configuration will be described with reference to FIG. 2.

<DC Power Supply DC>

The DC power supply DC includes a U-phase DC power supply unit DCu, a V-phase DC power supply unit DCv, and a W-phase DC power supply unit DCw, each of which outputs a predetermined DC voltage. Here, the U-phase DC power supply unit DCu, the V-phase DC power supply unit DCv, and the W-phase DC power supply unit DCw are connected in parallel to each other, but may be independent of each other. The U-phase DC power supply unit DCu, the V-phase DC power supply unit DCv, and the W-phase DC power supply unit DCw are not particularly limited as long as the power supply units are DC voltage sources that can output a predetermined DC voltage. Examples of the U-phase DC power supply unit DCu, the V-phase DC power supply unit DCv, and the W-phase DC power supply unit DCw include a capacitor, a DC/DC converter, a rectifier device, a rechargeable battery, and the like. Here, each of the U-phase DC power supply unit DCu, the V-phase DC power supply unit DCv, and the W-phase DC power supply unit DCw includes a capacitor. In this case, a DC power supply device (not illustrated) that charges the three capacitors is provided in the preceding stage of the three capacitors.

<Three-phase Inverter Device INV>

The three-phase inverter device INV includes the U-phase inverter unit INVu, the V-phase inverter unit INVv, and the W-phase inverter unit INVw. The three-phase inverter device INV includes a three-phase inverter unit. The three-phase inverter unit includes a single-phase U-phase inverter constituting the U-phase inverter unit INVu, a single-phase V-phase inverter constituting the V-phase inverter unit INVv, and a single-phase W-phase inverter constituting the W-phase inverter unit INVw. The single-phase U-phase inverter, the single-phase V-phase inverter, and the single-phase W-phase inverter are not particularly limited as long as the inverters can convert a DC voltage into an AC voltage. Each of the single-phase U-phase inverter, the single-phase V-phase inverter, and the single-phase W-phase inverter includes, for example, a full bridge inverter. Because the full bridge inverter is well known, the description thereof will be made briefly below.

The U-phase inverter includes four switching elements Q1*u* to Q4*u* connected in full bridge. In the U-phase inverter, an input terminal is connected to the U-phase DC power supply unit DCu. A U-phase positive phase pulse modulation signal Spup constituting the U-phase pulse modulation signal Spu from the pulse modulation signal generation circuit 4 is input to a pair of the switching element Q1*u* and the switching element Q2*u*, and a U-phase opposite phase pulse modulation signal Spuo constituting the U-phase pulse modulation signal Spu from the pulse modulation signal generation circuit 4 is input to a pair of the switching element Q3*u* and the switching element Q4*u*. The U-phase inverter alternately turns on and off the pair of the switching element Q1*u* and the switching element Q2*u* following the U-phase positive phase pulse modulation signal Spup and the pair of the switching element Q3*u* and the switching element Q4*u* following the U-phase opposite phase pulse modulation signal Spuo, thereby generating, by using a predetermined DC voltage from the U-phase DC power supply unit DCu, the internal U-phase voltage Viu having a phase, a frequency, and an amplitude corresponding to the phase command value Cphu and the amplitude command value Camu of the U-phase of a predetermined zero-phase-containing unbalanced three-phase voltage, and outputs the internal U-phase voltage Viu from an output terminal.

The V-phase inverter includes four switching elements Q1*v* to Q4*v* connected in full bridge. In the V-phase inverter, an input terminal is connected to the V-phase DC power supply unit DCv. A V-phase positive phase pulse modulation signal Spvp constituting the V-phase pulse modulation signal Spv from the pulse modulation signal generation circuit 4 is input to a pair of the switching element Q1*v* and the switching element Q2*v*, and a V-phase opposite phase pulse modulation signal Spvo constituting the V-phase pulse modulation signal Spv from the pulse modulation signal generation circuit 4 is input to a pair of the switching element Q3*v* and the switching element Q4*v*. The V-phase inverter alternately turns on and off the pair of the switching element Q1*v* and the switching element Q2*v* following the V-phase positive phase pulse modulation signal Spvp and the pair of the switching element Q3*v* and the switching element Q4*v* following the V-phase opposite phase pulse modulation signal Spvo, thereby generating, by using a predetermined DC voltage from the V-phase DC power supply unit DCv, the internal V-phase voltage Viv having a phase, a frequency, and an amplitude corresponding to the phase command value Cphv and the amplitude command value Camv of the V-phase of a predetermined zero-phase-containing unbalanced three-phase voltage, and outputs the internal V-phase voltage Viv from an output terminal.

The W-phase inverter includes four switching elements Q1*w* to Q4*w* connected in full bridge. In the W-phase inverter, an input terminal is connected to the W-phase DC power supply unit DCw. A W-phase positive phase pulse modulation signal Spwp constituting the W-phase pulse modulation signal Spw from the pulse modulation signal generation circuit 4 is input to a pair of the switching element Q1*w* and the switching element Q2*w*, and a W-phase opposite phase pulse modulation signal Spwo constituting the W-phase pulse modulation signal Spw from the pulse modulation signal generation circuit 4 is input to a pair of the switching element Q3*w* and the switching element Q4*w*. The W-phase inverter alternately turns on and off the pair of the switching element Q1*w* and the switching element Q2*w* following the W-phase positive phase pulse modulation signal Spwp and the pair of the switching element Q3*w* and the switching element Q4*w* following the W-phase opposite phase pulse modulation signal Spwo, thereby generating, by using a predetermined DC voltage from the W-phase DC power supply unit DCw, the internal W-phase voltage Viw having a phase, a frequency, and an amplitude corresponding to the phase command value Cphw and the amplitude command value Camw of the W-phase of a predetermined zero-phase-containing unbalanced three-phase voltage, and outputs the internal W-phase voltage Viw from an output terminal.

In this manner, the U-phase inverter, the V-phase inverter, and the W-phase inverter output the internal zero-phase-containing unbalanced three-phase voltage Vubi including the internal U-phase voltage Viu, the internal V-phase voltage Viv, and the internal W-phase voltage Viw as the U-phase voltage, the V-phase voltage, and the W-phase voltage, respectively.

<Three-Phase Transformation Device T>

The three-phase transformation device T includes the U-phase winding part Tu, the V-phase winding part Tv, and the W-phase winding part Tw. The U-phase winding part Tu, the V-phase winding part Tv, and the W-phase winding part Tw have a common predetermined winding number ratio. The above points are the same in the second zero-phase output configuration to the fourth zero-phase output configuration.

The three-phase transformation device T includes a three-phase transformer unit. The three-phase transformer unit includes a single-phase U-phase transformer constituting the U-phase winding part Tu, a single-phase V-phase transformer constituting the V-phase winding part Tv, and a single-phase W-phase transformer constituting the W-phase winding part Tw.

The primary winding Wuf of the U-phase transformer is connected to the output terminal of the U-phase inverter via the low-pass filter Flu. The primary winding Wvf of the V-phase transformer is connected to the output terminal of the V-phase inverter via the low-pass filter Flv. The primary winding Wwf of the W-phase transformer is connected to the output terminal of the W-phase inverter via the low-pass filter Flw.

The secondary winding Wus of the U-phase transformer, the secondary winding Wvs of the V-phase transformer, and the secondary winding Wws of the W-phase transformer are connected in Y-connection at the secondary winding neutral point Ns.

In the three-phase transformer unit, the internal U-phase voltage Viu, the internal V-phase voltage Viv, and the internal W-phase voltage Viw of the internal zero-phase-containing unbalanced three-phase voltage Vubi from the three-phase inverter unit are input to the primary winding Wuf of the U-phase transformer, the primary winding Wvf of the V-phase transformer, and the primary winding Wwf of the W-phase transformer, respectively, and the external zero-phase-containing unbalanced three-phase voltage Vubo including the external U-phase voltage Vou, the external V-phase voltage Vov, and the external W-phase voltage Vow is generated in the secondary winding Wus of the U-phase transformer, the secondary winding Wvs of the V-phase transformer, and the secondary winding Wws of the W-phase transformer, the external U-phase voltage Vou, the external V-phase voltage Vov, and the external W-phase voltage Vow being obtained by converting the internal U-phase voltage Viu, the internal V-phase voltage Viv, and the internal W-phase voltage Viw, respectively, according to a predetermined winding number ratio. Then, this external zero-phase-containing unbalanced three-phase voltage Vubo is output by the secondary winding Wus of the U-phase transformer, the secondary winding Wvs of the V-phase transformer, and the secondary winding Wws of the W-phase transformer, which are connected in Y-connection, and the secondary winding neutral point Ns, of the three-phase transformer unit. Reference signs U, V, W, and n denote U-phase, V-phase, W-phase, and zero-phase output terminals on the secondary side of the three-phase transformer unit, respectively.

<Elements Other than First Zero-Phase Output Configuration>

*Low-Pass Filter*

Here, the low-pass filter is configured into a form of the "primary-side control". The low-pass filter Flu of the U-phase is disposed between the output terminal of the U-phase inverter and the primary winding Wuf of the U-phase transformer. The low-pass filter Flv of the V-phase is disposed between the output terminal of the V-phase inverter and the primary winding Wvf of the V-phase transformer. The low-pass filter Flw of the W-phase is disposed between the output terminal of the W-phase inverter and the primary winding Wwf of the W-phase transformer. The low-pass filter may be configured into a form of the "secondary-side control".

*Voltage Sensor Unit SEv*

A U-phase voltage sensor SEvu that detects the internal U-phase voltage Viu is provided between both terminals of the primary winding Wuf of the U-phase transformer. A V-phase voltage sensor SEvv that detects the internal V-phase voltage Viv is provided between both terminals of the primary winding Wvf of the V-phase transformer. A W-phase voltage sensor SEvw that detects the internal W-phase voltage Viw is provided between both terminals of the primary winding Wwf of the W-phase transformer. The U-phase voltage sensor SEvu, the V-phase voltage sensor SEvv, and the W-phase voltage sensor SEvw constitute the voltage sensor unit SEv that detects the internal zero-phase-containing unbalanced three-phase voltage Vubi. Here, the voltage sensor unit SEv is provided so as to correspond to the "primary-side control". In the case of the "secondary-side control", the voltage sensor unit SEv is provided on the output side of the capacitor of the low-pass filter on the secondary side of the three-phase transformer unit in order to detect the external zero-phase-containing unbalanced three-phase voltage Vubo.

Action and Effect

According to the first zero-phase output configuration, the internal zero-phase-containing unbalanced three-phase voltage Vubi is generated in the main circuit 2A, and the DC power supply DC corresponding to the three phases, the three inverter units INVu to INVw of the three-phase inverter device INV, and the three winding parts Tu to Tw of the three-phase transformation device are constituted of the three DC power supply units DCu to DCw of the DC power supply DC, the three single-phase inverters of the three-phase inverter unit, and the three single-phase transformers of the three-phase transformer unit, which are respectively independent of each other. Therefore, the current of the zero-phase component of the internal zero-phase-containing unbalanced three-phase voltage Vubi flows through the DC power supply units DCu to DCw, the single-phase inverters, the primary windings Wuf to Wwf of the single-phase transformers, correspondingly to the respective phases according to the phase voltages Viu to Viw of the three phases which are unbalanced with each other. Then, because the secondary windings Wus to Wws of the single-phase transformers corresponding to the three phases are connected in Y-connection, the external zero-phase-containing unbalanced three-phase voltage Vubo obtained by converting the internal zero-phase-containing unbalanced three-phase voltage Vubi according to the winding number ratio is output by the secondary windings Wus to Wws, which correspond to the three phases and are connected in Y-connection, and the secondary winding neutral point Ns, of the single-phase transformer. As a result, a combination of the DC power supply DC, the three-phase inverter device INV, and the three-phase transformation device T can be suitably constructed, the combination enabling output of the zero-phase component of the external zero-phase-containing unbalanced three-phase voltage Vubo.

<<Main Circuit 2A including Second Zero-Phase Output Configuration>>

Figure 3:
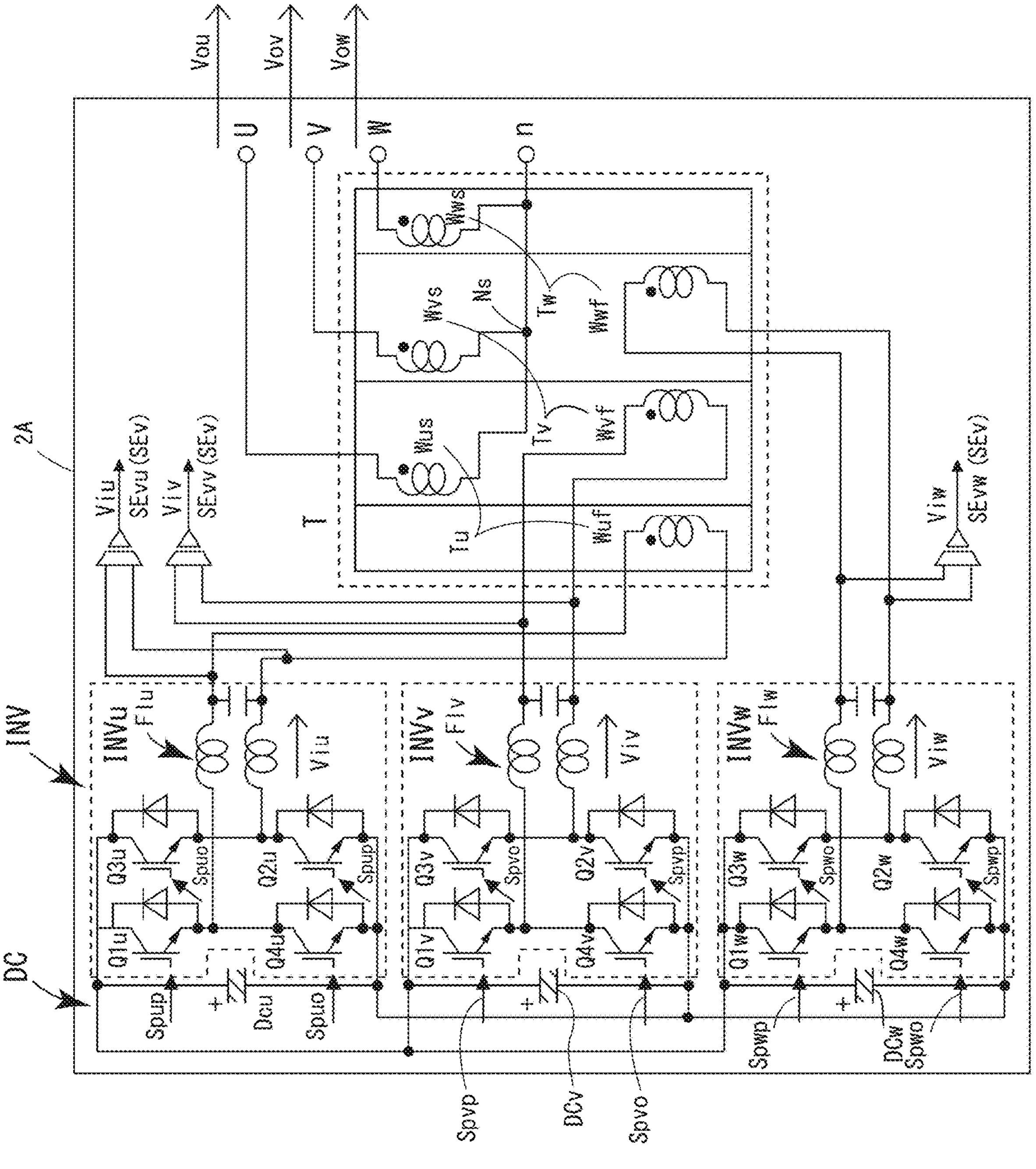
FIG. 3 is a circuit diagram illustrating details of a main circuit in FIG. 1 including a second zero-phase output configuration.

FIG. 3 is a circuit diagram illustrating details of the main circuit 2A in FIG. 1 including the second zero-phase output configuration. Hereinafter, the contents of the main circuit 2A including the second zero-phase output configuration will be described with reference to FIG. 3.

<DC Power Supply DC>

Because the DC power supply DC of the second zero-phase output configuration is the same as the DC power supply DC of the first zero-phase output configuration, the description thereof will be omitted.

<Three-phase Inverter Device INV>

Because the three-phase inverter device INV of the second zero-phase output configuration is the same as the three-phase inverter device INV of the first zero-phase output configuration, the description thereof will be omitted.

<Three-phase Transformation Device T>

The three-phase transformation device T includes a three-phase five-legged iron core transformer. The three-phase five-legged iron core transformer is well known, and thus will be briefly described. The three-phase five-legged iron core transformer includes a three-phase five-legged iron core (not illustrated) having a U-phase leg, a V-phase leg, a W-phase leg, and a pair of magnetic leakage legs provided on both sides of the U-phase leg, the V-phase leg, and the W-phase leg, the U-phase winding part Tu provided on the U-phase leg, the V-phase winding part Tv provided on the V-phase leg, and the W-phase winding part Tw provided on the W-phase leg.

The primary winding Wuf of the U-phase winding part Tu is connected to the output terminal of the U-phase inverter via the low-pass filter Flu. The primary winding Wvf of the V-phase winding part Tv is connected to the output terminal of the V-phase inverter via the low-pass filter Flv. The primary winding Wwf of the W-phase winding part Tw is connected to the output terminal of the W-phase inverter via the low-pass filter Flw.

The secondary winding Wus of the U-phase winding part Tu, the secondary winding Wvs of the V-phase winding part Tv, and the secondary winding Wws of the W-phase winding part Tw are connected in Y-connection at the secondary winding neutral point Ns.

In the three-phase five-legged iron core transformer, the internal U-phase voltage Viu, the internal V-phase voltage Viv, and the internal W-phase voltage Viw of the internal zero-phase-containing unbalanced three-phase voltage Vubi from the three-phase inverter unit are input to the primary winding Wuf of the U-phase winding part Tu, the primary winding Wvf of the V-phase winding part Tv, and the primary winding Wwf of the W-phase winding part Tw, respectively, and also, the external zero-phase-containing unbalanced three-phase voltage Vubo is generated, the external zero-phase-containing unbalanced three-phase voltage Vubo including the external U-phase voltage Vou, the external V-phase voltage Vov, and the external W-phase voltage Vow obtained by converting the internal U-phase voltage Viu, the internal V-phase voltage Viv, and the internal W-phase voltage Viw according to a predetermined winding number ratio, respectively, in the secondary winding Wus of the U-phase winding part Tu, the secondary winding Wvs of the V-phase winding part Tv, and the secondary winding Wws of the W-phase winding part Tw. Then, the external zero-phase-containing unbalanced three-phase voltage Vubo is output by the secondary winding Wus of the U-phase winding part Tu, the secondary winding Wvs of the V-phase winding part Tv, and the secondary winding Wws of the W-phase winding part Tw, which are connected in Y-connection, and the secondary winding neutral point Ns, of the three-phase five-legged iron core transformer. Reference signs U, V, W, and n denote U-phase, V-phase, W-phase, and zero-phase output terminals on the secondary side of the three-phase five-legged iron core transformer, respectively.

<Elements Other than Second Zero-Phase Output Configuration>

*Low-Pass Filter*

Here, the low-pass filter is configured into the form of the "primary-side control". The low-pass filter Flu of the U-phase is disposed between the output terminal of the U-phase inverter and the primary winding Wuf of the U-phase winding part Tu. The low-pass filter Flv of the V-phase is disposed between the output terminal of the V-phase inverter and the primary winding Wvf of the V-phase winding part Tv. The low-pass filter Flw of the W-phase is disposed between the output terminal of the W-phase inverter and the primary winding Wwf of the W-phase winding part Tw. The low-pass filter may be configured into the form of the "secondary-side control".

*Voltage Sensor Unit SEv*

The U-phase voltage sensor SEvu that detects the internal U-phase voltage Viu is provided between both terminals of the primary winding Wuf of the U-phase winding part Tu. The V-phase voltage sensor SEvv that detects the internal V-phase voltage Viv is provided between both terminals of the primary winding Wvf of the V-phase winding part Tv. A W-phase voltage sensor SEvw that detects the internal W-phase voltage Viw is provided between both terminals of the primary winding Wwf of the W-phase winding part Tw. The U-phase voltage sensor SEvu, the V-phase voltage sensor SEvv, and the W-phase voltage sensor SEvw constitute the voltage sensor unit SEv that detects the internal zero-phase-containing unbalanced three-phase voltage Vubi. Here, the voltage sensor unit SEv is provided so as to correspond to the "primary-side control". In the case of the "secondary-side control", the voltage sensor unit SEv is provided on the output side of the capacitor of the low-pass filter on the secondary side of the three-phase five-legged iron core transformer in order to detect the external zero-phase-containing unbalanced three-phase voltage Vubo.

Action and Effect

According to the second zero-phase output configuration, the internal zero-phase-containing unbalanced three-phase voltage Vubi is generated in the main circuit 2A, and the DC power supply DC corresponding to the three phases, the three inverter units INVu to INVw of the three-phase inverter device INV, and the three winding parts Tu to Tw of the three-phase five-legged iron core transformer are constituted of the three DC power supply units DCu to DCw of the DC power supply DC, the three single-phase inverters of the three-phase inverter unit, and the three winding parts Tu to Tw of the three-phase five-legged iron core transformer, which are respectively independent of each other. Therefore, the current of the zero-phase component of the internal zero-phase-containing unbalanced three-phase voltage Vubi flows through the DC power supply units DCu to DCw, the single-phase inverters, the primary windings Wuf to Wwf of the winding parts Tu to Tw of the three-phase five-legged iron core transformer, correspondingly to the respective phases according to the phase voltages Viu to Viw of the three phases which are unbalanced with each other. Then, because the secondary windings Wus to Wws of the winding parts Tu to Tw of the three-phase five-legged iron core transformer corresponding to the three phases are connected in Y-connection, the external zero-phase-containing unbalanced three-phase voltage Vubo obtained by converting the internal zero-phase-containing unbalanced three-phase voltage Vubi according to the winding number ratio is output by the secondary windings Wus to Wws of the of the winding parts Tu to Tw, which corresponds the three phases and are connected in Y-connection, and the secondary winding neutral point Ns, of the three-phase five-legged iron core transformer. In this case, the zero-phase magnetic flux passes through the pair of magnetic leakage legs. As a result, a combination of the DC power supply DC, the three-phase inverter device INV, and the three-phase transformation device T can be suitably constructed, the combination enabling output of the zero-phase component of the external zero-phase-containing unbalanced three-phase voltage Vubo.

<<Main Circuit 2A Including Third Zero-Phase Output Configuration>>

Figure 4:
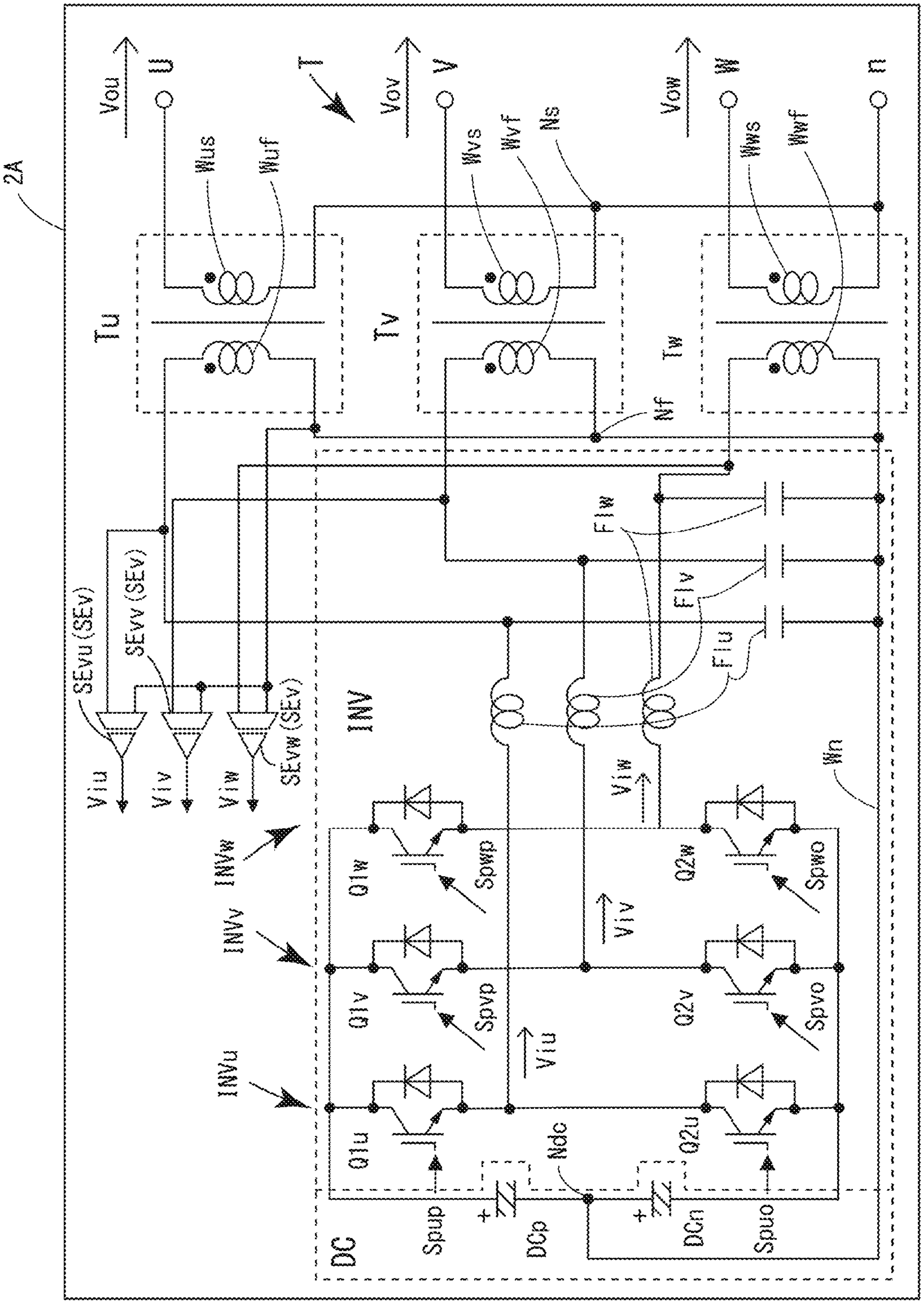
FIG. 4 is a circuit diagram illustrating details of a main circuit in FIG. 1 including a third zero-phase output configuration.

FIG. 4 is a circuit diagram illustrating details of the main circuit 2A in FIG. 1 including the third zero-phase output configuration. Hereinafter, the contents of the main circuit 2A including the third zero-phase output configuration will be described with reference to FIG. 4.

<DC Power Supply DC>

The DC power supply DC includes a positive DC power supply unit DCp and a negative DC power supply unit DCn that are connected to each other in series at a power supply neutral point Ndc and each output a predetermined DC voltage. The positive DC power supply unit DCp and the negative DC power supply unit DCn are not particularly limited as long as the power supply units are DC voltage sources that can output a predetermined DC voltage. Examples of the positive DC power supply unit DCp and the negative DC power supply unit DCn include a capacitor, a DC/DC converter, a rectifier device, a rechargeable battery, and the like. Here, each of the positive DC power supply unit DCp and the negative DC power supply unit DCn includes a capacitor. In this case, a DC power supply device (not illustrated) that charges the pair of capacitors is provided in the preceding stage of the pair of capacitors.

<Three-Phase Inverter Device INV>

The three-phase inverter device INV includes a three-phase four-wired inverter. The three-phase four-wired inverter only needs to be of a three-phase four-wired type, and the configuration of the inverter unit (switching unit) is not particularly limited. The three-phase four-wired inverter includes, for example, the U-phase inverter unit INVu including a half bridge configuration, the V-phase inverter unit INVv including a half bridge configuration, and the W-phase inverter unit INVw including a half bridge configuration. Because the three-phase four-wired inverter of half bridge type is well known, the description thereof will be made briefly below.

The U-phase inverter unit INVu includes two switching elements Q1$u$, Q2$u$ connected in half bridge. In the U-phase inverter unit INVu, the positive input terminal is connected to the positive terminal of the positive DC power supply unit DCp, and the negative input terminal is connected to the negative terminal of the negative DC power supply unit DCn. The U-phase positive phase pulse modulation signal Spup and the U-phase opposite phase pulse modulation signal Spuo constituting the U-phase pulse modulation signal Spu from the pulse modulation signal generation circuit 4 are input to the switching element Q1$u$ and the switching element Q2$u$, respectively. The U-phase inverter unit INVu alternately turns on and off the switching element Q1$u$ following the U-phase positive phase pulse modulation signal Spup and the switching element Q2$u$ following the U-phase opposite phase pulse modulation signal Spuo, thereby generating, by using a predetermined DC voltage from the positive DC power supply unit DCp and the negative DC power supply unit DCn, the internal U-phase voltage Viu having a phase, a frequency, and an amplitude corresponding to the phase command value Cphu and the amplitude command value Camu of the U-phase of a predetermined zero-phase-containing unbalanced three-phase voltage, and outputs the internal U-phase voltage Viu from an output terminal.

The V-phase inverter unit INVv includes two switching elements Q1$v$, Q2$v$ connected in half bridge. In the V-phase inverter unit INVv, the positive input terminal is connected to the positive terminal of the positive DC power supply unit DCp, and the negative input terminal is connected to the negative terminal of the negative DC power supply unit DCn. The V-phase positive phase pulse modulation signal Spvp and the V-phase opposite phase pulse modulation signal Spvo constituting the V-phase pulse modulation signal Spv from the pulse modulation signal generation circuit 4 are input to the switching element Q1$v$ and the switching element Q2$v$, respectively. The V-phase inverter unit INVv alternately turns on and off the switching element Q1$v$ following the V-phase positive phase pulse modulation signal Spvp and the switching element Q2$v$ following the V-phase opposite phase pulse modulation signal Spvo, thereby generating, by using a predetermined DC voltage from the positive DC power supply unit DCp and the negative DC power supply unit DCn, the internal V-phase voltage Viv having a phase, a frequency, and an amplitude corresponding to the phase command value Cphv and the amplitude command value Camv of the V-phase of a predetermined zero-phase-containing unbalanced three-phase voltage, and outputs the internal V-phase voltage Viv from an output terminal.

The W-phase inverter unit INVw includes two switching elements Q1$w$, Q2$w$ connected in half bridge. In the W-phase inverter unit INVw, the positive input terminal is connected to the positive terminal of the positive DC power supply unit DCp, and the negative input terminal is connected to the negative terminal of the negative DC power supply unit DCn. The W-phase positive phase pulse modulation signal Spwp and the W-phase opposite phase pulse modulation signal Spwo constituting the W-phase pulse modulation signal Spw from the pulse modulation signal generation circuit 4 are input to the switching element Q1$w$ and the switching element Q2$w$, respectively. The W-phase inverter unit INVw alternately turns on and off the switching element Q1$w$ following the W-phase positive phase pulse modulation signal Spwp and the switching element Q2$w$ following the W-phase opposite phase pulse modulation signal Spwo, thereby generating, by using a predetermined DC voltage from the positive DC power supply unit DCp and the negative DC power supply unit DCn, the internal W-phase voltage Viw having a phase, a frequency, and an amplitude corresponding to the phase command value Cphw and the amplitude command value Camw of the W-phase of a predetermined zero-phase-containing unbalanced three-phase voltage, and outputs the internal W-phase voltage Viw from an output terminal.

In this manner, the U-phase inverter unit INVu, the V-phase inverter unit INVv, and the W-phase inverter unit INVw output the internal zero-phase-containing unbalanced three-phase voltage Vubi including the internal U-phase voltage Viu, the internal V-phase voltage Viv, and the internal W-phase voltage Viw as the U-phase voltage, the V-phase voltage, and the W-phase voltage, respectively.

<Three-Phase Transformation Device T>

Because the three-phase transformation device T of the third zero-phase output configuration is similar to the three-phase transformation device T of the first zero-phase output configuration, only the points in the three-phase transformation device T of the third zero-phase output configuration that are different from the three-phase transformation device T of the first zero-phase output configuration will be described.

In the third zero-phase output configuration, the primary winding Wuf of the U-phase transformer is connected to the output terminal of the U-phase inverter unit INVu via the low-pass filter Flu. The primary winding Wvf of the V-phase transformer is connected to the output terminal of the V-phase inverter unit INVv via the low-pass filter Flv. The primary winding Wwf of the W-phase transformer is connected to the output terminal of the W-phase inverter unit INVw via the low-pass filter Flw.

The primary winding Wuf of the U-phase transformer, the primary winding Wvf of the V-phase transformer, and the primary winding Wwf of the W-phase transformer are connected in Y-connection at a primary winding neutral point Nf. The primary winding neutral point Nf is connected to the power supply neutral point Ndc by, for example, a neutral line Wn. Note that the primary winding neutral point Nf and the power supply neutral point Ndc may be grounded, so that the primary winding neutral point Nf is connected to the power supply neutral point Ndc. With this configuration, the U-phase inverter unit INVu, the V-phase inverter unit INVv, and the W-phase inverter unit INVw of the three-phase four-wired inverter are connected in Y-connection at the power supply neutral point Ndc via the common positive DC power supply unit DCp and negative DC power supply unit DCn, and the U-phase inverter unit INVu, the V-phase inverter unit INVv, and the W-phase inverter unit INVw, which are connected in Y-connection, and the positive DC power supply unit DCp and the negative DC power supply unit DCn are connected in Y-Y connection to the U-phase transformer, the V-phase transformer, and the W-phase transformer, which are connected in Y-connection, of the three-phase transformer unit.

The secondary winding Wus of the U-phase transformer, the secondary winding Wvs of the V-phase transformer, and the secondary winding Wws of the W-phase transformer are connected in Y-connection at the secondary winding neutral point Ns.

In the three-phase transformer unit, the internal U-phase voltage Viu, the internal V-phase voltage Viv, and the internal W-phase voltage Viw of the internal zero-phase-containing unbalanced three-phase voltage Vubi from the three-phase four-wired inverter are input to the primary winding Wuf of the U-phase transformer, the primary winding Wvf of the V-phase transformer, and the primary winding Wwf of the W-phase transformer, respectively, and also, the external zero-phase-containing unbalanced three-phase voltage Vubo is generated, the external zero-phase-containing unbalanced three-phase voltage Vubo including the external U-phase voltage Vou, the external V-phase voltage Vov, and the external W-phase voltage Vow obtained by converting the internal U-phase voltage Viu, the internal V-phase voltage Viv, and the internal W-phase voltage Viw according to a predetermined winding number ratio, respectively, in the secondary winding Wus of the U-phase winding part Tu, the secondary winding Wvs of the V-phase winding part Tv, and the secondary winding Wws of the W-phase winding part Tw. Then, this external zero-phase-containing unbalanced three-phase voltage Vubo is output by the secondary winding Wus of the U-phase transformer, the secondary winding Wvs of the V-phase transformer, and the secondary winding Wws of the W-phase transformer, which are connected in Y-connection, and the secondary winding neutral point Ns, of the three-phase transformer unit.

<Elements Other than Third Zero-Phase Output Configuration>

*Low-Pass Filter*

Here, the low-pass filter is configured into the form of the "primary-side control". The low-pass filter Flu of the U-phase is disposed between the primary winding Wuf of the U-phase transformer and the output terminal of the U-phase inverter unit INVu. The low-pass filter Flv of the V-phase is disposed between the primary winding Wvf of the V-phase transformer and the output terminal of the V-phase inverter unit INVv. The low-pass filter Flw of the W-phase is disposed between the primary winding Wwf of the W-phase transformer and the output terminal of the W-phase inverter unit INVw. The low-pass filter may be configured into the form of the "secondary-side control".

*Voltage Sensor Unit SEv*

Because the voltage sensor unit SEv of the main circuit 2A including the third zero-phase output configuration is the same as the voltage sensor unit SEv of the main circuit 2A including the first zero-phase output configuration, the description thereof will be omitted.

Action and Effect

According to this third zero-phase output configuration, the U-phase inverter unit INVu, the V-phase inverter unit INVv, and the W-phase inverter unit INVw connected in Y-connection, and the positive DC power supply unit DCp and the negative DC power supply unit DCn are connected in Y-Y connection to the U-phase transformer, the V-phase transformer, and the W-phase transformer of the three-phase transformer unit connected in Y-connection. Therefore, the internal zero-phase-containing unbalanced three-phase voltage Vubi output from the U-phase inverter unit INVu, the V-phase inverter unit INVv, and the W-phase inverter unit INVw of the three-phase four-wired inverter is applied to the primary windings Wuf to Wwf of the U-phase transformer, the V-phase transformer, and the W-phase transformer of the three-phase transformer unit, and the current of a zero-phase component of the internal zero-phase-containing unbalanced three-phase voltage Vubi flows through a current path between the primary winding neutral point Nf and the power supply neutral point Ndc. In addition, because the secondary windings Wus to Wws of the U-phase transformer, the V-phase transformer, and the W-phase transformer of the three-phase transformer unit are connected in Y-connection, the external zero-phase-containing unbalanced three-phase voltage Vubo obtained by converting the internal zero-phase-containing unbalanced three-phase voltage Vubi according to the winding number ratio is output by the secondary windings Wus to Wws and the secondary winding neutral point Ns, which are connected in Y-connection, of the U-phase transformer, the V-phase transformer, and the W-phase transformer. As a result, a combination of the DC power supply DC, the three-phase inverter device INV, and the three-phase transformation device T can be suitably constructed, the combination enabling output of the zero-phase component of the external zero-phase-containing unbalanced three-phase voltage Vubo.

<<Main Circuit 2A Including Fourth Zero-Phase Output Configuration>>

Figure 5:
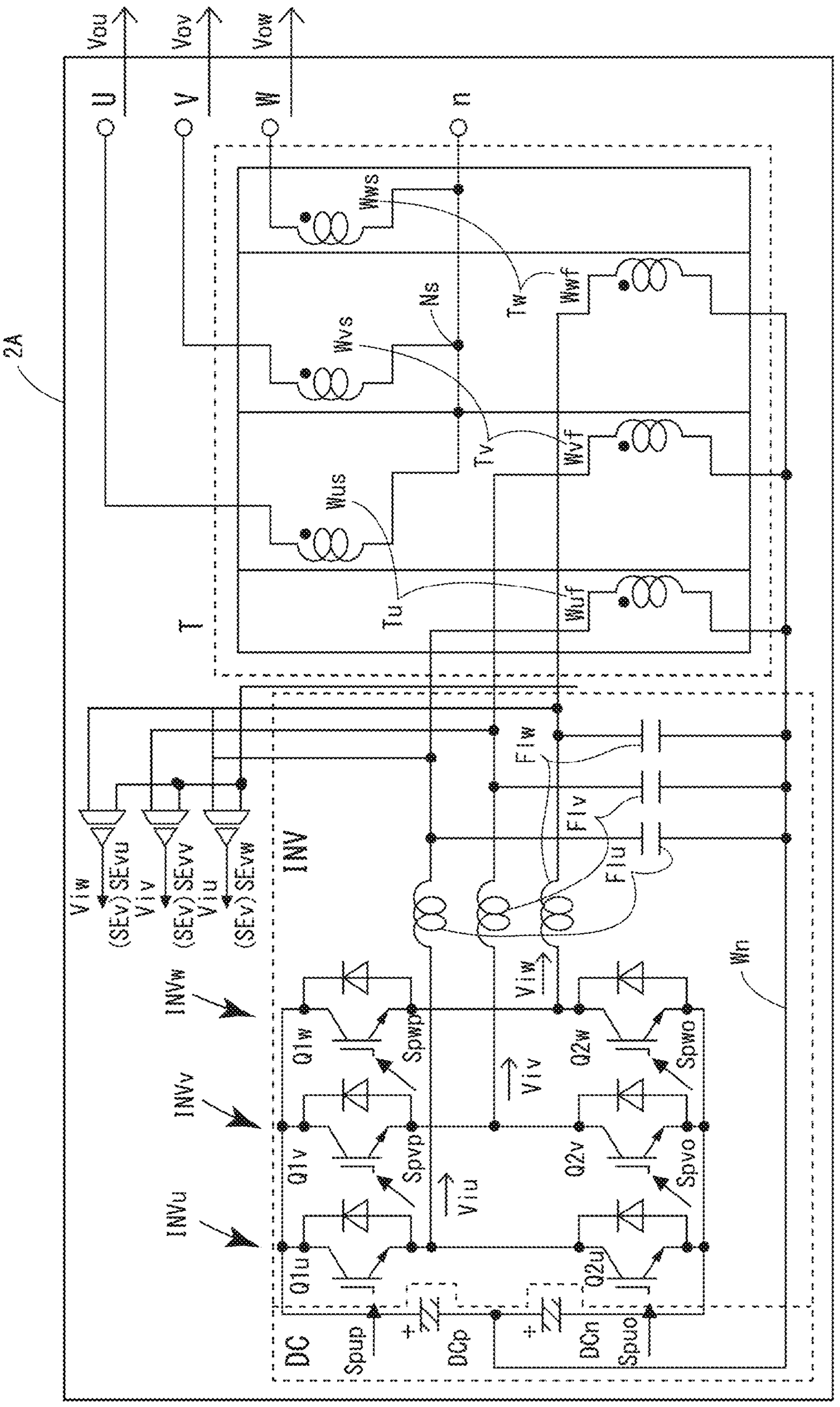
FIG. 5 is a circuit diagram illustrating details of a main circuit in FIG. 1 including a fourth zero-phase output configuration.

FIG. 5 is a circuit diagram illustrating details of the main circuit 2A in FIG. 1 including the fourth zero-phase output configuration. Hereinafter, the contents of the main circuit 2A including the fourth zero-phase output configuration will be described with reference to FIG. 5.

<DC Power Supply DC>

Because the DC power supply DC of the fourth zero-phase output configuration is the same as the DC power supply DC of the third zero-phase output configuration, the description thereof will be omitted.

<Three-Phase Inverter Device INV>

Because the three-phase inverter device INV of the fourth zero-phase output configuration is the same as the three-phase inverter device INV of the third zero-phase output configuration, the description thereof will be omitted.

<Three-Phase Transformation Device T>

Because the three-phase transformation device T of the fourth zero-phase output configuration is similar to the three-phase transformation device T of the second zero-phase output configuration, only the points in the three-phase transformation device T of the fourth zero-phase output configuration that are different from the three-phase transformation device T of the second zero-phase output configuration will be described.

In the fourth zero-phase output configuration, the primary winding Wuf of the U-phase winding part Tu is connected to the output terminal of the U-phase inverter unit INVu via the low-pass filter Flu. The primary winding Wvf of the V-phase winding part Tv is connected to the output terminal of the V-phase inverter unit INVv via the low-pass filter Flv. The primary winding Wwf of the W-phase winding part Tw is connected to the output terminal of the W-phase inverter unit INVw via the low-pass filter Flw.

The primary winding Wuf of the U-phase winding part Tu, the primary winding Wvf of the V-phase winding part Tv, and the primary winding Wwf of the W-phase winding part Tw of the three-phase five-legged iron core transformer are connected in Y-connection at the primary winding neutral point Nf. The primary winding neutral point Nf is connected to the power supply neutral point Ndc by, for example, a neutral line Wn. Note that the primary winding neutral point Nf and the power supply neutral point Ndc may be grounded, so that the primary winding neutral point Nf is connected to the power supply neutral point Ndc. With this configuration, the U-phase inverter unit INVu, the V-phase inverter unit INVv, and the W-phase inverter unit INVw of the three-phase four-wired inverter are connected in Y-connection at the power supply neutral point Ndc via the common positive DC power supply unit DCp and negative DC power supply unit DCn, and the U-phase inverter unit INVu, the V-phase inverter unit INVv, and the W-phase inverter unit INVw, which are connected in Y-connection, and the positive DC power supply unit DCp and the negative DC power supply unit DCn are connected in Y-Y connection to the U-phase winding part Tu, the V-phase winding part Tv, and the W-phase winding part Tw, which are connected in Y-connection, of the three-phase five-legged iron core transformer.

The secondary winding Wus of the U-phase winding part Tu, the secondary winding Wvs of the V-phase winding part Tv, and the secondary winding Wws of the W-phase winding part Tw are connected in Y-connection at the secondary winding neutral point Ns.

In the three-phase five-legged iron core transformer, the internal U-phase voltage Viu, the internal V-phase voltage Viv, and the internal W-phase voltage Viw of the internal zero-phase-containing unbalanced three-phase voltage Vubi from the three-phase four-wired inverter are input to the primary winding Wuf of the U-phase winding part Tu, the primary winding Wvf of the V-phase winding part Tv, and the primary winding Wwf of the W-phase winding part Tw, respectively, and also, the external zero-phase-containing unbalanced three-phase voltage Vubo is generated, the external zero-phase-containing unbalanced three-phase voltage Vubo including the external U-phase voltage Vou, the external V-phase voltage Vov, and the external W-phase voltage Vow obtained by converting the internal U-phase voltage Viu, the internal V-phase voltage Viv, and the internal W-phase voltage Viw according to a predetermined winding number ratio, respectively, in the secondary winding Wus of the U-phase winding part Tu, the secondary winding Wvs of the V-phase winding part Tv, and the secondary winding Wws of the W-phase winding part Tw. Then, the external zero-phase-containing unbalanced three-phase voltage Vubo is output by the secondary winding Wus of the U-phase winding part Tu, the secondary winding Wvs of the V-phase winding part Tv, and the secondary winding Wws of the W-phase winding part Tw, which are connected in Y-connection, and the secondary winding neutral point Ns, of the three-phase five-legged iron core transformer.

<Elements Other than Fourth Zero-Phase Output Configuration>

*Low-Pass Filter*

Here, the low-pass filter is configured into the form of the "primary-side control". The low-pass filter Flu of the U-phase is disposed between the primary winding Wuf of the U-phase winding part Tu and the output terminal of the U-phase inverter unit INVu. The low-pass filter Flv of the V-phase is disposed between the primary winding Wvf of the V-phase winding part Tv and the output terminal of the V-phase inverter unit INVv. The low-pass filter Flw of the W-phase is disposed between the primary winding Wwf of the W-phase winding part Tw and the output terminal of the W-phase inverter unit INVw. The low-pass filter may be configured into the form of the "secondary-side control".

*Voltage Sensor Unit SEv* Because the voltage sensor unit SEv of the main circuit 2A including the fourth zero-phase output configuration is the same as the voltage sensor unit SEv of the main circuit 2A including the second zero-phase output configuration, the description thereof will be omitted.

Action and Effect

According to this fourth zero-phase output configuration, the U-phase inverter unit INVu, the V-phase inverter unit INVv, and the W-phase inverter unit INVw connected in Y-connection, and the positive DC power supply unit DCp and the negative DC power supply unit DCn are connected in Y-Y connection to the U-phase winding part Tu, the V-phase winding part Tv, and the W-phase winding part Tw of the three-phase five-legged iron core transformer connected in Y-connection. Therefore, the internal zero-phase-containing unbalanced three-phase voltage Vubi output from the U-phase inverter unit INVu, the V-phase inverter unit INVv, and the W-phase inverter unit INVw of the three-phase four-wired inverter is applied to the primary windings Wuf to Wwf of the U-phase winding part Tu, the V-phase winding part Tv, and the W-phase winding part Tw of the three-phase five-legged iron core transformer, and the current of a zero-phase component of the internal zero-phase-containing unbalanced three-phase voltage Vubi flows through a current path between the primary winding neutral point Nf and the power supply neutral point Ndc. In addition, because the secondary windings Wus to Wws of the U-phase winding part Tu, the V-phase winding part Tv, and the W-phase winding part Tw are connected in Y-connection, the external zero-phase-containing unbalanced three-phase voltage Vubo obtained by converting the internal zero-phase-containing unbalanced three-phase voltage Vubi according to the winding number ratio is output by the secondary windings Wus to Wws of the U-phase winding part Tu, the V-phase winding part Tv, and the W-phase winding part Tw, which are connected in Y-connection, and the secondary winding neutral point Ns. In this case, the zero-phase magnetic flux passes through the pair of magnetic leakage legs. As a result, a combination of the DC power supply DC, the three-phase inverter device INV, and the three-phase transformation device T can be suitably constructed, the combination enabling output of the zero-phase component of the external zero-phase-containing unbalanced three-phase voltage Vubo.

{Control Circuit 1A}

Figure 6:
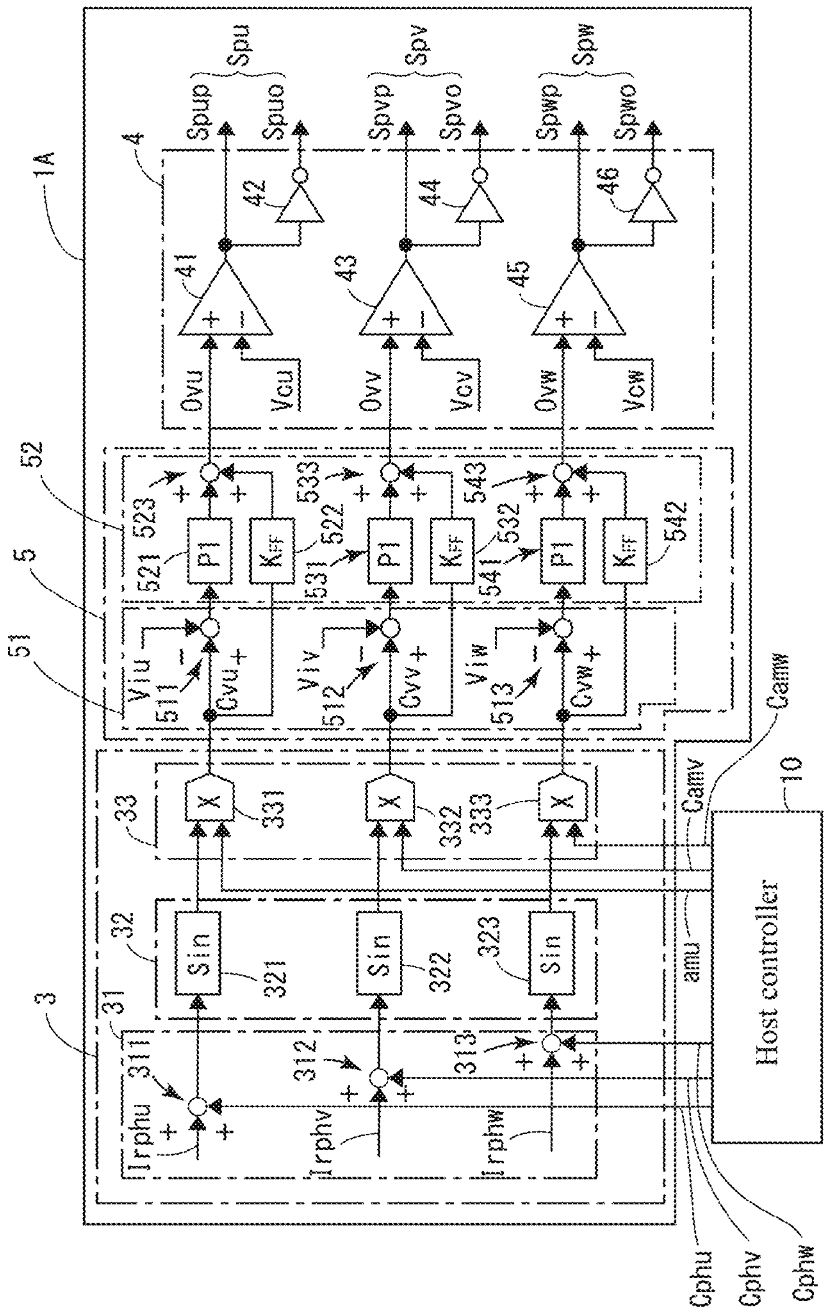
FIG. 6 is a circuit diagram illustrating an example of a configuration of a control circuit in FIG. 1.

FIG. 6 is a circuit diagram illustrating an example of a configuration of the control circuit 1A in FIG. 1. Referring to FIG. 6, the control circuit 1A is configured to feedback-control the internal zero-phase-containing unbalanced three-phase voltage Vubi. Note that the control circuit 1A may be configured to feedforward control.

Specifically, the control circuit 1A includes the voltage command generation unit 3, the voltage feedback control unit 5, and the pulse modulation signal generation circuit 4. Hereinafter, these elements will be described in detail in order.

<Voltage Command Generation Unit 3>

The voltage command generation unit 3 includes a phase command value generation unit 31, a three-phase sine wave generation unit 32, and a voltage command amplitude determination unit 33.

The phase command value generation unit 31 receives the U-phase phase command value Cphu, the V-phase phase command value Cphv, and the W-phase phase command value Cphw of the predetermined zero-phase-containing unbalanced three-phase voltage from a host controller 10. In addition, the phase command value generation unit 31 receives phase information IFrphu of a U-phase reference internal sine wave, phase information IFrphv of a V-phase reference internal sine wave, and phase information IFrphw of a W-phase reference internal sine wave, which are generated by a reference internal three-phase sine wave generation unit (not illustrated) of the unbalanced three-phase power supply device 100.

The reference internal three-phase sine wave generation unit generates a reference internal sine wave of each phase and extracts a phase of the reference internal sine wave of each phase on the basis of the internal zero-phase-containing unbalanced three-phase voltage Vubi detected by the voltage sensor unit SEv. Because these processes can be performed by a known method using a phase locked loop (PLL), the description thereof will be omitted.

The phase command value generation unit 31 adds the U-phase phase command value Cphu, the V-phase phase command value Cphv, and the W-phase phase command value Cphw to the phase information IFrphu of the U-phase reference internal sine wave, the phase information IFrphv of the V-phase reference internal sine wave, and the phase information IFrphw of the W-phase reference internal sine wave by using a U-phase adder 311, a V-phase adder 312, and a W-phase adder 313, respectively, and outputs the U-phase phase command value, the V-phase phase command value, and the W-phase phase command value obtained by the addition. At this time, the phase command value generation unit 31 outputs the U-phase phase command value, the V-phase phase command value, and the W-phase phase command value at a predetermined timing, that is, at a time point when a predetermined time has elapsed from a predetermined reference time. Note that the host controller 10 will be described later.

The three-phase sine wave generation unit 32 includes a U-phase sin table 321, a V-phase sin table 322, and a W-phase sin table 323. The sin table is a table (graph) indicating a relationship (function) in which a frequency of a sine wave (sin wave) is proportional to time in a two-axis orthogonal coordinate system in which one axis represents an elapsed time from the predetermined reference time and the other axis represents the frequency of the sine wave. When the U-phase phase command value, the V-phase phase command value, and the W-phase phase command value are input from the phase command value generation unit 31, the three-phase sine wave generation unit 32 identifies each input timing, that is, the elapsed time from the predetermined reference time until each of the U-phase phase command value, the V-phase phase command value, and the W-phase phase command value is input, and collates the input timing of the U-phase phase command value, the input timing of the V-phase phase command value, and the input timing of the W-phase phase command value, which are identified, with the U-phase sin table 321, the V-phase sin table 322, and the W-phase sin table 323, respectively. The three-phase sine wave generation unit 32 determines frequencies corresponding to the input timing of the U-phase phase command value, the input timing of the V-phase phase command value, and the input timing of the W-phase phase command value as the frequency of the U-phase sine wave, the frequency of the V-phase sine wave, and the frequency of the W-phase sine wave, respectively, in the U-phase sin table 321, the V-phase sin table 322, and the W-phase sin table 323. In addition, the three-phase sine wave generation unit 32 determines the phases respectively indicated by the U-phase phase command value, the V-phase phase command value, and the W-phase phase command value as the phase of the U-phase sine wave, the phase of the V-phase sine wave, and the phase of the W-phase sine wave. In this manner, the three-phase sine wave generation unit 32 generates the U-phase sine wave, the V-phase sine wave, and the W-phase sine wave having the frequencies, the phases, and the reference amplitudes respectively corresponding to the U-phase phase command value, the V-phase phase command value, and the W-phase phase command value.

The voltage command amplitude determination unit 33 receives the U-phase amplitude command value Camu, the V-phase amplitude command value Camv, and the W-phase amplitude command value Camw of the predetermined zero-phase-containing unbalanced three-phase voltage from the host controller 10. By using a U-phase multiplier 331, a V-phase multiplier 332, and a W-phase multiplier 333, the voltage command amplitude determination unit 33 determines the amplitude of the U-phase sine wave, the amplitude of the V-phase sine wave, and the amplitude of the W-phase sine wave by multiplying an amplitude value of the U-phase sine wave, an amplitude value of the V-phase sine wave, and an amplitude value of the W-phase sine wave, which are generated by the three-phase sine wave generation unit 32 by the U-phase, V-phase, and W-phase amplitude command values of the predetermined zero-phase-containing unbalanced three-phase voltage, respectively, to generate the U-phase voltage command Cvu, the V-phase voltage command Cvv, and the W-phase voltage command Cvw.

<Voltage Feedback Control Unit 5>

The voltage feedback control unit 5 includes a voltage error generation unit 51 and a voltage compensation unit 52.

To the voltage error generation unit 51, the internal U-phase voltage Viu, the internal V-phase voltage Viv, and the internal W-phase voltage Viw of the internal zero-phase-containing unbalanced three-phase voltage Vubi detected by the voltage sensor unit SEv are input. By using a U-phase subtractor 511, a V-phase subtractor 512, and a W-phase subtractor 513, the voltage error generation unit 51 generates a U-phase voltage error, a V-phase voltage error, and a W-phase voltage error that are errors of the internal U-phase voltage Viu, the internal V-phase voltage Viv, and the internal W-phase voltage Viw of the internal zero-phase-containing unbalanced three-phase voltage Vubi with respect to the U-phase voltage command Cvu, the V-phase voltage command Cvv, and the W-phase voltage command Cvw generated by the voltage command amplitude determination unit 33. Note that, in the case of the "secondary-side control", the external U-phase voltage Vou, the external V-phase voltage Vov, and the external W-phase voltage Vow of the external zero-phase-containing unbalanced three-phase voltage Vubo detected by the voltage sensor unit SEv are input to the voltage error generation unit 51, and the voltage error generation unit 51 uses the U-phase subtractor 511, the V-phase subtractor 512, and the W-phase subtractor 513 to generate the U-phase voltage error, the V-phase voltage error, and the W-phase voltage error that are errors of the external U-phase voltage Vou, the external V-phase voltage Vov, and the external W-phase voltage Vow of the external zero-phase-containing unbalanced three-phase voltage Vubo with respect to the U-phase voltage command Cvu, the V-phase voltage command Cvv, and the W-phase voltage command Cvw generated by the voltage command amplitude determination unit 33.

The voltage compensation unit 52 generates a U-phase feedback voltage manipulated variable, a V-phase feedback voltage manipulated variable, and a W-phase feedback voltage manipulated variable by applying compensation to the U-phase voltage error, the V-phase voltage error, and the W-phase voltage error generated by the voltage error generation unit 51 by a U-phase compensation unit 521, a V-phase compensation unit 531, and a W-phase compensation unit 541. Examples of the compensation of the U-phase compensation unit 521, the V-phase compensation unit 531, and the W-phase compensation unit 541 include proportional (P) compensation, proportional-integral (PI) compensation, and proportional-integral-differential (PID) compensation. In addition, in the voltage compensation unit 52, a U-phase feedforward control unit 522, a V-phase feedforward control unit 532, and a W-phase feedforward control unit 542 generate appropriate U-phase feedforward voltage manipulated variable, V-phase feedforward voltage manipulated variable, and W-phase feedforward voltage manipulated variable respectively corresponding to the U-phase voltage command Cvu, the V-phase voltage command Cvv, and the W-phase voltage command Cvw. Then, by using the U-phase adder 523, the V-phase adder 533, and the W-phase adder 543, the voltage compensation unit 52 adds the U-phase feedforward voltage manipulated variable, the V-phase feedforward voltage manipulated variable, and the W-phase feedforward voltage manipulated variable to the U-phase feedback voltage manipulated variable, the V-phase feedback voltage manipulated variable, and the W-phase feedback voltage manipulated variable, respectively, to generate the U-phase voltage manipulated variable Ovu, the V-phase voltage manipulated variable Ovv, and the W-phase voltage manipulated variable Ovw. Note that the U-phase feedforward control unit 522, the V-phase feedforward control unit 532, and the W-phase feedforward control unit 542 may be omitted. In this case, the U-phase feedback manipulated variable, the V-phase feedback manipulated variable, and the W-phase feedback manipulated variable are the U-phase voltage manipulated variable Ovu, the V-phase voltage manipulated variable Ovv, and the W-phase voltage manipulated variable Ovw, respectively.

<Pulse Modulation Signal Generation Circuit 4>

The pulse modulation signal generation circuit 4 includes a U-phase comparator 41, a U-phase inversion element 42, a V-phase comparator 43, a V-phase inversion element 44, a W-phase comparator 45, and a W-phase inversion element 46.

In the U-phase comparator 41, the U-phase voltage manipulated variable Ovu generated by the voltage compensation unit 52 is input to a non-inverting input terminal, and a triangular wave carrier signal Vcu is input to an inverting input terminal. The U-phase comparator 41 compares the U-phase voltage manipulated variable Ovu with the triangular wave carrier signal Vcu to generate the U-phase positive phase pulse modulation signal Spup which is a PWM signal corresponding to the U-phase voltage manipulated variable Ovu. The U-phase inversion element 42 inverts the U-phase positive phase pulse modulation signal Spup to generate the U-phase opposite phase pulse modulation signal Spuo. The U-phase positive phase pulse modulation signal Spup and the U-phase opposite phase pulse modulation signal Spuo constitute the U-phase pulse modulation signal Spu.

In the V-phase comparator 43, the V-phase voltage manipulated variable Ovv generated by the voltage compensation unit 52 is input to a non-inverting input terminal, and a triangular wave carrier signal Vcv is input to an inverting input terminal. The V-phase comparator 43 compares the V-phase voltage manipulated variable Ovv with the triangular wave carrier signal Vcv to generate the V-phase positive phase pulse modulation signal Spvp which is a PWM signal corresponding to the V-phase voltage manipulated variable Ovv. The V-phase inversion element 44 inverts the V-phase positive phase pulse modulation signal Spvp to generate the V-phase opposite phase pulse modulation signal Spvo. The V-phase positive phase pulse modulation signal Spvp and the V-phase opposite phase pulse modulation signal Spvo constitute the V-phase pulse modulation signal Spv.

In the W-phase comparator 45, the W-phase voltage manipulated variable Ovw generated by the voltage compensation unit 52 is input to a non-inverting input terminal, and a triangular wave carrier signal Vcw is input to an inverting input terminal. The W-phase comparator 45 compares the W-phase voltage manipulated variable Ovw with the triangular wave carrier signal Vcw to generate the W-phase positive phase pulse modulation signal Spwp which is a PWM signal corresponding to the W-phase voltage manipulated variable Ovw. The W-phase inversion element 46 inverts the W-phase positive phase pulse modulation signal Spwp to generate the W-phase opposite phase pulse modulation signal Spwo. The W-phase positive phase pulse modulation signal Spwp and the W-phase opposite phase pulse modulation signal Spwo constitute the W-phase pulse modulation signal Spw.

<Configurations of Voltage Command Generation Unit 3 and Voltage Feedback Control Unit 5>

The voltage command generation unit 3 and the voltage feedback control unit 5 can be constituted of, for example, an electronic circuit using an operational amplifier except for the three-phase sine wave generation unit 32.

In addition, the voltage command generation unit 3 and the voltage feedback control unit 5 can be configured by software. In this case, for example, an arithmetic unit including a processor and a memory is used, a predetermined program for executing the functions of the voltage command generation unit 3 and the voltage feedback control unit 5 is stored in the memory of the arithmetic unit, and the processor reads out and executes the predetermined program. Thereby, the voltage command generation unit 3 and the voltage feedback control unit 5 can be realized as functional blocks. In this case, the arithmetic unit operates as the voltage command generation unit 3 and the voltage feedback control unit 5. This arithmetic unit can be constituted of, for example, a computer, a personal computer, a microcontroller, a microprocessor (MPU), a field programmable gate array (FPGA), a programmable logic controller (PLC), or the like.

Here, the functions of the elements disclosed herein may be performed by using a circuit of a processing circuit including generic processors, dedicated processors, integrated circuits, application specific integrated circuits (ASICs), conventional circuits, and/or combinations thereof configured or programmed to perform the disclosed functions. The processor is considered a processing circuit or circuit because the processor includes transistors and other circuits. In the present disclosure, a "circuit" or "unit" is hardware that performs the recited functions or is hardware programmed to perform the recited functions. The hardware may be the hardware disclosed herein, or may be any other known hardware that is programmed or configured to perform the recited functions. In a case where the hardware is a processor that is considered to be a type of circuit, a "circuit" or a "unit" is a combination of hardware and software, and the software is used for configuring the hardware and/or the processor.

<Host Controller 10>

The host controller 10 is not particularly limited as long as the host controller can output the U-phase phase command value Cphu, the V-phase phase command value Cphv, the W-phase phase command value Cphw, the U-phase amplitude command value Camu, the V-phase amplitude command value Camv, and the W-phase amplitude command value Camw of the predetermined zero-phase-containing unbalanced three-phase voltage. The host controller 10 includes, for example, a computer, a personal computer, a microcontroller, an MPU, an FPGA, a PLC, and the like. The communication between the host controller 10 and the voltage command generation unit 3 is performed via, for example, a wired, wireless, or data-communicable network. The host controller 10 may be disposed either outside or inside the unbalanced three-phase power supply device 100.

<Operation>

The operation of the unbalanced three-phase power supply device 100 configured as described above will be described with reference to FIGS. 1 to 6. Hereinafter, a case where the control circuit 1A includes the voltage feedback control unit 5 will be described.

Referring to FIGS. 1 and 6, the voltage command generation unit 3 receives, from the host controller 10, the U-phase phase command value Cphu, the V-phase phase command value Cphv, the W-phase phase command value Cphw, the U-phase amplitude command value Camu, the V-phase amplitude command value Camv, and the W-phase amplitude command value Camw of the predetermined zero-phase-containing unbalanced three-phase voltage. The voltage command generation unit 3 generates the U-phase voltage command Cvu, the V-phase voltage command Cvv, and the W-phase voltage command Cvw having phases, frequencies, and amplitudes respectively corresponding to the received values, which are the U-phase phase command value Cphu, the V-phase phase command value Cphv, the W-phase phase command value Cphw, the U-phase amplitude command value Camu, the V-phase amplitude command value Camv, and the W-phase amplitude command value Camw of the predetermined zero-phase-containing unbalanced three-phase voltage.

The voltage feedback control unit 5 generates the U-phase voltage manipulated variable Ovu, the V-phase voltage manipulated variable Ovv, and the W-phase voltage manipulated variable Ovw based on the errors of the internal U-phase voltage Viu, the internal V-phase voltage Viv, and the internal W-phase voltage Viw of the internal zero-phase-containing unbalanced three-phase voltage Vubi with respect to the U-phase voltage command Cvu, the V-phase voltage command Cvv, and the W-phase voltage command Cvw from the voltage command generation unit 3, respectively. Note that, in the case of the "secondary-side control", the voltage feedback control unit 5 generates the U-phase voltage manipulated variable Ovu, the V-phase voltage manipulated variable Ovv, and the W-phase voltage manipulated variable Ovw based on the errors of the external U-phase voltage Vou, the external V-phase voltage Vov, and the external W-phase voltage Vow of the external zero-phase-containing unbalanced three-phase voltage Vubo with respect to the U-phase voltage command Cvu, the V-phase voltage command Cvv, and the W-phase voltage command Cvw from the voltage command generation unit 3, respectively.

The pulse modulation signal generation circuit 4 outputs the U-phase pulse modulation signal Spu, the V-phase pulse modulation signal Spv, and the W-phase pulse modulation signal Spw corresponding to the U-phase voltage manipulated variable Ovu, the V-phase voltage manipulated variable Ovv, and the W-phase voltage manipulated variable Ovw generated by the voltage feedback control unit 5.

Referring to FIGS. 1 and 2 to 5, according to the U-phase pulse modulation signal Spu, the V-phase pulse modulation signal Spv, and the W-phase pulse modulation signal Spw, respectively, from the pulse modulation signal generation circuit 4, the U-phase inverter unit INVu, the V-phase inverter unit INVv, and the W-phase inverter unit INVw of the three-phase inverter device INV generate, by using a predetermined DC voltage from the DC power supply DC, the internal U-phase voltage Viu, the internal V-phase voltage Viv, and the internal W-phase voltage Viw respectively having phases, frequencies, and amplitudes corresponding to the U-phase phase command value Cphu, the V-phase phase command value Cphv, the W-phase phase command value Cphw, the U-phase amplitude command value Camu, the V-phase amplitude command value Camv, and the W-phase amplitude command value Camw of the predetermined zero-phase-containing unbalanced three-phase voltage, respectively. With this configuration, the three-phase inverter device INV outputs the internal zero-phase-containing unbalanced three-phase voltage Vubi including the internal U-phase voltage Viu, the internal V-phase voltage Viv, and the internal W-phase voltage Viw.

In the three-phase transformation device T, the internal U-phase voltage Viu, the internal V-phase voltage Viv, and the internal W-phase voltage Viw of the internal zero-phase-containing unbalanced three-phase voltage Vubi from the three-phase inverter device INV are input to the primary winding Wuf of the U-phase winding part Tu, the primary winding Wvf of the V-phase winding part Tv, and the primary winding Wwf of the W-phase winding part Tw, respectively.

Here, because the DC power supply DC, the three-phase inverter device INV, and the three-phase transformation device T of the main circuit 2A have the forms and the mutual connection relationship in which the zero-phase component of the external zero-phase-containing unbalanced three-phase voltage Vubo obtained by converting the internal zero-phase-containing unbalanced three-phase voltage Vubi according to the winding number ratio in the three-phase transformation device T can be output, the external zero-phase-containing unbalanced three-phase voltage Vubo is output by the secondary winding Wus of the U-phase winding part Tu, the secondary winding Wvs of the V-phase winding part Tv, the secondary winding Wws of the W-phase winding part Tw, which are connected in Y-connection, and the secondary winding neutral point Ns, of the three-phase transformation device T. In addition, the internal zero-phase-containing unbalanced three-phase voltage Vubi or the external zero-phase-containing unbalanced three-phase voltage Vubo is feedback-controlled by the voltage feedback control unit 5.

Referring to FIGS. 1 and 6, according to the unbalanced three-phase power supply device 100, the phase command values Cphu, Cphv, and Cphw and the amplitude command values Camu, Camv, and Camw of the U-phase, the V-phase, and the W-phase of the received predetermined zero-phase-containing unbalanced three-phase voltage are processed independently of each other for each of the U-phase, the V-phase, and the W-phase in the unbalanced three-phase power supply device 100. Therefore, the external zero-phase-containing unbalanced three-phase voltage Vubo corresponding to the predetermined zero-phase-containing unbalanced three-phase voltage can be generated. Furthermore, the DC power supply DC, the three-phase inverter device INV, and the three-phase transformation device T have respective forms and the mutual connection relationship that enable output of the zero-phase component of the generated external zero-phase-containing unbalanced three-phase voltage Vubo. Therefore, the zero-phase component of the external zero-phase-containing unbalanced three-phase voltage Vubo can be output. Therefore, the unbalanced three-phase power supply device 100 that can output the unbalanced three-phase voltage Vubo containing the desired zero-phase component can be provided by setting a desired zero-phase-containing three-phase unbalanced voltage to the predetermined zero-phase-containing unbalanced three-phase voltage. Because the unbalanced three-phase power supply device 100 generates the unbalanced three-phase voltage Vubo containing the zero-phase component by the three-phase inverter device INV, the environment of the test using the unbalanced three-phase voltage Vubo containing the zero-phase component can be easily constructed by using the unbalanced three-phase power supply device 100.

[Simulation]

In order to confirm the action and effect of the unbalanced three-phase power supply device 100 of the first embodiment, simulation of the operation of the unbalanced three-phase power supply device 100 was performed. This simulation was performed for the first zero-phase output configuration to the fourth zero-phase output configuration of the main circuit 2A by the "primary-side control". In these simulations, as the predetermined zero-phase-containing unbalanced three-phase voltage, the phase command values Cphu, Cphv, and Cphw and the amplitude command values Camu, Camv, and Camw of the U-phase, V-phase, and W-phase of the zero-phase-containing unbalanced three-phase voltage having the waveforms illustrated in the waveform diagram in the upper part of FIG. 7 are input to the voltage command generation unit 3. In the zero-phase-containing unbalanced three-phase voltage, in a case where the amplitude of the U-phase voltage is 100%, the amplitude of the V-phase voltage is 50%, and the amplitude of the W-phase voltage is 50%. A phase difference between the voltages of the U-phase, the V-phase, and the W-phase is 120°.

Figure 8:
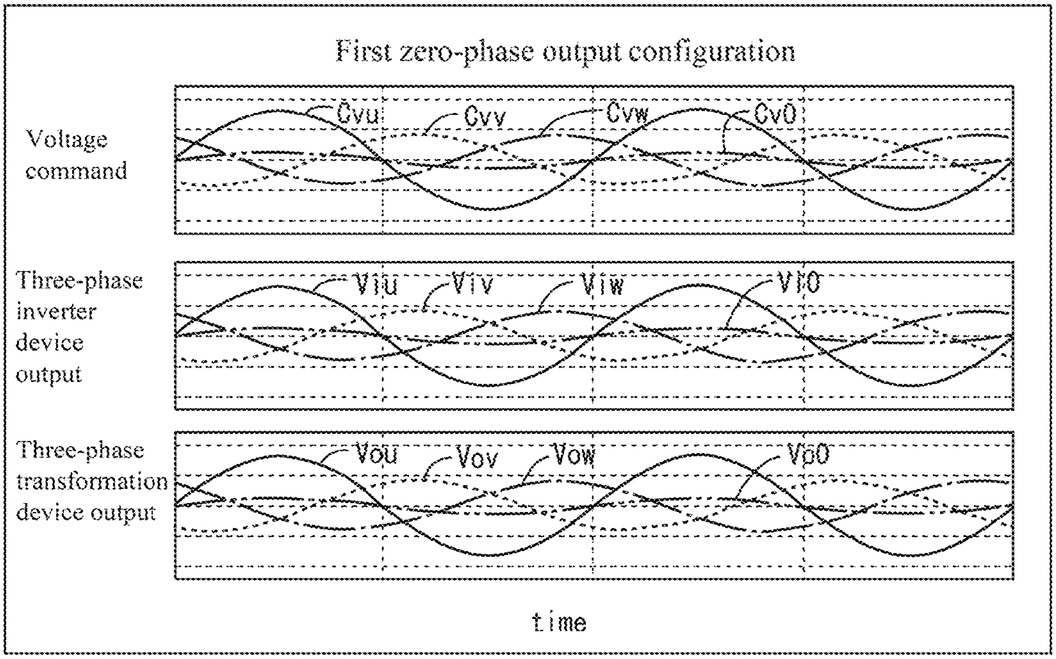
FIG. 8 is a waveform chart illustrating a waveform of a voltage of each unit of the unbalanced three-phase power supply device in a simulation of the unbalanced three-phase power supply device in which the main circuit includes the first zero-phase output configuration.
Figure 9:
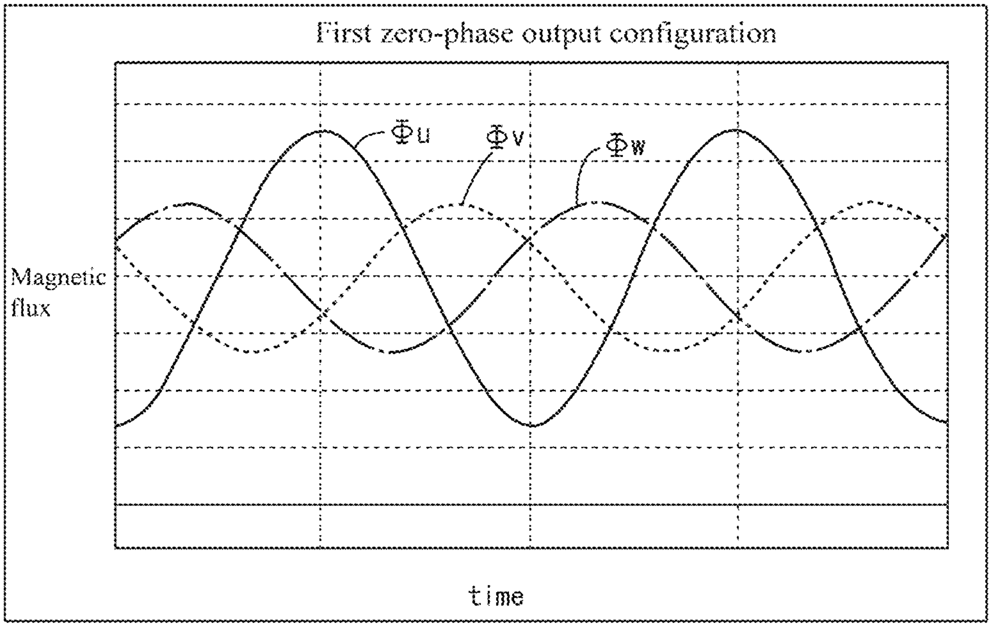
FIG. 9 is a waveform chart illustrating a waveform of a magnetic flux of a single-phase transformer of each phase of a three-phase transformer unit in a simulation of an unbalanced three-phase power supply device in which a main circuit includes the first zero-phase output configuration.
Figure 10:
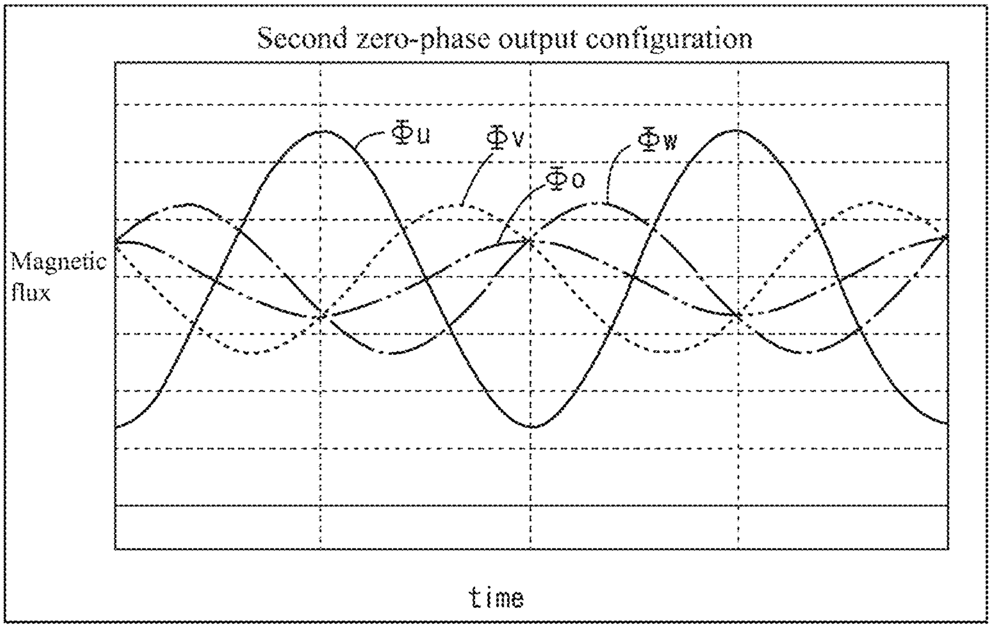
FIG. 10 is a waveform chart illustrating a waveform of a magnetic flux of each leg of the three-phase five-legged iron core transformer in a simulation of the unbalanced three-phase power supply device in which the main circuit includes the second zero-phase output configuration.
Figure 11:
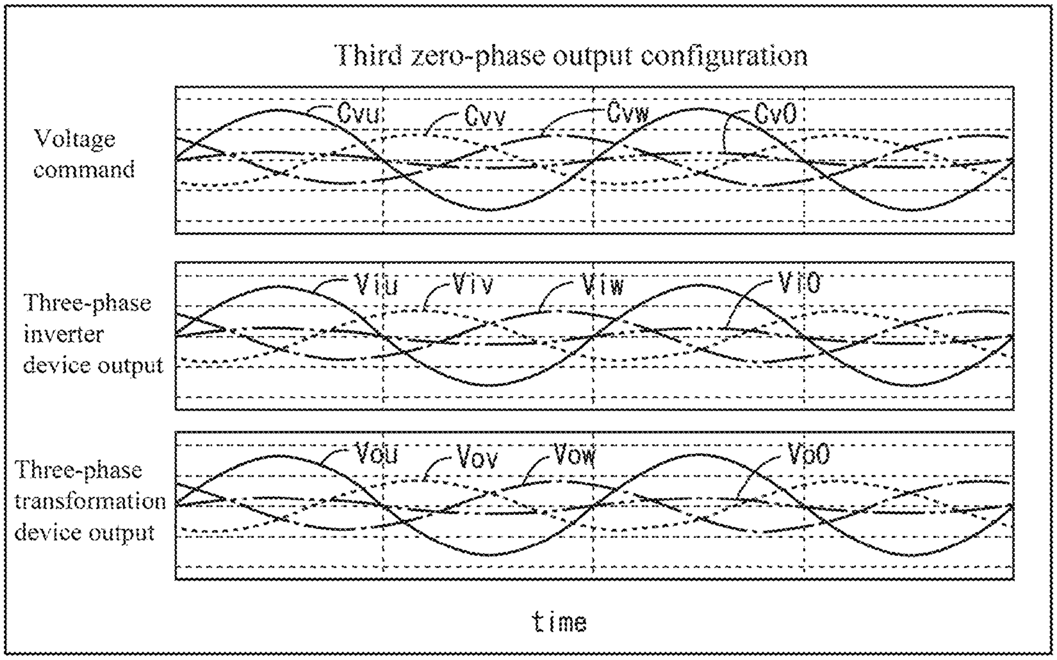
FIG. 11 is a waveform chart illustrating a waveform of a voltage of each unit of the unbalanced three-phase power supply device in a simulation of the unbalanced three-phase power supply device in which the main circuit includes the third zero-phase output configuration.

FIG. 8 is a waveform chart illustrating a waveform of a voltage of each unit of the unbalanced three-phase power supply device 100 in a simulation of the unbalanced three-phase power supply device 100 in which the main circuit 2A includes the first zero-phase output configuration. FIG. 9 is a waveform chart illustrating a waveform of a magnetic flux of a single-phase transformer of each phase of the three-phase transformer unit in a simulation of the unbalanced three-phase power supply device 100 in which the main circuit 2A includes the first zero-phase output configuration. FIG. 10 is a waveform chart illustrating a waveform of a magnetic flux of each leg of the three-phase five-legged iron core transformer in a simulation of the unbalanced three-phase power supply device in which the main circuit 2A includes the second zero-phase output configuration. FIG. 11 is a waveform chart illustrating a waveform of a voltage of each unit of the unbalanced three-phase power supply device 100 in a simulation of the unbalanced three-phase power supply device 100 in which the main circuit 2A includes the third zero-phase output configuration.

In FIGS. 8 and 11, the waveform chart in the upper part illustrates the voltage commands of the respective phases of the voltage command generation unit 3, the waveform chart in the middle part illustrates the values of the output voltages of the respective phases of the three-phase inverter device INV, and the waveform chart in the lower part illustrates the output voltages of the respective phases of the three-phase transformation device T. In each waveform diagram, a solid line indicates the voltage command Cvu or the voltage Viu or Vou of the U-phase, a broken line indicates the voltage command Cvv or the voltage Viv or Vov of the V-phase, a one-dot chain line indicates the voltage command Cvw or the voltage Viw or Vow of the W-phase, and a two-dot chain line indicates a zero-phase component Cv0 of the voltage command or a voltage Vi0 or Vo0 of the zero-phase.

In FIG. 9, a solid line indicates a magnetic flux Pu of the U-phase, a broken line indicates a magnetic flux Φv of the V-phase, and a one-dot chain line indicates a magnetic flux Φw of the W-phase. In FIG. 10, a solid line indicates the magnetic flux Pu of the U-phase, a broken line indicates the magnetic flux Φv of the V-phase, a one-dot chain line indicates the magnetic flux Pw of the W-phase, and a two-dot chain line indicates zero-phase magnetic fluxes Φ01 and Φ02.

<First Zero-Phase Output Configuration>

Referring to FIG. 8, in the first zero-phase output configuration, it can be seen that the voltage command generation unit 3 outputs the U-phase voltage command Cvu, the V-phase voltage command Cvv, and the W-phase voltage command Cvw corresponding to the predetermined zero-phase-containing unbalanced three-phase voltage, and the U-phase voltage command Cvu, the V-phase voltage command Cvv, and the W-phase voltage command Cvw include the zero-phase component Cv0. In addition, it can be seen that the three-phase inverter device INV includes the three-phase inverter unit, outputs the internal U-phase voltage Viu, the internal V-phase voltage Viv, and the internal W-phase voltage Viw corresponding to the predetermined zero-phase-containing unbalanced three-phase voltage, and these internal U-phase voltage Viu, internal V-phase voltage Viv, and internal W-phase voltage Viw include the internal zero-phase voltage Vi0. In addition, it can be seen that the three-phase transformation device T includes the three-phase transformer unit, outputs the external U-phase voltage Vou, the external V-phase voltage Vov, and the external W-phase voltage Vow, and these external U-phase voltage Vou, external V-phase voltage Vov, and external W-phase voltage Vow include the external zero-phase voltage Vo0.

Referring to FIG. 9, in the first zero-phase output configuration, it can be seen that the three-phase transformation device T including the three-phase transformer unit generates the U-phase magnetic flux Φu, the V-phase magnetic flux Φv, and the W-phase magnetic flux Φw corresponding to the predetermined zero-phase-containing unbalanced three-phase voltage. In other words, it can be seen that magnetic saturation has not occurred in the three-phase transformation device T although unbalanced three-phase magnetic fluxes containing the zero-phase component are generated.

<Second Zero-Phase Output Configuration>

In the second zero-phase output configuration, because the configuration and the operation of the three-phase inverter device INV are the same as those of the first zero-phase output configuration, the description thereof will be omitted.

Referring to FIG. 10, in the second zero-phase output configuration, it can be seen that the three-phase transformation device T includes the three-phase five-legged iron core transformer and generates the U-phase magnetic flux Φu, the V-phase magnetic flux Φv, and the W-phase magnetic flux Φw corresponding to the predetermined zero-phase-containing unbalanced three-phase voltage. In addition, it can also be seen that magnetic saturation has not occurred in the three-phase transformation device T. Furthermore, the two-dot chain line indicates the zero-phase magnetic flux Φ01 flowing to the first magnetic leakage leg at one end of the outer iron core and the zero-phase magnetic flux Φ02 flowing to the second magnetic leakage leg at the other end of the outer iron core, but the zero-phase magnetic flux Φ01 and the zero-phase magnetic flux Φ02 are indicated by one waveform (reference sign Φ0), and it can be seen that the zero-phase magnetic flux Φ01 and the zero-phase magnetic flux Φ02 flow in the same phase (in the same direction) and cancel each other.

<Third Zero-Phase Output Configuration>

Referring to FIG. 11, in the third zero-phase output configuration, it can be seen that the three-phase inverter device INV includes the three-phase inverter, outputs the internal U-phase voltage Viu, the internal V-phase voltage Viv, and the internal W-phase voltage Viw corresponding to the predetermined zero-phase-containing unbalanced three-phase voltage, and these internal U-phase voltage Viu, internal V-phase voltage Viv, and internal W-phase voltage Viw include the internal zero-phase voltage Vi0.

In the third zero-phase output configuration, because the configuration and the operation of the three-phase transformation device T are the same as those of the first zero-phase output configuration, the description thereof will be omitted.

<Fourth Zero-Phase Output Configuration>

In the fourth zero-phase output configuration, because the configuration and the operation of the three-phase inverter device INV are the same as those of the third zero-phase output configuration, the description thereof will be omitted.

In the fourth zero-phase output configuration, because the configuration and the operation of the three-phase transformation device T are the same as those of the second zero-phase output configuration, the description thereof will be omitted.

From the above simulation results, it has been confirmed that the unbalanced three-phase power supply device 100 of the first embodiment exhibits the action and effect of the present disclosure.

Second Embodiment

Figure 12:
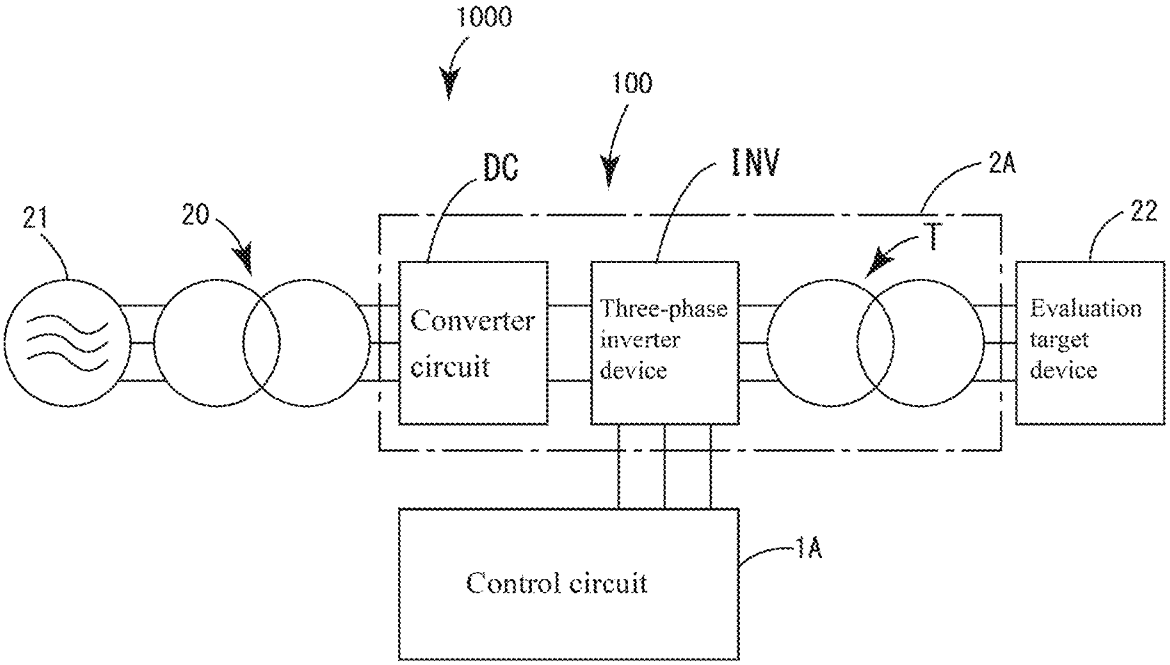
FIG. 12 is a functional block diagram illustrating an example of a configuration of a power supply for evaluation according to a second embodiment of the present disclosure.

A second embodiment of the present disclosure exemplifies a power supply for evaluation including the unbalanced three-phase power supply device 100 of the first embodiment. FIG. 12 is a functional block diagram illustrating an example of a configuration of a power supply 1000 for evaluation according to the second embodiment of the present disclosure.

Referring to FIG. 12, the power supply 1000 for evaluation includes an input-side three-phase transformer 20 and the unbalanced three-phase power supply device 100 of the first embodiment. An input terminal of the input-side three-phase transformer 20 is connected to, for example, a power system 21. In the unbalanced three-phase power supply device 100, the DC power supply DC includes a converter circuit that converts a three-phase voltage of the power system input via the input-side three-phase transformer 20 into a DC voltage. This converter circuit corresponds to the capacitor of the DC power supply DC and the DC power supply device in the preceding stage of the capacitor of the first embodiment. In addition, an evaluation target device 22 is connected to the secondary-side output terminals U, V, W, and n (see FIGS. 2 to 5) of the three-phase transformation device T.

According to the power supply 1000 for evaluation, the unbalanced three-phase power supply device 100 supplies the external zero-phase-containing unbalanced three-phase voltage Vubo corresponding to the unbalanced three-phase voltage containing the predetermined zero-phase component to the evaluation target device 22 by using the system power from the power system 21. Therefore, under a test environment that can be easily constructed, the capability of the evaluation target device 22 with respect to the unbalanced three-phase voltage containing the zero-phase component can be evaluated.

Third Embodiment

[Schematic Configuration]

Figure 13:
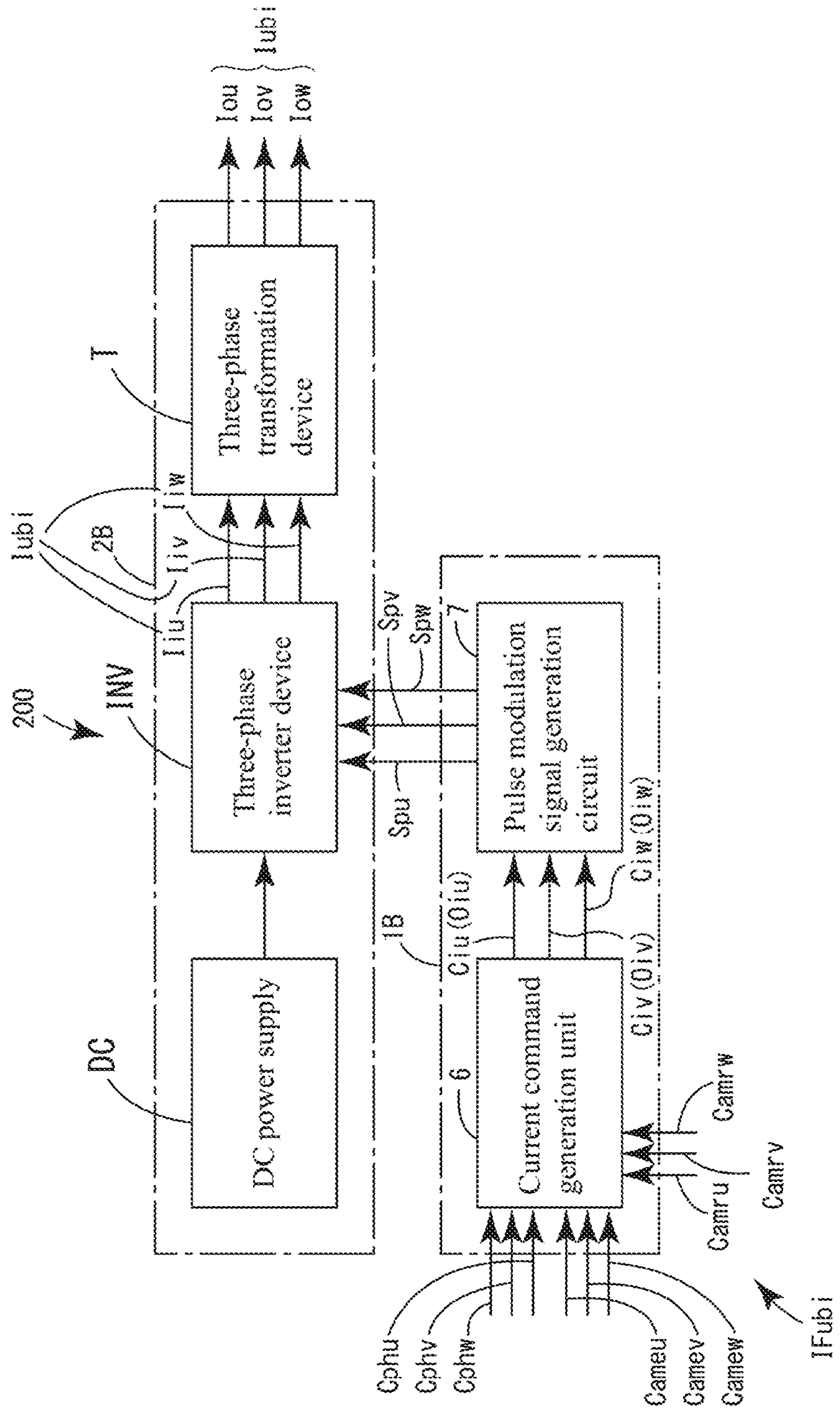
FIG. 13 is a functional block diagram illustrating an example of a configuration of an unbalanced three-phase power supply device according to a third embodiment of the present disclosure.

FIG. 13 is a functional block diagram illustrating an example of a configuration of an unbalanced three-phase power supply device 200 according to a third embodiment of the present disclosure. Referring to FIG. 13, the unbalanced three-phase power supply device 200 includes a control circuit 1B and a main circuit 2B. The control circuit 1B includes a current command generation unit 6 and a pulse modulation signal generation circuit 7. The main circuit 2B includes a DC power supply DC, a three-phase inverter device INV, and a three-phase transformation device T.

The current command generation unit 6 receives unbalanced three-phase current information IFubi including: a U-phase phase command value Cphu, a V-phase phase command value Cphv, a W-phase phase command value Cphw, a U-phase amplitude command value Camu, a V-phase amplitude command value Camv, and a W-phase amplitude command value Camw of a predetermined zero-phase-containing unbalanced three-phase current which is an unbalanced three-phase current containing a zero-phase component, and on the basis of the unbalanced three-phase current information IFubi, generates a U-phase current command Ciu, a V-phase current command Civ, and a W-phase current command Ciw having phases, frequencies, and amplitudes corresponding to the U-phase phase command value Cphu, the V-phase phase command value Cphv, the W-phase phase command value Cphw, the U-phase amplitude command value Camu, the V-phase amplitude command value Camv, and the W-phase amplitude command value Camw of the predetermined zero-phase-containing unbalanced three-phase current, respectively.

The pulse modulation signal generation circuit 7 outputs a U-phase pulse modulation signal Spu, a V-phase pulse modulation signal Spv, and a W-phase pulse modulation signal Spw corresponding to the U-phase current command Ciu, the V-phase current command Civ, and the W-phase current command Ciw, respectively, which are generated by the current command generation unit 6.

The DC power supply DC outputs a predetermined DC voltage or DC current.

The three-phase inverter device INV includes a U-phase inverter unit INVu (see FIG. 14), a V-phase inverter unit INVv (see FIG. 14), and a W-phase inverter unit INVw (see FIG. 14), and according to the U-phase pulse modulation signal Spu, the V-phase pulse modulation signal Spv, and the W-phase pulse modulation signal Spw from the pulse modulation signal generation circuit 7, and by using a predetermined DC voltage or DC current from the DC power supply DC, the U-phase inverter unit INVu, the V-phase inverter unit INVv, and the W-phase inverter unit INVw generate an internal U-phase current Iiu, an internal V-phase current Iiv, and an internal W-phase current Iiw respectively having phases, frequencies, and amplitudes corresponding to the U-phase phase command value Cphu, the V-phase phase command value Cphv, the W-phase phase command value Cphw, the U-phase amplitude command value Camu, the V-phase amplitude command value Camv, and the W-phase amplitude command value Camw of the predetermined zero-phase-containing unbalanced three-phase current, respectively. With this configuration, the three-phase inverter device INV outputs an internal zero-phase-containing unbalanced three-phase current Iubi including the internal U-phase current Iiu, the internal V-phase current Iiv, and the internal W-phase current Iiw.

Figure 14:
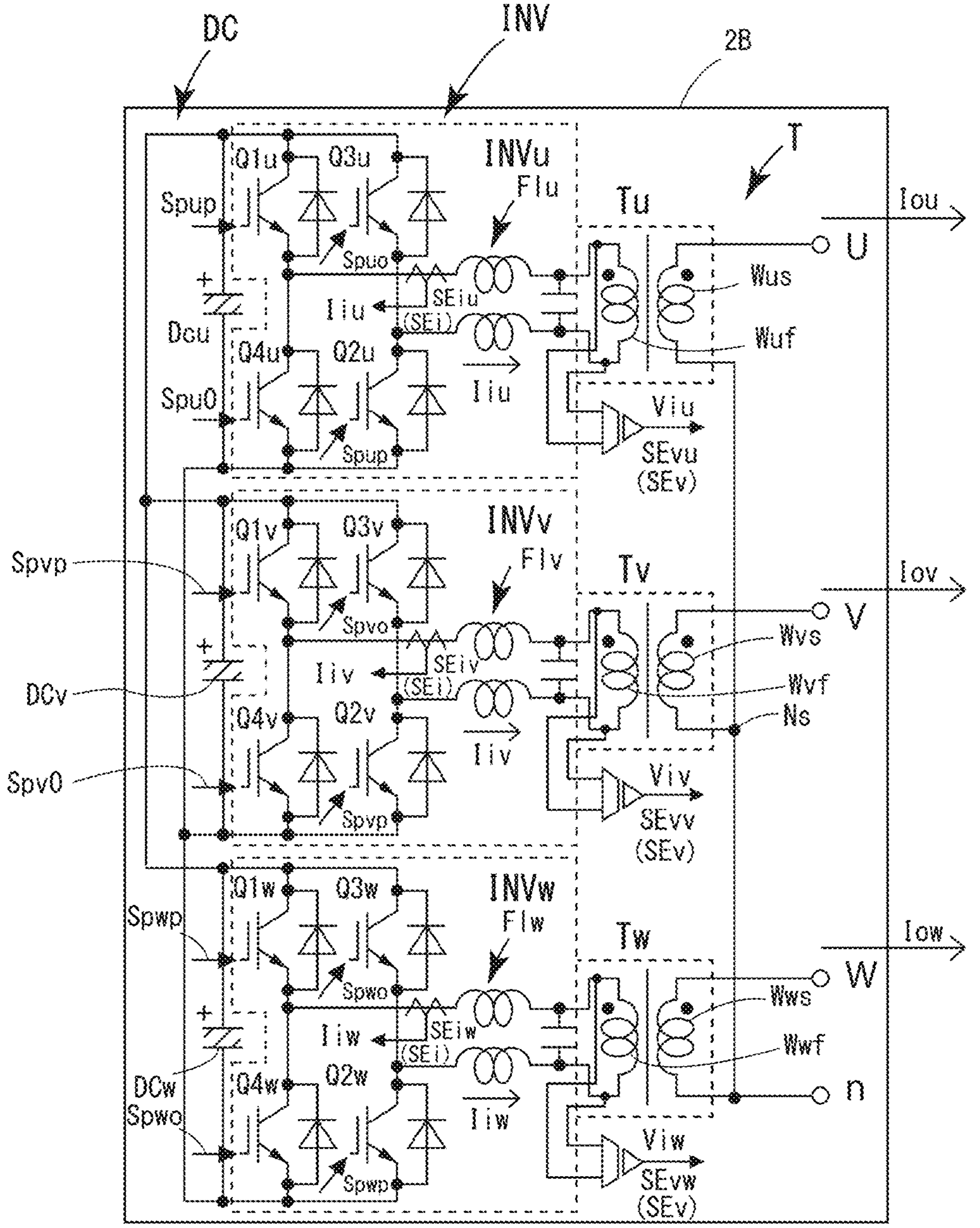
FIG. 14 is a circuit diagram illustrating details of a main circuit in FIG. 13 including a fifth zero-phase output configuration.

The three-phase transformation device T includes a U-phase winding part Tu (see FIG. 14), a V-phase winding part Tv (see FIG. 14), a W-phase winding part Tw (see FIG. 14), and a secondary winding neutral point Ns (see FIG. 14). A secondary winding Wus (see FIG. 14) of the U-phase winding part Tu, a secondary winding Wvs (see FIG. 14) of the V-phase winding part Tv, and a secondary winding Wws (see FIG. 14) of the W-phase winding part Tw are connected in Y-connection, and the secondary winding neutral point Ns is a neutral point of the Y-connection. The internal U-phase current Iiu, the internal V-phase current Iiv, and the internal W-phase current Iiw of the internal zero-phase-containing unbalanced three-phase current Iubi from the three-phase inverter device INV are input to a primary winding Wuf (see FIG. 14) of the U-phase winding part Tu, a primary winding Wvf (see FIG. 14) of the V-phase winding part Tv, and a primary winding Wwf (see FIG. 14) of the W-phase winding part Tw, respectively.

The DC power supply DC, the three-phase inverter device INV, and the three-phase transformation device T of the main circuit 2B have respective forms and the mutual connection relationship that enable output of a zero-phase component of an external zero-phase-containing unbalanced three-phase current Iubo obtained by converting, in the three-phase transformation device T, the internal zero-phase-containing unbalanced three-phase current Iubi according to the winding number ratio of the three-phase transformation device T. The external zero-phase-containing unbalanced three-phase current Iubo is output by the secondary winding Wus of the U-phase winding part Tu, the secondary winding Wvs of the V-phase winding part Tv, and the secondary winding Wws of the W-phase winding part Tw, which are connected in Y-connection, and the secondary winding neutral point Ns, of the three-phase transformation device T. The external zero-phase-containing unbalanced three-phase current Iubo includes an external U-phase current Iou, an external V-phase current Iov, and an external W-phase current Iow obtained by converting the internal U-phase current Iiu, the internal V-phase current Iiv, and the internal W-phase current Iiw of the internal zero-phase-containing unbalanced three-phase current Iubi, respectively, according to the winding number ratio.

Note that the control of the internal zero-phase-containing unbalanced three-phase current Iubi or the external zero-phase-containing unbalanced three-phase current Iubo may be either feedforward control or feedback control. The configuration in a case where the feedforward control is performed is generally as described above.

In a case where the feedback control is performed, in the control circuit 1B, a current feedback control unit 8 (see FIG. 18) is provided between the current command generation unit 6 and the pulse modulation signal generation circuit 7. The current feedback control unit 8 generates a U-phase current manipulated variable Oiu, a V-phase current manipulated variable Oiv, and a W-phase current manipulated variable Oiw based on the errors of the internal U-phase current Iiu, the internal V-phase current Iiv, and the internal W-phase current Iiw of the internal zero-phase-containing unbalanced three-phase current Iubi with respect to the U-phase current command Ciu, the V-phase current command Civ, and the W-phase current command Ciw from the current command generation unit 6, or generates the U-phase current manipulated variable Oiu, the V-phase current manipulated variable Oiv, and the W-phase current manipulated variable Oiw based on the errors of the external U-phase current Iou, the external V-phase current Iov, and the external W-phase current Iow of the external zero-phase-containing unbalanced three-phase current Iubo with respect to the U-phase current command Ciu, the V-phase current command Civ, and the W-phase current command Ciw from the current command generation unit 6. The pulse modulation signal generation circuit 7 outputs the U-phase pulse modulation signal Spu, the V-phase pulse modulation signal Spv, and the W-phase pulse modulation signal Spw corresponding to the U-phase current manipulated variable Oiu, the V-phase current manipulated variable Oiv, and the W-phase current manipulated variable Oiw generated by the current feedback control unit 8.

Detailed Configuration

Hereinafter, the detailed configuration of the unbalanced three-phase power supply device 200 will be described in order of the main circuit 2B and the control circuit 1B. Hereinafter, a circuit configuration in which the pulse modulation signal is a PWM signal will be exemplified. A circuit configuration in which the pulse modulation signal is a pulse modulation signal other than the PWM signal can also be constructed by replacing the circuit that generates the PWM signal illustrated in the pulse modulation signal generation circuit 7 in FIG. 18 with a circuit that generates a pulse modulation signal other than the PWM signal. In addition, hereinafter, the PWM signal is referred to as a pulse modulation signal which is a superordinate concept thereof.

{Main Circuit 2B}

Referring to FIGS. 13 to 17, it is required for the main circuit 2B that "the DC power supply DC, the three-phase inverter device INV, and the three-phase transformation device T have respective forms and the mutual connection relationship that enable output of a zero-phase component of the external zero-phase-containing unbalanced three-phase current Iubo obtained by converting, in the three-phase transformation device T, the internal zero-phase-containing unbalanced three-phase current Iubi according to the winding number ratio of the three-phase transformation device T". Hereinafter, this requirement is referred to as a "zero-phase outputtable requirement". The zero-phase outputtable requirement includes the following three items.

a. Each phase can be controlled individually, and a main circuit of each phase is independent of (but does not mean "insulated from") the others.

b. A transformer is independent of the others or the transformer has a five-legged iron core of the outer core type.

c. In the transformer, at least the secondary side is connected in Y-connection and has a neutral point (in general Y-Y connection, a Δ winding is necessary for suppressing the third harmonic, but is unnecessary in this case).

As the practical main circuit 2B that satisfies this zero-phase outputtable requirement, the following four types of circuit configurations have been specified.

Fifth zero-phase output configuration: Three single-phase inverters+Three single-phase transformers Sixth zero-phase output configuration: Three single-phase inverters+One three-phase five-legged iron core transformer Seventh zero-phase output configuration: One three-phase four-wired inverter+Three single-phase transformers Eighth zero-phase output configuration: One three-phase four-wired inverters+One three-phase five-legged iron core transformer Here, the following points should be noted. As is apparent from the content of the "zero-phase outputtable requirement" described above, the fifth zero-phase output configuration to the eighth zero-phase output configuration define only a combination of the DC power supply DC, the three-phase inverter device INV, and the three-phase transformation device T. On the other hand, FIGS. 13 to 17 for explaining the fifth zero-phase output configuration to the eighth zero-phase output configuration illustrate low-pass filters Flu, Flv, and Flw, a voltage sensor unit SEv, and a current sensor unit SEi in addition to the DC power supply DC, the three-phase inverter device INV, and the three-phase transformation device T. However, the low-pass filters Flu, Flv, and Flw, the voltage sensor unit SEv, and the current sensor unit SEi are elements unrelated to the "zero-phase outputtable requirement", and are not included in the fifth zero-phase output configuration to the eighth zero-phase output configuration.

The low-pass filters Flu, Flv, and Flw are provided to remove the frequency component of the carrier of the pulse modulation signal from the voltage (internal zero-phase-containing unbalanced three-phase voltage Vubi or external zero-phase-containing unbalanced three-phase voltage Vubo (see FIG. 1)) output from the three-phase inverter device INV. Each of the low-pass filters Flu, Flv, and Flw includes a reactor and a capacitor disposed on the output side of the reactor. In general, the reactor is disposed on the primary side of the three-phase transformation device T, and the capacitor is disposed on the primary side or the secondary side of the three-phase transformation device T. A configuration in which the capacitor is disposed on the primary side of the three-phase transformation device T is referred to as "primary-side control", and a configuration in which the capacitor is disposed on the secondary side of the three-phase transformation device T is referred to as "secondary-side control". However, in a case where the three-phase transformation device T is constituted by a leakage transformer, the reactor is omitted, and the capacitor is disposed on the secondary side of the three-phase transformation device T, resulting in the "secondary-side control".

The control targets of the "primary-side control" and the "secondary-side control" are voltages (internal zero-phase-containing unbalanced three-phase voltage Vubi or external zero-phase-containing unbalanced three-phase voltage Vubo) output from the three-phase inverter device INV. Therefore, in the case of the "primary-side control", the voltage sensor unit SEv is provided on the output side of the capacitor of the low-pass filter on the primary side of the three-phase transformation device T in order to detect the internal zero-phase-containing unbalanced three-phase voltage Vubi, and in the case of the "secondary-side control", the voltage sensor unit SEv is provided on the output side of the capacitor of the low-pass filter on the secondary side of the three-phase transformation device T in order to detect the external zero-phase-containing unbalanced three-phase voltage Vubo. Note that, although the voltage output from the three-phase inverter device INV is not explicitly controlled in the present third embodiment, the voltage is appropriately controlled because the voltage is used to generate the reference internal sine wave of each phase and extract the phase of the reference internal sine wave of each phase as described later.

The current sensor unit SEi is used to control the current (internal zero-phase-containing unbalanced three-phase current Iubi or external zero-phase-containing unbalanced three-phase current Iubo) output from the three-phase inverter device INV.

Hereinafter, the main circuit 2B including each of fifth zero-phase output configuration to the eighth zero-phase output configuration will be sequentially described.

<<Fifth Zero-Phase Output Configuration>>

FIG. 14 is a circuit diagram illustrating details of the main circuit 2B in FIG. 13 including the fifth zero-phase output configuration. Hereinafter, the contents of the main circuit 2B including the fifth zero-phase output configuration will be described with reference to FIG. 14.

<DC Power Supply DC>

The DC power supply DC includes a U-phase DC power supply unit DCu, a V-phase DC power supply unit DCv, and a W-phase DC power supply unit DCw, each of which outputs a predetermined DC voltage or DC current. Here, the U-phase DC power supply unit DCu, the V-phase DC power supply unit DCv, and the W-phase DC power supply unit DCw are connected in parallel to each other, but may be independent of each other. The U-phase DC power supply unit DCu, the V-phase DC power supply unit DCv, and the W-phase DC power supply unit DCw are not particularly limited as long as the power supply units are DC voltage sources that can output a predetermined DC voltage or DC current sources that can output a predetermined DC current. Examples of the U-phase DC power supply unit DCu, the V-phase DC power supply unit DCv, and the W-phase DC power supply unit DCw include a capacitor, a DC/DC converter, a rectifier device, a rechargeable battery, and the like. Here, each of the U-phase DC power supply unit DCu, the V-phase DC power supply unit DCv, and the W-phase DC power supply unit DCw includes a capacitor. In this case, a DC power supply device (not illustrated) that charges the three capacitors is provided in the preceding stage of the three capacitors.

<Three-Phase Inverter Device INV>

The three-phase inverter device INV includes the U-phase inverter unit INVu, the V-phase inverter unit INVv, and the W-phase inverter unit INVw. The three-phase inverter device INV includes a three-phase inverter unit. The three-phase inverter unit includes a single-phase U-phase inverter constituting the U-phase inverter unit INVu, a single-phase V-phase inverter constituting the V-phase inverter unit INVv, and a single-phase W-phase inverter constituting the W-phase inverter unit INVw. The single-phase U-phase inverter, the single-phase V-phase inverter, and the single-phase W-phase inverter are not particularly limited as long as the inverters can convert a DC voltage or DC current into an AC current. Each of the single-phase U-phase inverter, the single-phase V-phase inverter, and the single-phase W-phase inverter includes, for example, a full bridge inverter. Because the full bridge inverter is well known, the description thereof will be made briefly below.

The U-phase inverter includes four switching elements Q1$u$ to Q4$u$ connected in full bridge. In the U-phase inverter, an input terminal is connected to the U-phase DC power supply unit DCu. A U-phase positive phase pulse modulation signal Spup constituting the U-phase pulse modulation signal Spu from the pulse modulation signal generation circuit 7 is input to a pair of the switching element Q1$u$ and the switching element Q2$u$, and a U-phase opposite phase pulse modulation signal Spuo constituting the U-phase pulse modulation signal Spu from the pulse modulation signal generation circuit 7 is input to a pair of the switching element Q3$u$ and the switching element Q4$u$. The U-phase inverter alternately turns on and off the pair of the switching element Q1*u* and the switching element Q2*u* following the U-phase positive phase pulse modulation signal Spup and the pair of the switching element Q3*u* and the switching element Q4*u* following the U-phase opposite phase pulse modulation signal Spuo, thereby generating, by using a predetermined DC voltage or Dc current from the U-phase DC power supply unit DCu, the internal U-phase current Iiu having a phase, a frequency, and an amplitude corresponding to the phase command value Cphu and the amplitude command value Camu of the U-phase of a predetermined zero-phase-containing unbalanced three-phase current, and outputs the internal U-phase current Iiu from an output terminal.

The V-phase inverter includes four switching elements Q1*v* to Q4*v* connected in full bridge. In the V-phase inverter, an input terminal is connected to the V-phase DC power supply unit DCv. A V-phase positive phase pulse modulation signal Spvp constituting the V-phase pulse modulation signal Spv from the pulse modulation signal generation circuit 7 is input to a pair of the switching element Q1*v* and the switching element Q2*v*, and a V-phase opposite phase pulse modulation signal Spvo constituting the V-phase pulse modulation signal Spv from the pulse modulation signal generation circuit 7 is input to a pair of the switching element Q3*v* and the switching element Q4*v*. The V-phase inverter alternately turns on and off the pair of the switching element Q1*v* and the switching element Q2*v* following the V-phase positive phase pulse modulation signal Spvp and the pair of the switching element Q3*v* and the switching element Q4*v* following the V-phase opposite phase pulse modulation signal Spvo, thereby generating, by using a predetermined DC voltage or DC current from the V-phase DC power supply unit DCv, the internal V-phase current Iiv having a phase, a frequency, and an amplitude corresponding to the phase command value Cphv and the amplitude command value Camv of the V-phase of a predetermined zero-phase-containing unbalanced three-phase current, and outputs the internal V-phase current Iiv from an output terminal.

The W-phase inverter includes four switching elements Q1*w* to Q4*w* connected in full bridge. In the W-phase inverter, an input terminal is connected to the W-phase DC power supply unit DCw. A W-phase positive phase pulse modulation signal Spwp constituting the W-phase pulse modulation signal Spw from the pulse modulation signal generation circuit 7 is input to a pair of the switching element Q1*w* and the switching element Q2*w*, and a W-phase opposite phase pulse modulation signal Spwo constituting the W-phase pulse modulation signal Spw from the pulse modulation signal generation circuit 7 is input to a pair of the switching element Q3*w* and the switching element Q4*w*. The W-phase inverter alternately turns on and off the pair of the switching element Q1*w* and the switching element Q2*w* following the W-phase positive phase pulse modulation signal Spwp and the pair of the switching element Q3*w* and the switching element Q4*w* following the W-phase opposite phase pulse modulation signal Spwo, thereby generating, by using a predetermined DC voltage or DC current from the W-phase DC power supply unit DCw, the internal W-phase current Iiw having a phase, a frequency, and an amplitude corresponding to the phase command value Cphw and the amplitude command value Camw of the W-phase of a predetermined zero-phase-containing unbalanced three-phase current, and outputs the internal W-phase current Iiw from an output terminal.

In this manner, the U-phase inverter, the V-phase inverter, and the W-phase inverter output the internal zero-phase-containing unbalanced three-phase current Iubi including the internal U-phase current Iiu, the internal V-phase current Iiv, and the internal W-phase current Iiw as the U-phase current, the V-phase current, and the W-phase current, respectively.

<Three-Phase Transformation Device T>

The three-phase transformation device T includes the U-phase winding part Tu, the V-phase winding part Tv, and the W-phase winding part Tw. The U-phase winding part Tu, the V-phase winding part Tv, and the W-phase winding part Tw have a common predetermined winding number ratio. The above points are the same in the sixth zero-phase output configuration to the eighth zero-phase output configuration.

The three-phase transformation device T includes a three-phase transformer unit. The three-phase transformer unit includes a single-phase U-phase transformer constituting the U-phase winding part Tu, a single-phase V-phase transformer constituting the V-phase winding part Tv, and a single-phase W-phase transformer constituting the W-phase winding part Tw.

The primary winding Wuf of the U-phase transformer is connected to the output terminal of the U-phase inverter via the low-pass filter Flu. The primary winding Wvf of the V-phase transformer is connected to the output terminal of the V-phase inverter via the low-pass filter Flv. The primary winding Wwf of the W-phase transformer is connected to the output terminal of the W-phase inverter via the low-pass filter Flw.

The secondary winding Wus of the U-phase transformer, the secondary winding Wvs of the V-phase transformer, and the secondary winding Wws of the W-phase transformer are connected in Y-connection at the secondary winding neutral point Ns.

In the three-phase transformer unit, the internal U-phase current Iiu, the internal V-phase current Iiv, and the internal W-phase current Iiw of the internal zero-phase-containing unbalanced three-phase current Iubi from the three-phase inverter unit are input to the primary winding Wuf of the U-phase transformer, the primary winding Wvf of the V-phase transformer, and the primary winding Wwf of the W-phase transformer, respectively, and also, the external zero-phase-containing unbalanced three-phase current Iubo is generated, the external zero-phase-containing unbalanced three-phase current Iubo including the external U-phase current Iou, the external V-phase current Iov, and the external W-phase current Iow obtained by converting the internal U-phase current Iiu, the internal V-phase current Iiv, and the internal W-phase current Iiw according to a predetermined winding number ratio, respectively, in the secondary winding Wus of the U-phase winding part Tu, the secondary winding Wvs of the V-phase winding part Tv, and the secondary winding Wws of the W-phase winding part Tw. Then, this external zero-phase-containing unbalanced three-phase current Iubo is output by the secondary winding Wus of the U-phase transformer, the secondary winding Wvs of the V-phase transformer, and the secondary winding Wws of the W-phase transformer, which are connected in Y-connection, and the secondary winding neutral point Ns, of the three-phase transformer unit. Reference signs U, V, W, and n denote U-phase, V-phase, W-phase, and zero-phase output terminals on the secondary side of the three-phase transformer unit, respectively.

<Elements Other than Fifth Zero-Phase Output Configuration>

*Low-Pass Filter*

Here, the low-pass filter is configured into a form of the "primary-side control". The low-pass filter Flu of the U-phase is disposed between the output terminal of the U-phase inverter and the primary winding Wuf of the U-phase transformer. The low-pass filter Flv of the V-phase is disposed between the output terminal of the V-phase inverter and the primary winding Wvf of the V-phase transformer. The low-pass filter Flw of the W-phase is disposed between the output terminal of the W-phase inverter and the primary winding Wwf of the W-phase transformer. The low-pass filter may be configured into a form of the "secondary-side control".

*Voltage Sensor Unit SEv*

A U-phase voltage sensor SEvu that detects the internal U-phase voltage Viu is provided between both terminals of the primary winding Wuf of the U-phase transformer. A V-phase voltage sensor SEvv that detects the internal V-phase voltage Viv is provided between both terminals of the primary winding Wvf of the V-phase transformer. A W-phase voltage sensor SEvw that detects the internal W-phase voltage Viw is provided between both terminals of the primary winding Wwf of the W-phase transformer. The U-phase voltage sensor SEvu, the V-phase voltage sensor SEvv, and the W-phase voltage sensor SEvw constitute the voltage sensor unit SEv that detects the internal zero-phase-containing unbalanced three-phase voltage Vubi. Here, the voltage sensor unit SEv is provided so as to correspond to the "primary-side control". In the case of the "secondary-side control", the voltage sensor unit SEv is provided on the output side of the capacitor of the low-pass filter on the secondary side of the three-phase transformer unit. Note that, as described later, the internal zero-phase-containing unbalanced three-phase voltage Vubi detected by the voltage sensor unit SEv is used in the reference internal three-phase sine wave generation unit to generate a reference internal sine wave of each phase and extract a phase of the reference internal sine wave of each phase. This applies similarly to the sixth zero-phase output configuration to the eighth zero-phase output configuration.

*Current Sensor Unit SEi*

A U-phase current sensor SEiu that detects the internal U-phase current Iiu is provided in the wiring between the output terminal of the U-phase inverter and the low-pass filter Flu. A V-phase current sensor SEiv that detects the internal V-phase current Iiv is provided in the wiring between the output terminal of the V-phase inverter and the low-pass filter Flv. A W-phase current sensor SEiw that detects the internal W-phase current Iiw is provided in the wiring between the output terminal of the W-phase inverter and the low-pass filter Flw. The U-phase current sensor SEiu, the V-phase current sensor SEiv, and the W-phase current sensor SEiw constitute the current sensor unit SEi that detects the internal zero-phase-containing unbalanced three-phase current Iubi. Note that the current sensor unit SEi may be provided to detect the external zero-phase-containing unbalanced three-phase current Iubo.

Action and Effect

According to the fifth zero-phase output configuration, the internal zero-phase-containing unbalanced three-phase current Iubi is generated in the main circuit 2B, and the DC power supply DC corresponding to the three phases, the three inverter units INVu to INVw of the three-phase inverter device INV, and the three winding parts Tu to Tw of the three-phase transformation device are constituted of the three DC power supply units DCu to DCw of the DC power supply DC, the three single-phase inverters of the three-phase inverter unit, and the three single-phase transformers of the three-phase transformer unit, which are respectively independent of each other. Therefore, the current of the zero-phase component of the internal zero-phase-containing unbalanced three-phase current Iubi flows through the DC power supply units DCu to DCw, the single-phase inverters, the primary windings Wuf to Wwf of the single-phase transformers, correspondingly to the respective phases according to the phase currents Iiu to Iiw of the three phases which are unbalanced with each other. Then, because the secondary windings Wus to Wws of the single-phase transformers corresponding to the three phases are connected in Y-connection, the external zero-phase-containing unbalanced three-phase current Iubo obtained by converting the internal zero-phase-containing unbalanced three-phase current Iubi according to the winding number ratio is output by the secondary windings Wus to Wws, which correspond to the three phases and are connected in Y-connection, and the secondary winding neutral point Ns, of the single-phase transformer. As a result, a combination of the DC power supply DC, the three-phase inverter device INV, and the three-phase transformation device T can be suitably constructed, the combination enabling output of the zero-phase component of the external zero-phase-containing unbalanced three-phase current Iubo.

<<Sixth Zero-Phase Output Configuration>>

Figure 15:
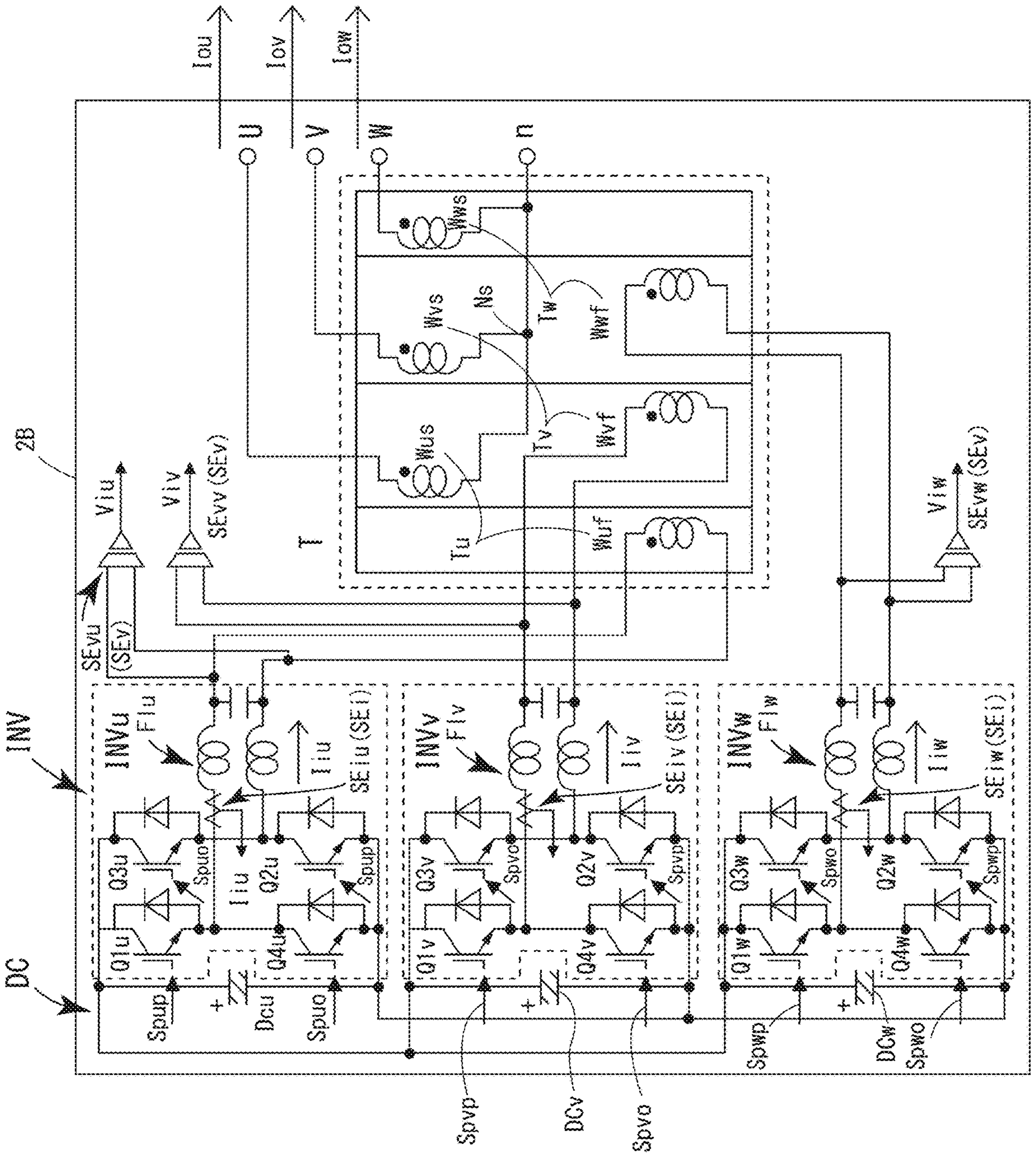
FIG. 15 is a circuit diagram illustrating details of a main circuit in FIG. 13 including a sixth zero-phase output configuration.

FIG. 15 is a circuit diagram illustrating details of the main circuit 2B in FIG. 13 including the sixth zero-phase output configuration. Hereinafter, the contents of the main circuit 2B including the sixth zero-phase output configuration will be described with reference to FIG. 15.

<DC Power Supply DC>

Because the DC power supply DC of the sixth zero-phase output configuration is the same as the DC power supply DC of the fifth zero-phase output configuration, the description thereof will be omitted.

<Three-Phase Inverter Device INV>

Because the three-phase inverter device INV of the sixth zero-phase output configuration is the same as the three-phase inverter device INV of the fifth zero-phase output configuration, the description thereof will be omitted.

<Three-Phase Transformation Device T>

The three-phase transformation device T includes a three-phase five-legged iron core transformer. The three-phase five-legged iron core transformer is well known, and thus will be briefly described. The three-phase five-legged iron core transformer includes a three-phase five-legged iron core (not illustrated) having a U-phase leg, a V-phase leg, a W-phase leg, and a pair of magnetic leakage legs provided on both sides of the U-phase leg, the V-phase leg, and the W-phase leg, the U-phase winding part Tu provided on the U-phase leg, the V-phase winding part Tv provided on the V-phase leg, and the W-phase winding part Tw provided on the W-phase leg.

The primary winding Wuf of the U-phase winding part Tu is connected to the output terminal of the U-phase inverter via the low-pass filter Flu. The primary winding Wvf of the V-phase winding part Tv is connected to the output terminal of the V-phase inverter via the low-pass filter Flv. The primary winding Wwf of the W-phase winding part Tw is connected to the output terminal of the W-phase inverter via the low-pass filter Flw.

The secondary winding Wus of the U-phase winding part Tu, the secondary winding Wvs of the V-phase winding part Tv, and the secondary winding Wws of the W-phase winding part Tw are connected in Y-connection at the secondary winding neutral point Ns.

In the three-phase five-legged iron core transformer, the internal U-phase current Iiu, the internal V-phase current Iiv, and the internal W-phase current Iiw of the internal zero-phase-containing unbalanced three-phase current Iubi from the three-phase inverter unit are input to the primary winding Wuf of the U-phase winding part Tu, the primary winding Wvf of the V-phase winding part Tv, and the primary winding Wwf of the W-phase winding part Tw, respectively, and also, the external zero-phase-containing unbalanced three-phase current Iubo is generated, the external zero-phase-containing unbalanced three-phase current Iubo including the external U-phase current Iou, the external V-phase current Iov, and the external W-phase current Iow obtained by converting the internal U-phase current Iiu, the internal V-phase current Iiv, and the internal W-phase current Iiw according to a predetermined winding number ratio, respectively, in the secondary winding Wus of the U-phase winding part Tu, the secondary winding Wvs of the V-phase winding part Tv, and the secondary winding Wws of the W-phase winding part Tw. Then, the external zero-phase-containing unbalanced three-phase current Iubo is output by the secondary winding Wus of the U-phase winding part Tu, the secondary winding Wvs of the V-phase winding part Tv, and the secondary winding Wws of the W-phase winding part Tw, which are connected in Y-connection, and the secondary winding neutral point Ns, of the three-phase five-legged iron core transformer. Reference signs U, V, W, and n denote U-phase, V-phase, W-phase, and zero-phase output terminals on the secondary side of the three-phase five-legged iron core transformer, respectively.

<Elements Other than Sixth Zero-Phase Output Configuration>

*Low-Pass Filter*

Here, the low-pass filter is configured into the form of the "primary-side control". The low-pass filter Flu of the U-phase is disposed between the output terminal of the U-phase inverter and the primary winding Wuf of the U-phase winding part Tu. The low-pass filter Flv of the V-phase is disposed between the output terminal of the V-phase inverter and the primary winding Wvf of the V-phase winding part Tv. The low-pass filter Flw of the W-phase is disposed between the output terminal of the W-phase inverter and the primary winding Wwf of the W-phase winding part Tw. The low-pass filter may be configured into the form of the "secondary-side control".

*Voltage Sensor Unit SEv*

The U-phase voltage sensor SEvu that detects the internal U-phase voltage Viu is provided between both terminals of the primary winding Wuf of the U-phase winding part Tu. The V-phase voltage sensor SEvv that detects the internal V-phase voltage Viv is provided between both terminals of the primary winding Wvf of the V-phase winding part Tv. A W-phase voltage sensor SEvw that detects the internal W-phase voltage Viw is provided between both terminals of the primary winding Wwf of the W-phase winding part Tw. The U-phase voltage sensor SEvu, the V-phase voltage sensor SEvv, and the W-phase voltage sensor SEvw constitute the voltage sensor unit SEv that detects the internal zero-phase-containing unbalanced three-phase voltage Vubi. Here, the voltage sensor unit SEv is provided so as to correspond to the "primary-side control". In the case of the "secondary-side control", the voltage sensor unit SEv is provided on the output side of the capacitor of the low-pass filter on the secondary side of the three-phase five-legged iron core transformer.

*Current Sensor Unit SEi*

Because the current sensor unit SEi of the sixth zero-phase output configuration is the same as the current sensor unit SEi of the fifth zero-phase output configuration, the description thereof will be omitted.

Action and Effect

According to the sixth zero-phase output configuration, the internal zero-phase-containing unbalanced three-phase current Iubi is generated in the main circuit 2B, and the DC power supply DC corresponding to the three phases, the three inverter units INVu to INVw of the three-phase inverter device INV, and the three winding parts Tu to Tw of the three-phase five-legged iron core transformer are constituted of the three DC power supply units DCu to DCw of the DC power supply DC, the three single-phase inverters of the three-phase inverter unit, and the three winding parts Tu to Tw of the three-phase five-legged iron core transformer, which are respectively independent of each other. Therefore, the current of the zero-phase component of the internal zero-phase-containing unbalanced three-phase current Iubi flows through the DC power supply units DCu to DCw, the single-phase inverters, the primary windings Wuf to Wwf of the winding parts Tu to Tw of the three-phase five-legged iron core transformer, correspondingly to the respective phases according to the phase currents Iiu to Iiw of the three phases which are unbalanced with each other. Then, because the secondary windings Wus to Wws of the winding parts Tu to Tw of the three-phase five-legged iron core transformer corresponding to the three phases are connected in Y-connection, the external zero-phase-containing unbalanced three-phase current Iubo obtained by converting the internal zero-phase-containing unbalanced three-phase current Iubi according to the winding number ratio is output by the secondary windings Wus to Wws of the of the winding parts Tu to Tw, which corresponds the three phases and are connected in Y-connection, and the secondary winding neutral point Ns, of the three-phase five-legged iron core transformer. In this case, the zero-phase magnetic flux passes through the pair of magnetic leakage legs. As a result, a combination of the DC power supply DC, the three-phase inverter device INV, and the three-phase transformation device T can be suitably constructed, the combination enabling output of the zero-phase component of the external zero-phase-containing unbalanced three-phase current Iubo.

<<Main Circuit 2B Including Seventh Zero-Phase Output Configuration>>

Figure 16:
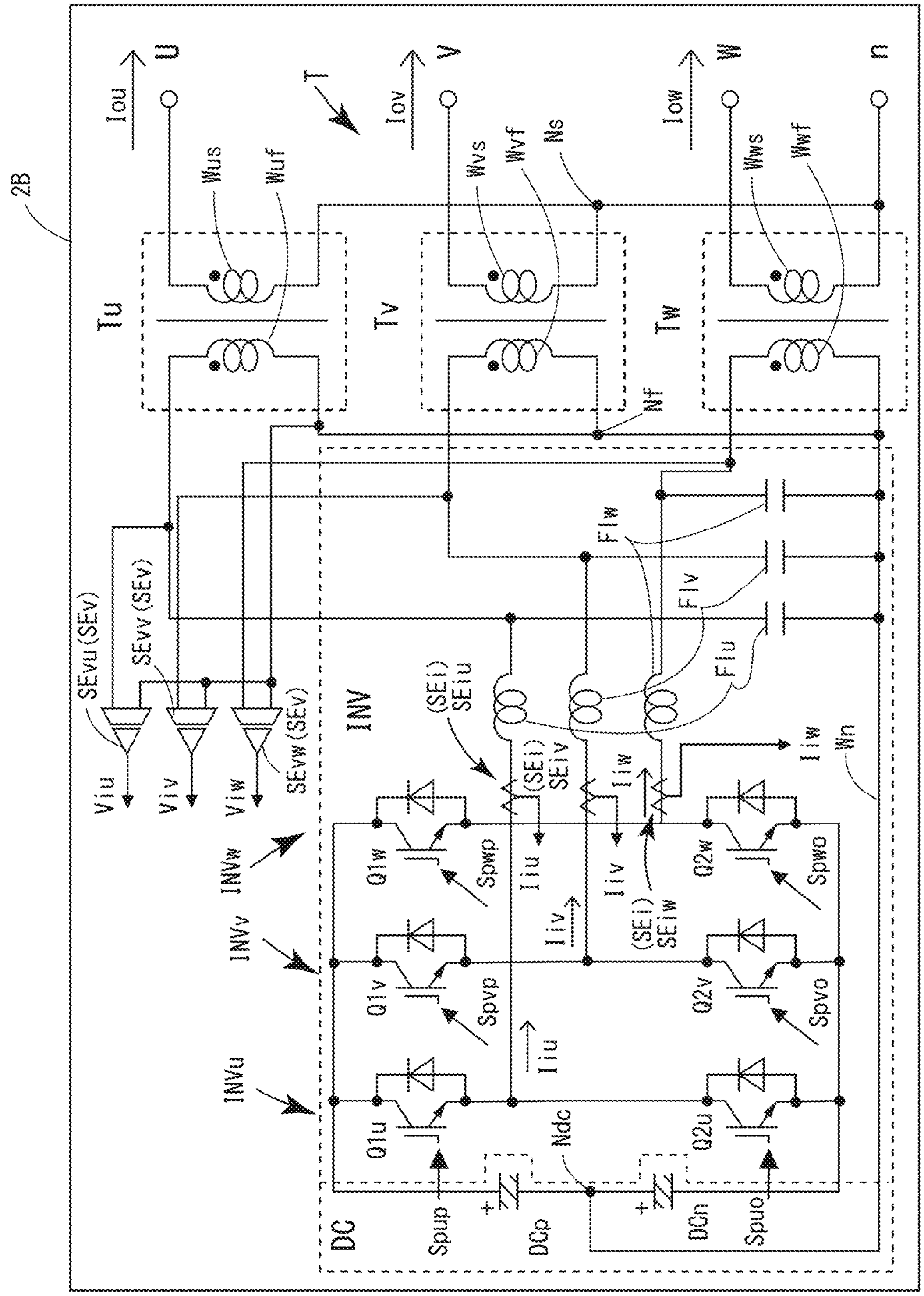
FIG. 16 is a circuit diagram illustrating details of a main circuit in FIG. 13 including a seventh zero-phase output configuration.

FIG. 16 is a circuit diagram illustrating details of the main circuit 2B in FIG. 13 including the seventh zero-phase output configuration. Hereinafter, the contents of the main circuit 2B including the seventh zero-phase output configuration will be described with reference to FIG. 16.

<DC Power Supply DC>

The DC power supply DC includes a positive DC power supply unit DCp and a negative DC power supply unit DCn that are connected to each other in series at a power supply neutral point Ndc and each output a predetermined DC voltage. The positive DC power supply unit DCp and the negative DC power supply unit DCn are not particularly limited as long as the power supply units are DC voltage sources that can output a predetermined DC voltage or DC current sources that can output a predetermined DC current. Examples of the positive DC power supply unit DCp and the negative DC power supply unit DCn include a capacitor, a DC/DC converter, a rectifier device, a rechargeable battery, and the like. Here, each of the positive DC power supply unit DCp and the negative DC power supply unit DCn includes a capacitor. In this case, a DC power supply device (not illustrated) that charges the pair of capacitors is provided in the preceding stage of the pair of capacitors.

<Three-Phase Inverter Device INV>

The three-phase inverter device INV includes a three-phase four-wired inverter. The three-phase four-wired inverter only needs to be of a three-phase four-wired type, and the configuration of the inverter unit (switching unit) is not particularly limited. The three-phase four-wired inverter includes, for example, the U-phase inverter unit INVu including a half bridge configuration, the V-phase inverter unit INVv including a half bridge configuration, and the W-phase inverter unit INVw including a half bridge configuration. Because the three-phase four-wired inverter of half bridge type is well known, the description thereof will be made briefly below.

The U-phase inverter unit INVu includes two switching elements Q1*u*, Q2*u* connected in half bridge. In the U-phase inverter unit INVu, the positive input terminal is connected to the positive terminal of the positive DC power supply unit DCp, and the negative input terminal is connected to the negative terminal of the negative DC power supply unit DCn. The U-phase positive phase pulse modulation signal Spup and the U-phase opposite phase pulse modulation signal Spuo constituting the U-phase pulse modulation signal Spu from the pulse modulation signal generation circuit 7 are input to the switching element Q1*u* and the switching element Q2*u*, respectively. The U-phase inverter unit INVu alternately turns on and off the switching element Q1*u* following the U-phase positive phase pulse modulation signal Spup and the switching element Q2*u* following the U-phase opposite phase pulse modulation signal Spuo, thereby generating, by using a predetermined DC voltage or DC current from the positive DC power supply unit DCp and the negative DC power supply unit DCn, the internal U-phase current Iiu having a phase, a frequency, and an amplitude corresponding to the phase command value Cphu and the amplitude command value Camu of the U-phase of a predetermined zero-phase-containing unbalanced three-phase current, and outputs the internal U-phase current Iiu from an output terminal.

The V-phase inverter unit INVv includes two switching elements Q1*v*, Q2*v* connected in half bridge. In the V-phase inverter unit INVv, the positive input terminal is connected to the positive terminal of the positive DC power supply unit DCp, and the negative input terminal is connected to the negative terminal of the negative DC power supply unit DCn. The V-phase positive phase pulse modulation signal Spvp and the V-phase opposite phase pulse modulation signal Spvo constituting the V-phase pulse modulation signal Spv from the pulse modulation signal generation circuit 7 are input to the switching element Q1*v* and the switching element Q2*v*, respectively. The V-phase inverter unit INVv alternately turns on and off the switching element Q1*v* following the V-phase positive phase pulse modulation signal Spvp and the switching element Q2*v* following the V-phase opposite phase pulse modulation signal Spvo, thereby generating, by using a predetermined DC voltage or DC current from the positive DC power supply unit DCp and the negative DC power supply unit DCn, the internal V-phase current Iiv having a phase, a frequency, and an amplitude corresponding to the phase command value Cphv and the amplitude command value Camv of the V-phase of a predetermined zero-phase-containing unbalanced three-phase current, and outputs the internal V-phase current Iiv from an output terminal.

The W-phase inverter unit INVw includes two switching elements Q1*w*, Q2*w* connected in half bridge. In the W-phase inverter unit INVw, the positive input terminal is connected to the positive terminal of the positive DC power supply unit DCp, and the negative input terminal is connected to the negative terminal of the negative DC power supply unit DCn. The W-phase positive phase pulse modulation signal Spwp and the W-phase opposite phase pulse modulation signal Spwo constituting the W-phase pulse modulation signal Spw from the pulse modulation signal generation circuit 7 are input to the switching element Q1*w* and the switching element Q2*w*, respectively. The W-phase inverter unit INVw alternately turns on and off the switching element Q1*w* following the W-phase positive phase pulse modulation signal Spwp and the switching element Q2*w* following the W-phase opposite phase pulse modulation signal Spwo, thereby generating, by using a predetermined DC voltage or DC current from the positive DC power supply unit DCp and the negative DC power supply unit DCn, the internal W-phase current Iiw having a phase, a frequency, and an amplitude corresponding to the phase command value Cphw and the amplitude command value Camw of the W-phase of a predetermined zero-phase-containing unbalanced three-phase current, and outputs the internal W-phase current Iiw from an output terminal.

In this manner, the U-phase inverter unit INVu, the V-phase inverter unit INVv, and the W-phase inverter unit INVw output the internal zero-phase-containing unbalanced three-phase current Iubi including the internal U-phase current Iiu, the internal V-phase current Iiv, and the internal W-phase current Iiw as the U-phase current, the V-phase current, and the W-phase current, respectively.

<Three-Phase Transformation Device T>

Because the three-phase transformation device T of the seventh zero-phase output configuration is similar to the three-phase transformation device T of the fifth zero-phase output configuration, only the points in the three-phase transformation device T of the seventh zero-phase output configuration that are different from the three-phase transformation device T of the fifth zero-phase output configuration will be described.

In the seventh zero-phase output configuration, the primary winding Wuf of the U-phase transformer is connected to the output terminal of the U-phase inverter unit INVu via the low-pass filter Flu. The primary winding Wvf of the V-phase transformer is connected to the output terminal of the V-phase inverter unit INVv via the low-pass filter Flv. The primary winding Wwf of the W-phase transformer is connected to the output terminal of the W-phase inverter unit INVw via the low-pass filter Flw.

The primary winding Wuf of the U-phase transformer, the primary winding Wvf of the V-phase transformer, and the primary winding Wwf of the W-phase transformer are connected in Y-connection at a primary winding neutral point Nf. The primary winding neutral point Nf is connected to the power supply neutral point Ndc by, for example, a neutral line Wn. Note that the primary winding neutral point Nf and the power supply neutral point Ndc may be grounded, so that the primary winding neutral point Nf is connected to the power supply neutral point Ndc. With this configuration, the U-phase inverter unit INVu, the V-phase inverter unit INVv, and the W-phase inverter unit INVw of the three-phase four-wired inverter are connected in Y-connection at the power supply neutral point Ndc via the common positive DC power supply unit DCp and negative DC power supply unit DCn, and the U-phase inverter unit INVu, the V-phase inverter unit INVv, and the W-phase inverter unit INVw, which are connected in Y-connection, and the positive DC power supply unit DCp and the negative DC power supply unit DCn are connected in Y-Y connection to the U-phase transformer, the V-phase transformer, and the W-phase transformer, which are connected in Y-connection, of the three-phase transformer unit.

The secondary winding Wus of the U-phase transformer, the secondary winding Wvs of the V-phase transformer, and the secondary winding Wws of the W-phase transformer are connected in Y-connection at the secondary winding neutral point Ns.

In the three-phase transformer unit, the internal U-phase current Iiu, the internal V-phase current Iiv, and the internal W-phase current Iiw of the internal zero-phase-containing unbalanced three-phase current Iubi from the three-phase four-wired inverter are input to the primary winding Wuf of the U-phase transformer, the primary winding Wvf of the V-phase transformer, and the primary winding Wwf of the W-phase transformer, respectively, and also, the external zero-phase-containing unbalanced three-phase current Iubo is generated, the external zero-phase-containing unbalanced three-phase current Iubo including the external U-phase current Iou, the external V-phase current Iov, and the external W-phase current Iow obtained by converting the internal U-phase current Iiu, the internal V-phase current Iiv, and the internal W-phase current Iiw according to the predetermined winding number ratio, respectively, in the secondary winding Wus of the U-phase winding part Tu, the secondary winding Wvs of the V-phase winding part Tv, and the secondary winding Wws of the W-phase winding part Tw. Then, this external zero-phase-containing unbalanced three-phase current Iubo is output by the secondary winding Wus of the U-phase transformer, the secondary winding Wvs of the V-phase transformer, and the secondary winding Wws of the W-phase transformer, which are connected in Y-connection, and the secondary winding neutral point Ns, of the three-phase transformer unit.

<Elements Other than Seventh Zero-Phase Output Configuration>

*Low-Pass Filter*

Here, the low-pass filter is configured into the form of the "primary-side control". The low-pass filter Flu of the U-phase is disposed between the primary winding Wuf of the U-phase transformer and the output terminal of the U-phase inverter unit INVu. The low-pass filter Flv of the V-phase is disposed between the primary winding Wvf of the V-phase transformer and the output terminal of the V-phase inverter unit INVv. The low-pass filter Flw of the W-phase is disposed between the primary winding Wwf of the W-phase transformer and the output terminal of the W-phase inverter unit INVw. The low-pass filter may be configured into the form of the "secondary-side control".

*Voltage Sensor Unit SEv*

Because the voltage sensor unit SEv of the seventh zero-phase output configuration is the same as the voltage sensor unit SEv of the fifth zero-phase output configuration, the description thereof will be omitted.

*Current Sensor Unit SEi*

The U-phase current sensor SEiu that detects the internal U-phase current Iiu is provided in the wiring between the output terminal of the U-phase inverter unit INVu and the low-pass filter Flu. The V-phase current sensor SEiv that detects the internal V-phase current Iiv is provided in the wiring between the output terminal of the V-phase inverter unit INVv and the low-pass filter Flv. The W-phase current sensor SEiw that detects the internal W-phase current Iiw is provided in the wiring between the output terminal of the W-phase inverter unit INVw and the low-pass filter Flw. The U-phase current sensor SEiu, the V-phase current sensor SEiv, and the W-phase current sensor SEiw constitute the current sensor unit SEi that detects the internal zero-phase-containing unbalanced three-phase current Iubi. Note that the current sensor unit SEi may be provided to detect the external zero-phase-containing unbalanced three-phase current Iubo.

Action and Effect

According to this seventh zero-phase output configuration, the U-phase inverter unit INVu, the V-phase inverter unit INVv, and the W-phase inverter unit INVw connected in Y-connection, and the positive DC power supply unit DCp and the negative DC power supply unit DCn are connected in Y-Y connection to the U-phase transformer, the V-phase transformer, and the W-phase transformer of the three-phase transformer unit connected in Y-connection. Therefore, the internal zero-phase-containing unbalanced three-phase current Iubi output from the U-phase inverter unit INVu, the V-phase inverter unit INVv, and the W-phase inverter unit INVw of the three-phase four-wired inverter is input to the primary windings Wuf to Wwf of the U-phase transformer, the V-phase transformer, and the W-phase transformer of the three-phase transformer unit, and the current of a zero-phase component of the internal zero-phase-containing unbalanced three-phase current Iubi flows through a current path between the primary winding neutral point Nf and the power supply neutral point Ndc. In addition, because the secondary windings Wus to Wws of the U-phase transformer, the V-phase transformer, and the W-phase transformer of the three-phase transformer unit are connected in Y-connection, the external zero-phase-containing unbalanced three-phase current Iubo obtained by converting the internal zero-phase-containing unbalanced three-phase current Iubi according to the winding number ratio is output by the secondary windings Wus to Wws, which are connected in Y-connection, and the secondary winding neutral point Ns, of the U-phase transformer, the V-phase transformer, and the W-phase transformer. As a result, a combination of the DC power supply DC, the three-phase inverter device INV, and the three-phase transformation device T can be suitably constructed, the combination enabling output of the zero-phase component of the external zero-phase-containing unbalanced three-phase current Iubo.

<<Eighth Zero-Phase Output Configuration>>

Figure 17:
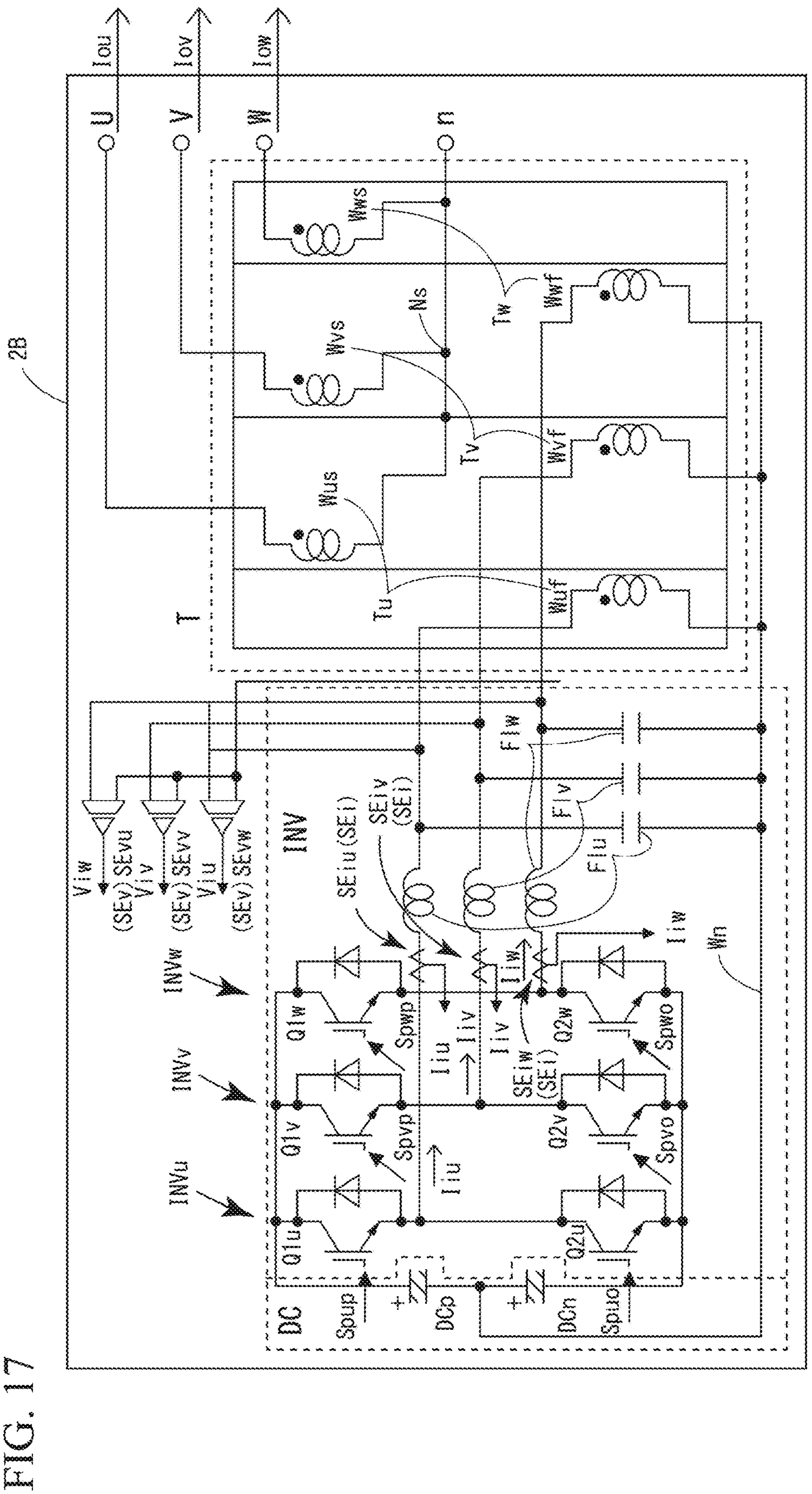
FIG. 17 is a circuit diagram illustrating details of a main circuit in FIG. 13 including an eighth zero-phase output configuration.

FIG. 17 is a circuit diagram illustrating details of the main circuit 2B in FIG. 13 including the eighth zero-phase output configuration. Hereinafter, the contents of the main circuit 2B including the eighth zero-phase output configuration will be described with reference to FIG. 17.

<DC Power Supply DC>

Because the DC power supply DC of the eighth zero-phase output configuration is the same as the DC power supply DC of the seventh zero-phase output configuration, the description thereof will be omitted.

<Three-Phase Inverter Device INV>

Because the three-phase inverter device INV of the eighth zero-phase output configuration is the same as the three-phase inverter device INV of the seventh zero-phase output configuration, the description thereof will be omitted.

<Three-Phase Transformation Device T>

Because the three-phase transformation device T of the eighth zero-phase output configuration is similar to the three-phase transformation device T of the sixth zero-phase output configuration, only the points in the three-phase transformation device T of the eighth zero-phase output configuration that are different from the three-phase transformation device T of the sixth zero-phase output configuration will be described.

In the eighth zero-phase output configuration, the primary winding Wuf of the U-phase winding part Tu is connected to the output terminal of the U-phase inverter unit INVu via the low-pass filter Flu. The primary winding Wvf of the V-phase winding part Tv is connected to the output terminal of the V-phase inverter unit INVv via the low-pass filter Flv. The primary winding Wwf of the W-phase winding part Tw is connected to the output terminal of the W-phase inverter unit INVw via the low-pass filter Flw.

The primary winding Wuf of the U-phase winding part Tu, the primary winding Wvf of the V-phase winding part Tv, and the primary winding Wwf of the W-phase winding part Tw of the three-phase five-legged iron core transformer are connected in Y-connection at the primary winding neutral point Nf. The primary winding neutral point Nf is connected to the power supply neutral point Ndc by, for example, a neutral line Wn. Note that the primary winding neutral point Nf and the power supply neutral point Ndc may be grounded, so that the primary winding neutral point Nf is connected to the power supply neutral point Ndc. With this configuration, the U-phase inverter unit INVu, the V-phase inverter unit INVv, and the W-phase inverter unit INVw of the three-phase four-wired inverter are connected in Y-connection at the power supply neutral point Ndc via the common positive DC power supply unit DCp and negative DC power supply unit DCn, and the U-phase inverter unit INVu, the V-phase inverter unit INVv, and the W-phase inverter unit INVw, which are connected in Y-connection, and the positive DC power supply unit DCp and the negative DC power supply unit DCn are connected in Y-Y connection to the U-phase winding part Tu, the V-phase winding part Tv, and the W-phase winding part Tw, which are connected in Y-connection, of the three-phase five-legged iron core transformer.

The secondary winding Wus of the U-phase winding part Tu, the secondary winding Wvs of the V-phase winding part Tv, and the secondary winding Wws of the W-phase winding part Tw are connected in Y-connection at the secondary winding neutral point Ns.

In the three-phase five-legged iron core transformer, the internal U-phase current Iiu, the internal V-phase current Iiv, and the internal W-phase current Iiw of the internal zero-phase-containing unbalanced three-phase current Iubi from the three-phase four-wired inverter are input to the primary winding Wuf of the U-phase winding part Tu, the primary winding Wvf of the V-phase winding part Tv, and the primary winding Wwf of the W-phase winding part Tw, respectively, and also, the external zero-phase-containing unbalanced three-phase current Iubo is generated, the external zero-phase-containing unbalanced three-phase current Iubo including the external U-phase current Iou, the external V-phase current Iov, and the external W-phase current Iow obtained by converting the internal U-phase current Iiu, the internal V-phase current Iiv, and the internal W-phase current Iiw according to a predetermined winding number ratio, respectively, in the secondary winding Wus of the U-phase winding part Tu, the secondary winding Wvs of the V-phase winding part Tv, and the secondary winding Wws of the W-phase winding part Tw. Then, the external zero-phase-containing unbalanced three-phase current Iubo is output by the secondary winding Wus of the U-phase winding part Tu, the secondary winding Wvs of the V-phase winding part Tv, and the secondary winding Wws of the W-phase winding part Tw, which are connected in Y-connection, and the secondary winding neutral point Ns, of the three-phase five-legged iron core transformer.

<Elements Other than Eighth Zero-Phase Output Configuration>

*Low-Pass Filter*

Here, the low-pass filter is configured into the form of the "primary-side control". The low-pass filter Flu of the U-phase is disposed between the primary winding Wuf of the U-phase winding part Tu and the output terminal of the U-phase inverter unit INVu. The low-pass filter Flv of the V-phase is disposed between the primary winding Wvf of the V-phase winding part Tv and the output terminal of the V-phase inverter unit INVv. The low-pass filter Flw of the W-phase is disposed between the primary winding Wwf of the W-phase winding part Tw and the output terminal of the W-phase inverter unit INVw. The low-pass filter may be configured into the form of the "secondary-side control".

*Voltage Sensor Unit SEv*

Because the voltage sensor unit SEv of the eighth zero-phase output configuration is the same as the voltage sensor unit SEv of the sixth zero-phase output configuration, the description thereof will be omitted.

*Current Sensor Unit SEi*

Because the current sensor unit SEi of the eighth zero-phase output configuration is the same as the current sensor unit SEi of the seventh zero-phase output configuration, the description thereof will be omitted.

Action and Effect

According to this eighth zero-phase output configuration, the U-phase inverter unit INVu, the V-phase inverter unit INVv, and the W-phase inverter unit INVw connected in Y-connection, and the positive DC power supply unit DCp and the negative DC power supply unit DCn are connected in Y-Y connection to the U-phase winding part Tu, the V-phase winding part Tv, and the W-phase winding part Tw of the three-phase five-legged iron core transformer connected in Y-connection. Therefore, the internal zero-phase-containing unbalanced three-phase current Iubi output from the U-phase inverter unit INVu, the V-phase inverter unit INVv, and the W-phase inverter unit INVw of the three-phase four-wired inverter is applied to the primary windings Wuf to Wwf of the U-phase winding part Tu, the V-phase winding part Tv, and the W-phase winding part Tw of the three-phase five-legged iron core transformer, and the current of a zero-phase component of the internal zero-phase-containing unbalanced three-phase current Iubi flows through a current path between the primary winding neutral point Nf and the power supply neutral point Ndc. In addition, because the secondary windings Wus to Wws of the U-phase winding part Tu, the V-phase winding part Tv, and the W-phase winding part Tw are connected in Y-connection, the external zero-phase-containing unbalanced three-phase current Iubo obtained by converting the internal zero-phase-containing unbalanced three-phase current Iubi according to the winding number ratio is output by the secondary windings Wus to Wws of the U-phase winding part Tu, the V-phase winding part Tv, and the W-phase winding part Tw, which are connected in Y-connection, and the secondary winding neutral point Ns. In this case, the zero-phase magnetic flux passes through the pair of magnetic leakage legs. As a result, a combination of the DC power supply DC, the three-phase inverter device INV, and the three-phase transformation device T can be suitably constructed, the combination enabling output of the zero-phase component of the external zero-phase-containing unbalanced three-phase current Iubo.

{Control Circuit 1B}

Figure 18:
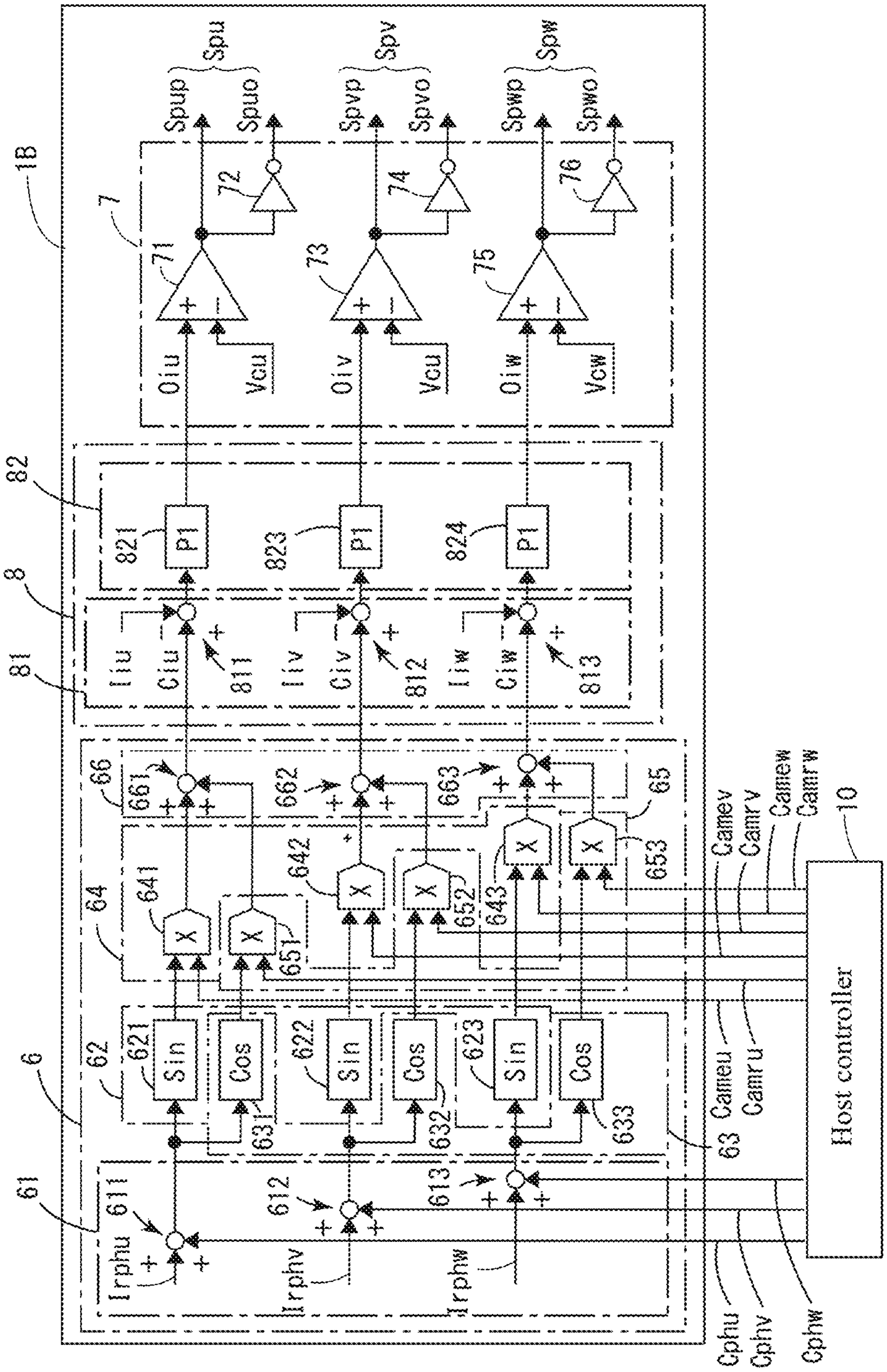
FIG. 18 is a circuit diagram illustrating an example of a configuration of a control circuit in FIG. 13.

FIG. 18 is a circuit diagram illustrating an example of a configuration of the control circuit 1B in FIG. 13. Referring to FIG. 18, the control circuit 1B is configured to feedback-control the internal zero-phase-containing unbalanced three-phase current Iubi. Note that the control circuit 1B may be configured to feedforward control.

Specifically, the control circuit 1B includes the current command generation unit 6, the current feedback control unit 8, and the pulse modulation signal generation circuit 7. Hereinafter, these elements will be described in detail in order.

<Current Command Generation Unit 6>

The current command generation unit 6 includes a phase command value generation unit 61, a three-phase sine wave generation unit 62, a three-phase cosine wave generation unit 63, a sine wave amplitude determination unit 64, a cosine wave amplitude determination unit 65, and a current command amplitude determination unit 66.

The phase command value generation unit 61 receives the U-phase phase command value Cphu, the V-phase phase command value Cphv, and the W-phase phase command value Cphw of a predetermined zero-phase-containing unbalanced three-phase current from a host controller 10. In addition, the phase command value generation unit 61 receives phase information IFrphu of a U-phase reference internal sine wave, phase information IFrphv of a V-phase reference internal sine wave, and phase information IFrphw of a W-phase reference internal sine wave, which are generated by a reference internal three-phase sine wave generation unit of the unbalanced three-phase power supply device 200.

The reference internal three-phase sine wave generation unit generates a reference internal sine wave of each phase and extracts a phase of the reference internal sine wave of each phase on the basis of the internal zero-phase-containing unbalanced three-phase voltage Vubi detected by the voltage sensor unit SEv. Because these processes can be performed by a known method using a phase locked loop (PLL), the description thereof will be omitted.

The phase command value generation unit 61 adds the U-phase phase command value Cphu, the V-phase phase command value Cphv, and the W-phase phase command value Cphw to the phase information IFrphu of the U-phase reference internal sine wave, the phase information IFrphv of the V-phase reference internal sine wave, and the phase information IFrphw of the W-phase reference internal sine wave by using a U-phase adder 611, a V-phase adder 612, and a W-phase adder 613, respectively, and outputs the U-phase phase command value, the V-phase phase command value, and the W-phase phase command value obtained by the addition. At this time, the phase command value generation unit 61 outputs the U-phase phase command value, the V-phase phase command value, and the W-phase phase command value at a predetermined timing, that is, at a time point when a predetermined time has elapsed from a predetermined reference time.

The three-phase sine wave generation unit 62 includes a U-phase sin table 621, a V-phase sin table 622, and a W-phase sin table 623. The sin table is a table (graph) indicating a relationship (function) in which a frequency of a sine wave (sin wave) is proportional to time in a two-axis orthogonal coordinate system in which one axis represents an elapsed time from the predetermined reference time and the other axis represents the frequency of the sine wave.

When the U-phase phase command value, the V-phase phase command value, and the W-phase phase command value are input from the phase command value generation unit 61, the three-phase sine wave generation unit 62 identifies each input timing, that is, the elapsed time from the predetermined reference time until each of the U-phase phase command value, the V-phase phase command value, and the W-phase phase command value is input, and collates the input timing of the U-phase phase command value, the input timing of the V-phase phase command value, and the input timing of the W-phase phase command value, which are identified, with the U-phase sin table 621, the V-phase sin table 622, and the W-phase sin table 623, respectively. The three-phase sine wave generation unit 62 determines frequencies corresponding to the input timing of the U-phase phase command value, the input timing of the V-phase phase command value, and the input timing of the W-phase phase command value as the frequency of the U-phase sine wave, the frequency of the V-phase sine wave, and the frequency of the W-phase sine wave, respectively, in the U-phase sin table 621, the V-phase sin table 622, and the W-phase sin table 623. In addition, the three-phase sine wave generation unit 62 determines the phases respectively indicated by the U-phase phase command value, the V-phase phase command value, and the W-phase phase command value as the phase of the U-phase sine wave, the phase of the V-phase sine wave, and the phase of the W-phase sine wave. In this manner, the three-phase sine wave generation unit 62 generates the U-phase sine wave, the V-phase sine wave, and the W-phase sine wave having the frequencies, the phases, and the reference amplitudes respectively corresponding to the U-phase phase command value, the V-phase phase command value, and the W-phase phase command value.

The three-phase cosine wave generation unit 63 includes a U-phase cos table 631, a V-phase cos table 632, and a W-phase cos table 633. The cos table is a table (graph) indicating a relationship (function) in which a frequency of a cosine wave (cos wave) is proportional to time in a two-axis orthogonal coordinate system in which one axis represents an elapsed time from the predetermined reference time and the other axis represents the frequency of the cosine wave. When the U-phase phase command value, the V-phase phase command value, and the W-phase phase command value are input from the phase command value generation unit 61, the three-phase cosine wave generation unit 63 identifies each input timing, that is, the elapsed time from the predetermined reference time until each of the U-phase phase command value, the V-phase phase command value, and the W-phase phase command value is input, and collates the input timing of the U-phase phase command value, the input timing of the V-phase phase command value, and the input timing of the W-phase phase command value, which are identified, with the U-phase cos table 631, the V-phase cos table 632, and the W-phase cos table 633, respectively. The three-phase cosine wave generation unit 63 determines frequencies corresponding to the input timing of the U-phase phase command value, the input timing of the V-phase phase command value, and the input timing of the W-phase phase command value as the frequency of the U-phase cosine wave, the frequency of the V-phase cosine wave, and the frequency of the W-phase cosine wave, respectively, in the U-phase cos table 631, the V-phase cos table 632, and the W-phase cos table 633. In addition, the three-phase cosine wave generation unit 63 determines the phases respectively indicated by the U-phase phase command value, the V-phase phase command value, and the W-phase phase command value as the phase of the U-phase cosine wave, the phase of the V-phase cosine wave, and the phase of the W-phase cosine wave. In this manner, the three-phase cosine wave generation unit 63 generates the U-phase cosine wave, the V-phase cosine wave, and the W-phase cosine wave having the frequencies, the phases, and the reference amplitudes respectively corresponding to the U-phase phase command value, the V-phase phase command value, and the W-phase phase command value.

The sine wave amplitude determination unit 64 receives the U-phase active component amplitude command value Camue, the V-phase active component amplitude command value Camve, and the W-phase active component amplitude command value Camwe of a predetermined zero-phase-containing unbalanced three-phase current from the host controller 10. By using a U-phase multiplier 641, a V-phase multiplier 642, and a W-phase multiplier 643, the sine wave amplitude determination unit 64 determines the amplitude of the U-phase sine wave, the amplitude of the V-phase sine wave, and the amplitude of the W-phase sine wave by multiplying an amplitude value of the U-phase sine wave, an amplitude value of the V-phase sine wave, and an amplitude value of the W-phase sine wave, which are generated by the three-phase sine wave generation unit 62 by U-phase, V-phase, and W-phase active component amplitude command values of the predetermined zero-phase-containing unbalanced three-phase current, respectively, to generate a U-phase active component current command, a V-phase active component current command, and a W-phase active component current command.

The cosine wave amplitude determination unit 65 receives the U-phase reactive component amplitude command value Camur, the V-phase reactive component amplitude command value Camvr, and the W-phase reactive component amplitude command value Camwr of a predetermined zero-phase-containing unbalanced three-phase current from the host controller 10. By using a U-phase multiplier 651, a V-phase multiplier 652, and a W-phase multiplier 653, the cosine wave amplitude determination unit 65 determines the amplitude of the U-phase cosine wave, the amplitude of the V-phase cosine wave, and the amplitude of the W-phase cosine wave by multiplying an amplitude value of the U-phase cosine wave, an amplitude value of the V-phase cosine wave, and an amplitude value of the W-phase cosine wave, which are generated by the three-phase cosine wave generation unit 63 by U-phase, V-phase, and W-phase reactive component amplitude command values of the predetermined zero-phase-containing unbalanced three-phase current, respectively, to generate a U-phase reactive component current command, a V-phase reactive component current command, and a W-phase reactive component current command.

The current command amplitude determination unit 66 adds the U-phase reactive component current command, the V-phase reactive component current command, and the W-phase reactive component current command to the U-phase active component current command, the V-phase active component current command, and the W-phase active component current command, respectively, by using a U-phase adder 661, a V-phase adder 662, and a W-phase adder 663, to generate the U-phase current command Ciu, the V-phase current command Civ, and the W-phase current command Ciw.

<Current Feedback Control Unit 8>

The current feedback control unit 8 includes a current error generation unit 81 and a current compensation unit 82.

To the current error generation unit 81, the internal U-phase current Iiu, the internal V-phase current Iiv, and the internal W-phase current Iiw of the internal zero-phase-containing unbalanced three-phase current Iubi detected by the current sensor unit SEi are input. By using a U-phase subtractor 811, a V-phase subtractor 812, and a W-phase subtractor 813, the current error generation unit 81 generates a U-phase current error, a V-phase current error, and a W-phase current error that are errors of the internal U-phase current Iiu, the internal V-phase current Iiv, and the internal W-phase current Iiw of the internal zero-phase-containing unbalanced three-phase current Iubi with respect to the U-phase current command Ciu, the V-phase current command Civ, and the W-phase current command Ciw generated by the current command amplitude determination unit 66. Note that, in a case where the current sensor unit SEi detects the external zero-phase-containing unbalanced three-phase current Iubo, the external U-phase current Iou, the external V-phase current Iov, and the external W-phase current Iow of the external zero-phase-containing unbalanced three-phase current Iubo detected by the current sensor unit SEi are input to the current error generation unit 81. By using the U-phase subtractor 811, the V-phase subtractor 812, and the W-phase subtractor 813, the current error generation unit 81 generates the U-phase current error, the V-phase current error, and the W-phase current error that are errors of the external U-phase current Iou, the external V-phase current Iov, and the external W-phase current Iow of the external zero-phase-containing unbalanced three-phase current Iubo with respect to the U-phase current command Ciu, the V-phase current command Civ, and the W-phase current command Ciw generated by the current command amplitude determination unit 66.

The current compensation unit 82 generates the U-phase current manipulated variable Oiu, the V-phase current manipulated variable Oiv, and the W-phase current manipulated variable Oiw by applying compensation to the U-phase current error, the V-phase current error, and the W-phase current error generated by the current error generation unit 81 by a U-phase compensation unit 821, a V-phase compensation unit 823, and a W-phase compensation unit 824.

<Pulse Modulation Signal Generation Circuit 7>

The pulse modulation signal generation circuit 7 includes a U-phase comparator 71, a U-phase inversion element 72, a V-phase comparator 73, a V-phase inversion element 74, a W-phase comparator 75, and a W-phase inversion element 76.

In the U-phase comparator 71, the U-phase current manipulated variable Oiu generated by the current compensation unit 82 is input to a non-inverting input terminal, and a triangular wave carrier signal Vcu is input to an inverting input terminal. The U-phase comparator 71 compares the U-phase current manipulated variable Oiu with the triangular wave carrier signal Vcu to generate the U-phase positive phase pulse modulation signal Spup which is a PWM signal corresponding to the U-phase current manipulated variable Oiu. The U-phase inversion element 72 inverts the U-phase positive phase pulse modulation signal Spup to generate the U-phase opposite phase pulse modulation signal Spuo. The U-phase positive phase pulse modulation signal Spup and the U-phase opposite phase pulse modulation signal Spuo constitute the U-phase pulse modulation signal Spu.

In the V-phase comparator 73, the V-phase current manipulated variable Oiv generated by the current compensation unit 82 is input to a non-inverting input terminal, and a triangular wave carrier signal Vcv is input to an inverting input terminal. The V-phase comparator 73 compares the V-phase v-phase current manipulated variable Oiv with the triangular wave carrier signal Vcv to generate the V-phase positive phase pulse modulation signal Spvp which is a PWM signal corresponding to the V-phase current manipulated variable Oiv. The V-phase inversion element 74 inverts the V-phase positive phase pulse modulation signal Spvp to generate the V-phase opposite phase pulse modulation signal Spvo. The V-phase positive phase pulse modulation signal Spvp and the V-phase opposite phase pulse modulation signal Spvo constitute the V-phase pulse modulation signal Spv.

In the W-phase comparator 75, the W-phase current manipulated variable Oiw generated by the current compensation unit 82 is input to a non-inverting input terminal, and a triangular wave carrier signal is input to an inverting input terminal. The W-phase comparator 75 compares the W-phase current manipulated variable Oiw with the triangular wave carrier signal Vcw to generate the W-phase positive phase pulse modulation signal Spwp which is a PWM signal corresponding to the W-phase current manipulated variable Oiw. The W-phase inversion element 76 inverts the W-phase positive phase pulse modulation signal Spwp to generate the W-phase opposite phase pulse modulation signal Spwo. The W-phase positive phase pulse modulation signal Spwp and the W-phase opposite phase pulse modulation signal Spwo constitute the W-phase pulse modulation signal Spw.

<Configurations of Current Command Generation Unit 6 and Current Feedback Control Unit 8>

The current command generation unit 6 and the current feedback control unit 8 can be constituted of, for example, an electronic circuit using an operational amplifier except for the three-phase sine wave generation unit 62 and the three-phase cosine wave generation unit 63.

In addition, the current command generation unit 6 and the current feedback control unit 8 can be configured by software. In this case, for example, an arithmetic unit including a processor and a memory is used, a predetermined program for executing the functions of the current command generation unit 6 and the current feedback control unit 8 is stored in the memory of the arithmetic unit, and the processor reads out and executes the predetermined program. Thereby, the current command generation unit 6 and the current feedback control unit 8 can be realized as functional blocks. In this case, the arithmetic unit operates as the current command generation unit 6 and the current feedback control unit 8. This arithmetic unit can be constituted of, for example, a computer, a personal computer, a microcontroller, a microprocessor (MPU), a field programmable gate array (FPGA), a programmable logic controller (PLC), or the like.

Here, the functions of the elements disclosed herein may be performed by using a circuit of a processing circuit including generic processors, dedicated processors, integrated circuits, application specific integrated circuits (ASICs), conventional circuits, and/or combinations thereof configured or programmed to perform the disclosed functions. The processor is considered a processing circuit or circuit because the processor includes transistors and other circuits. In the present disclosure, a "circuit" or "unit" is hardware that performs the recited functions or is hardware programmed to perform the recited functions. The hardware may be the hardware disclosed herein, or may be any other known hardware that is programmed or configured to perform the recited functions. In a case where the hardware is a processor that is considered to be a type of circuit, a "circuit" or a "unit" is a combination of hardware and software, and the software is used for configuring the hardware and/or the processor.

<Host Controller 10>

The host controller 10 is not particularly limited as long as the host controller is the one that can output the U-phase phase command value Cphu, the V-phase phase command value Cphv, and the W-phase phase command value Cphw, the U-phase active component amplitude command value Camue, the V-phase active component amplitude command value Camve, the W-phase active component amplitude command value Camwe, the U-phase reactive component amplitude command value Camur, the V-phase reactive component amplitude command value Camvr, and the W-phase reactive component amplitude command value Camwr of the predetermined zero-phase-containing unbalanced three-phase current. The host controller 10 includes, for example, a computer, a personal computer, a microcontroller, an MPU, an FPGA, a PLC, and the like. The communication between the host controller 10 and the current command generation unit 6 is performed via, for example, a wired, wireless, or data-communicable network. The host controller 10 may be disposed either outside or inside the unbalanced three-phase power supply device 200.

<Operation>

The operation of the unbalanced three-phase power supply device 200 configured as described above will be described with reference to FIGS. 13 to 18. Hereinafter, a case where the control circuit 1B includes the current feedback control unit 8 will be described.

Referring to FIGS. 13 to 18, the current command generation unit 6 receives, from the host controller 10, the U-phase phase command value Cphu, the V-phase phase command value Cphv, the W-phase phase command value Cphw, the U-phase active component amplitude command value Camue, the V-phase active component amplitude command value Camve, the W-phase active component amplitude command value Camwe, the U-phase reactive component amplitude command value Camur, the V-phase reactive component amplitude command value Camvr, and the W-phase reactive component amplitude command value Camwr of the predetermined zero-phase-containing unbalanced three-phase current. The current command generation unit 6 generates the U-phase current command Ciu, the V-phase current command Civ, and the W-phase current command Ciw having phases, frequencies, and amplitudes respectively corresponding to the received values, which are the U-phase phase command value Cphu, the V-phase phase command value Cphv, the W-phase phase command value Cphw, the U-phase active component amplitude command value Camue, the V-phase active component amplitude command value Camve, the W-phase active component amplitude command value Camwe, the U-phase reactive component amplitude command value Camur, the V-phase reactive component amplitude command value Camvr, and the W-phase reactive component amplitude command value Camwr of the predetermined zero-phase-containing unbalanced three-phase current.

The current feedback control unit 8 generates the U-phase current manipulated variable Oiu, the V-phase current manipulated variable Oiv, and the W-phase current manipulated variable Oiw based on the errors of the internal U-phase current Iiu, the internal V-phase current Iiv, and the internal W-phase current Iiw of the internal zero-phase-containing unbalanced three-phase current Iubi with respect to the U-phase current command Ciu, the V-phase current command Civ, and the W-phase current command Ciw from the current command generation unit 6, respectively. Note that, in a case where the current sensor unit SEi detects the external zero-phase-containing unbalanced three-phase current Iubo, the current feedback control unit 8 generates the U-phase current manipulated variable Oiu, the V-phase current manipulated variable Oiv, and the W-phase current manipulated variable Oiw based on the errors of the external U-phase current Iou, the external V-phase current Iov, and the external W-phase current Iow of the external zero-phase-containing unbalanced three-phase current Iubo with respect to the U-phase current command Ciu, the V-phase current command Civ, and the W-phase current command Ciw generated by the current command amplitude determination unit 66, respectively.

The pulse modulation signal generation circuit 7 outputs the U-phase pulse modulation signal Spu, the V-phase pulse modulation signal Spv, and the W-phase pulse modulation signal Spw corresponding to the U-phase current manipulated variable Oiu, the V-phase current manipulated variable Oiv, and the W-phase current manipulated variable Oiw generated by the current feedback control unit 8.

Referring to FIGS. 13 and 14 to 17, according to the U-phase pulse modulation signal Spu, the V-phase pulse modulation signal Spv, and the W-phase pulse modulation signal Spw, respectively, from the pulse modulation signal generation circuit 7, the U-phase inverter unit INVu, the V-phase inverter unit INVv, and the W-phase inverter unit INVw of the three-phase inverter device INV generate, by using a predetermined DC voltage or DC current from the DC power supply DC, the internal U-phase current Iiu, the internal V-phase current Iiv, and the internal W-phase current Iiw respectively having phases, frequencies, and amplitudes corresponding to the U-phase phase command value Cphu, the V-phase phase command value Cphv, the W-phase phase command value Cphw, the U-phase active component amplitude command value Camue, the V-phase active component amplitude command value Camve, the W-phase active component amplitude command value Camwe, the U-phase reactive component amplitude command value Camur, the V-phase reactive component amplitude command value Camvr, and the W-phase reactive component amplitude command value Camwr of the predetermined zero-phase-containing unbalanced three-phase current, respectively. With this configuration, the three-phase inverter device INV outputs the internal zero-phase-containing unbalanced three-phase current Iubi including the internal U-phase current Iiu, the internal V-phase current Iiv, and the internal W-phase current Iiw.

In the three-phase transformation device T, the internal U-phase current Iiu, the internal V-phase current Iiv, and the internal W-phase current Iiw of the internal zero-phase-containing unbalanced three-phase current Iubi from the three-phase inverter device INV are input to the primary winding Wuf of the U-phase winding part Tu, the primary winding Wvf of the V-phase winding part Tv, and the primary winding Wwf of the W-phase winding part Tw, respectively.

Here, because the DC power supply DC, the three-phase inverter device INV, and the three-phase transformation device T of the main circuit 2B have the forms and the mutual connection relationship in which the zero-phase component of the external zero-phase-containing unbalanced three-phase current Iubo obtained by converting the internal zero-phase-containing unbalanced three-phase current Iubi according to the winding number ratio in the three-phase transformation device T can be output, the external zero-phase-containing unbalanced three-phase current Iubo is output by the secondary winding Wus of the U-phase winding part Tu, the secondary winding Wvs of the V-phase winding part Tv, the secondary winding Wws of the W-phase winding part Tw, which are connected in Y-connection, and the secondary winding neutral point Ns, of the three-phase transformation device T. In addition, the internal zero-phase-containing unbalanced three-phase current Iubi is feedback-controlled by the current feedback control unit 8.

Referring to FIGS. 13 and 18, according to the unbalanced three-phase power supply device 200, the phase command values Cphue, Cphur, Cphve, Cphvr, Cphwe, and Cphwr and the amplitude command values Camue, Camur, Camve, Camvr, Camwe, and Camwr of the U-phase, the V-phase, and the W-phase of the received predetermined zero-phase-containing unbalanced three-phase current are processed independently of each other for each of the U-phase, the V-phase, and the W-phase in the unbalanced three-phase power supply device 200. Therefore, the external zero-phase-containing unbalanced three-phase current Iubo corresponding to the above predetermined zero-phase-containing unbalanced three-phase current can be generated. Furthermore, the DC power supply DC, the three-phase inverter device INV, and the three-phase transformation device T have respective forms and the mutual connection relationship that enable output of the zero-phase component of the generated external zero-phase-containing unbalanced three-phase current Iubo. Therefore, the zero-phase component of the external zero-phase-containing unbalanced three-phase current Iubo can be output. Therefore, the unbalanced three-phase power supply device 200 that can output the unbalanced three-phase current Iubo containing the desired zero-phase component can be provided by setting a desired zero-phase-containing three-phase unbalanced current to the predetermined zero-phase-containing unbalanced three-phase current. Because the unbalanced three-phase power supply device 200 generates the unbalanced three-phase current Iubo containing the zero-phase component by the three-phase inverter device INV, the environment of the test using the unbalanced three-phase current Iubo containing the zero-phase component can be easily constructed by using the unbalanced three-phase power supply device 200.

[Simulation]

In order to confirm the action and effect of the unbalanced three-phase power supply device 200 of the present third embodiment, simulation of the operation of the unbalanced three-phase power supply device 200 was performed. This simulation was performed on the main circuit 2B including the fifth zero-phase output configuration to the eighth zero-phase output configuration in a case where the current sensor unit SEi detects the internal zero-phase-containing unbalanced three-phase current Iubi. From the above simulation results, it has been confirmed that the unbalanced three-phase power supply device 200 of the present third embodiment exhibits the action and effect of the present disclosure. Note that the results of these simulations are similar to the results of the simulations in the first embodiment, and thus, the description thereof will be omitted.

Fourth Embodiment

Figure 19:
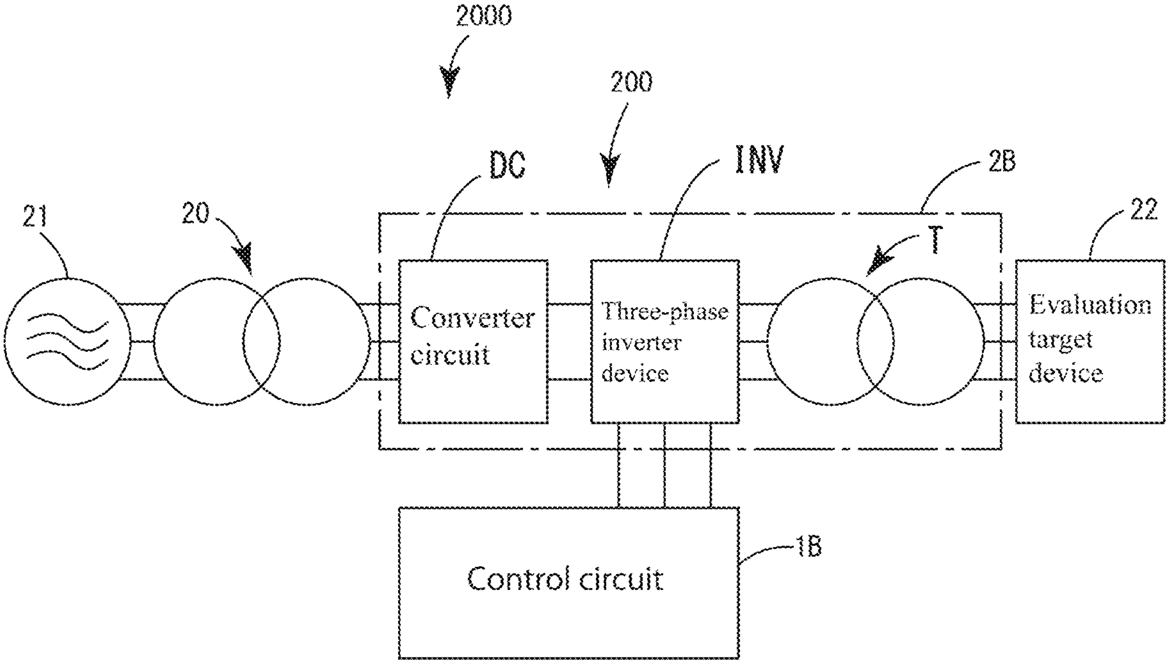
FIG. 19 is a functional block diagram illustrating an example of a configuration of a power supply for evaluation according to a fourth embodiment of the present disclosure.

A fourth embodiment of the present disclosure exemplifies a power supply for evaluation including the unbalanced three-phase power supply device 200 of the third embodiment. FIG. 19 is a functional block diagram illustrating an example of a configuration of a power supply 2000 for evaluation according to the fourth embodiment of the present disclosure.

Referring to FIG. 19, the power supply 2000 for evaluation includes an input-side three-phase transformer 20 and the unbalanced three-phase power supply device 200 of the third embodiment. An input terminal of the input-side three-phase transformer 20 is connected to, for example, a power system 21. In the unbalanced three-phase power supply device 200, the DC power supply DC includes a converter circuit that converts a three-phase voltage of the power system input via the input-side three-phase transformer 20 into a DC voltage or DC current. This converter circuit corresponds to the capacitor of the DC power supply DC and the DC power supply device in the preceding stage of the capacitor of the third embodiment. In addition, an evaluation target device 22 is connected to the secondary-side output terminals U, V, W, and n (see FIGS. 14 to 17) of the three-phase transformation device T.

According to the power supply 2000 for evaluation, the unbalanced three-phase power supply device 200 supplies the external zero-phase-containing unbalanced three-phase current Iubo corresponding to the unbalanced three-phase current containing the predetermined zero-phase component to the evaluation target device 22 by using the system power from the power system 21. Therefore, under a test environment that can be easily constructed, the capability of the evaluation target device 22 with respect to the unbalanced three-phase current containing the zero-phase component can be evaluated.

Other Embodiments

In the first embodiment, the main circuit 2A may have a zero-phase output configuration other than the first zero-phase output configuration to the fourth zero-phase output configuration, the zero-phase output configuration being configured such that the DC power supply DC, the three-phase inverter device INV, and the three-phase transformation device T have respective forms and the mutual connection relationship that enable output of a zero-phase component (external zero-phase voltage Vo0) of the external zero-phase-containing unbalanced three-phase voltage Vubo obtained by converting the internal zero-phase-containing unbalanced three-phase voltage Vubi according to the winding number ratio in the three-phase transformation device T.

In the third embodiment, the main circuit 2B may have a zero-phase output configuration other than the fifth zero-phase output configuration to the eighth zero-phase output configuration, the zero-phase output configuration being configured such that the DC power supply DC, the three-phase inverter device INV, and the three-phase transformation device T have respective forms and the mutual connection relationship that enable output of a zero-phase component of the external zero-phase-containing unbalanced three-phase current Iubo obtained by converting the internal zero-phase-containing unbalanced three-phase current Iubi according to the winding number ratio in the three-phase transformation device T.

In the first or second embodiment, the pulse modulation signal generation circuit 4 may be constituted of a circuit that generates a pulse modulation signal other than the PWM signal.

In the third or fourth embodiment, the pulse modulation signal generation circuit 7 may be constituted of a circuit that generates a pulse modulation signal other than the PWM signal.

From the above description, many modifications and other embodiments will be apparent to those skilled in the art. Therefore, the above description should be interpreted only as an example.

The unbalanced three-phase power supply device of the present disclosure is useful as a power supply device that can easily construct a test environment using an unbalanced three-phase voltage or an unbalanced three-phase current including a zero-phase component.

What is claimed is:

1. An unbalanced three-phase power supply device comprising:

a control circuit including: a voltage command generation unit that receives unbalanced three-phase voltage information including phase command values and amplitude command values of a U-phase, a V-phase, and a W-phase of a predetermined zero-phase-containing unbalanced three-phase voltage which is an unbalanced three-phase voltage containing a zero-phase component, and generates a U-phase voltage command, a V-phase voltage command, and a W-phase voltage command having phases, frequencies, and amplitudes respectively corresponding to the phase command values and the amplitude command values of the U-phase, the V-phase and the W-phase of the predetermined zero-phase-containing unbalanced three-phase voltage on the basis of the unbalanced three-phase voltage information; and a pulse modulation signal generation circuit that outputs a U-phase pulse modulation signal, a V-phase pulse modulation signal, and a W-phase pulse modulation signal corresponding to the U-phase voltage command, the V-phase voltage command, and the W-phase voltage command that are generated in the voltage command generation unit; and a main circuit including: a direct current (DC) power supply that outputs a predetermined DC voltage; a three-phase inverter device that includes a U-phase inverter unit, a V-phase inverter unit, and a W-phase inverter unit, and in which, in accordance with the U-phase pulse modulation signal, the V-phase pulse modulation signal, and the W-phase pulse modulation signal from the pulse modulation signal generation circuit and by using the predetermined DC voltage from the DC power supply, the U-phase inverter unit, the V-phase inverter unit, and the W-phase inverter unit generate a U-phase voltage, a V-phase voltage, and a W-phase voltage having phases, frequencies, and amplitudes respectively corresponding to the phase command values and the amplitude command values of the U-phase, the V-phase and the W-phase of the predetermined zero-phase-containing unbalanced three-phase voltage, to output an internal zero-phase-containing unbalanced three-phase voltage including the U-phase voltage, the V-phase voltage, and the W-phase voltage; and a three-phase transformation device that includes a U-phase winding part, a V-phase winding part, a W-phase winding part, and a secondary winding neutral point, and in which a secondary winding of the U-phase winding part, a secondary winding of the V-phase winding part, and a secondary winding of the W-phase winding part are connected in Y-connection and the secondary winding neutral point is a neutral point of the Y-connection, and the U-phase voltage, the V-phase voltage and the W-phase voltage of the internal zero-phase-containing unbalanced three-phase voltage from the three-phase inverter device are input to a primary winding of the U-phase winding part, a primary winding of the V-phase winding part, and a primary winding of the W-phase winding part, respectively, wherein the DC power supply, the three-phase inverter device, and the three-phase transformation device of the main circuit have respective forms and a mutual connection relationship that enable output of a zero-phase component of an external zero-phase-containing unbalanced three-phase voltage obtained by converting the internal zero-phase-containing unbalanced three-phase voltage according to a winding number ratio in the three-phase transformation device, and the external zero-phase-containing unbalanced three-phase voltage is output by the secondary winding of the U-phase winding part, the secondary winding of the V-phase winding part, and the secondary winding of the W-phase winding part connected in Y-connection, and the secondary winding neutral point, of the three-phase transformation device.

2. The unbalanced three-phase power supply device according to claim 1, wherein the main circuit includes a voltage sensor unit that detects voltages of the U-phase, the V-phase, and the W-phase of the internal zero-phase-containing unbalanced three-phase voltage or the external zero-phase-containing unbalanced three-phase voltage, the control circuit further includes a voltage feedback control unit, the voltage command generation unit includes:

a phase command value generation unit that adds the phase command values of the U-phase, the V-phase and the W-phase of the predetermined zero-phase-containing unbalanced three-phase voltage to respective phases of the U-phase, the V-phase and the W-phase of a reference internal three-phase sine wave, respectively, and outputs a U-phase phase command value, a V-phase phase command value, and a W-phase phase command value obtained by the addition;

a three-phase sine wave generation unit that collates the U-phase phase command value, the V-phase phase command value, and the W-phase phase command value generated by the phase command value generation unit and respective input timings of the U-phase phase command value, the V-phase phase command value, and the W-phase phase command value with a sin table, and thereby generate a U-phase sine wave, a V-phase sine wave, and a W-phase sine wave having phases, frequencies, and reference amplitudes corresponding to the U-phase phase command value, the V-phase phase command value, and the W-phase phase command value, respectively; and a voltage command amplitude determination unit that determines an amplitude of the U-phase sine wave, an amplitude of the V-phase sine wave, and an amplitude of the W-phase sine wave by multiplying an amplitude value of the U-phase sine wave, an amplitude value of the V-phase sine wave, and an amplitude value of the W-phase sine wave by the amplitude command values of the U-phase, the V-phase, and the W-phase of the predetermined zero-phase-containing unbalanced three-phase voltage, respectively, to generate the U-phase voltage command, the V-phase voltage command, and the W-phase voltage command, the voltage feedback control unit includes:

a voltage error generation unit that generates a U-phase voltage error, a V-phase voltage error, and a W-phase voltage error that are errors of voltages of the U-phase, the V-phase, and the W-phase of the internal zero-phase-containing unbalanced three-phase voltage or the external zero-phase-containing unbalanced three-phase voltage detected by the voltage sensor unit, the errors being generated with respect to the U-phase voltage command, the V-phase voltage command, and the W-phase voltage command generated by the voltage command amplitude determination unit; and a voltage compensation unit that generates a U-phase voltage manipulated variable, a V-phase voltage manipulated variable, and a W-phase voltage manipulated variable by respectively applying compensation to the U-phase voltage error, the V-phase voltage error, and the W-phase voltage error generated by the voltage error generation unit, and the pulse modulation signal generation circuit is constituted as a circuit that generates the U-phase pulse modulation signal, the V-phase pulse modulation signal, and the W-phase pulse modulation signal respectively corresponding to the U-phase voltage manipulated variable, the V-phase voltage manipulated variable, and the W-phase voltage manipulated variable generated by the voltage compensation unit.

3. The unbalanced three-phase power supply device according to claim 1, wherein the DC power supply includes a U-phase DC power supply unit, a V-phase DC power supply unit, and a W-phase DC power supply unit that respectively output the predetermined DC voltage, the three-phase inverter device is constituted as a three-phase inverter unit including: a U-phase inverter of single-phase that constitutes the U-phase inverter unit, and in accordance with the U-phase pulse modulation signal from the pulse modulation signal generation circuit and by using the predetermined DC voltage from the U-phase DC power supply unit, generates an internal U-phase voltage having a phase, a frequency and an amplitude corresponding to the phase command value and the amplitude command value of the U-phase of the predetermined zero-phase-containing unbalanced three-phase voltage; a V-phase inverter of single-phase that constitutes the V-phase inverter unit, and in accordance with the V-phase pulse modulation signal from the pulse modulation signal generation circuit and by using the predetermined DC voltage from the V-phase DC power supply unit, generates an internal V-phase voltage having a phase, a frequency and an amplitude corresponding to the phase command value and the amplitude command value of the V-phase of the predetermined zero-phase-containing unbalanced three-phase voltage; and a W-phase inverter of single-phase that constitutes the W-phase inverter unit, and in accordance with the W-phase pulse modulation signal from the pulse modulation signal generation circuit and by using the predetermined DC voltage from the W-phase DC power supply unit, generates an internal W-phase voltage having a phase, a frequency and an amplitude corresponding to the phase command value and the amplitude command value of the W-phase of the predetermined zero-phase-containing unbalanced three-phase voltage, and in which the U-phase inverter, the V-phase inverter, and the W-phase inverter output the internal zero-phase-containing unbalanced three-phase voltage including the internal U-phase voltage, the internal V-phase voltage, and the internal W-phase voltage as the U-phase voltage, the V-phase voltage, and the W-phase voltage, respectively, the three-phase transformation device is constituted as a three-phase transformer unit including a U-phase transformer of single-phase constituting the U-phase winding part, a V-phase transformer of single-phase constituting the V-phase winding part, and a W-phase transformer of single-phase constituting the W-phase winding part, and in which a secondary winding of the U-phase transformer, a secondary winding of the V-phase transformer, and a secondary winding of the W-phase transformer are connected in Y-connection and a neutral point of the Y-connection is the secondary winding neutral point, the internal U-phase voltage, the internal V-phase voltage, and the internal W-phase voltage from the three-phase inverter unit are input to a primary winding of the U-phase transformer, a primary winding of the V-phase transformer, and a primary winding of the W-phase transformer, respectively, and the external zero-phase-containing unbalanced three-phase voltage obtained by converting the internal zero-phase-containing unbalanced three-phase voltage according to a winding number ratio is output by the secondary winding of the U-phase transformer, the secondary winding of the V-phase transformer, and the secondary winding of the W-phase transformer, which are connected in Y-connection, and the secondary winding neutral point of the secondary windings, of the three-phase transformer unit.

4. The unbalanced three-phase power supply device according to claim 1, wherein the DC power supply includes a U-phase DC power supply unit, a V-phase DC power supply unit, and a W-phase DC power supply unit that respectively output the predetermined DC voltage, the three-phase inverter device is constituted as a three-phase inverter unit including: a U-phase inverter of single-phase that constitutes the U-phase inverter unit, and in accordance with the U-phase pulse modulation signal from the pulse modulation signal generation circuit and by using the predetermined DC voltage from the U-phase DC power supply unit, generates an internal U-phase voltage having a phase, a frequency and an amplitude corresponding to the phase command value and the amplitude command value of the U-phase of the predetermined zero-phase-containing unbalanced three-phase voltage; a V-phase inverter of single-phase that constitutes the V-phase inverter unit, and in accordance with the V-phase pulse modulation signal from the pulse modulation signal generation circuit and by using the predetermined DC voltage from the V-phase DC power supply unit, generates an internal V-phase voltage having a phase, a frequency and an amplitude corresponding to the phase command value and the amplitude command value of the V-phase of the predetermined zero-phase-containing unbalanced three-phase voltage; and a W-phase inverter of single-phase that constitutes the W-phase inverter unit, and in accordance with the W-phase pulse modulation signal from the pulse modulation signal generation circuit and by using the predetermined DC voltage from the W-phase DC power supply unit, generates an internal W-phase voltage having a phase, a frequency and an amplitude corresponding to the phase command value and the amplitude command value of the W-phase of the predetermined zero-phase-containing unbalanced three-phase voltage, and in which the U-phase inverter, the V-phase inverter, and the W-phase inverter output the internal zero-phase-containing unbalanced three-phase voltage including the internal U-phase voltage, the internal V-phase voltage, and the internal W-phase voltage as the U-phase voltage, the V-phase voltage, and the W-phase voltage, respectively, the three-phase transformation device is constituted as a three-phase five-legged iron core transformer including a three-phase five-legged iron core having a U-phase leg, a V-phase leg, a W-phase leg, and a pair of magnetic leakage legs, the U-phase winding part provided on the U-phase leg, the V-phase winding part provided on the V-phase leg, and the W-phase winding part provided on the W-phase leg, and in which a secondary winding of the U-phase winding part, a secondary winding of the V-phase winding part, and a secondary winding of the W-phase winding part are connected in Y-connection and a neutral point of the Y-connection is the secondary winding neutral point, the internal U-phase voltage, the internal V-phase voltage, and the internal W-phase voltage from the three-phase inverter unit are input to a primary winding of the U-phase winding part, a primary winding of the V-phase winding part, and a primary winding of the W-phase winding part of the three-phase five-legged iron core transformer, respectively, and the external zero-phase-containing unbalanced three-phase voltage obtained by converting the internal zero-phase-containing unbalanced three-phase voltage according to a winding number ratio is output by the secondary winding of the U-phase winding part, the secondary winding of the V-phase winding part, and the secondary winding of the W-phase winding part, which are connected in Y-connection, and the secondary winding neutral point of the secondary windings, of the three-phase five-legged iron core transformer.

5. The unbalanced three-phase power supply device according to claim 1, wherein the DC power supply includes a positive DC power supply unit and a negative DC power supply unit that are connected to each other in series at a power supply neutral point and each output a predetermined DC voltage, the three-phase inverter device is constituted as a three-phase four-wired inverter including: the U-phase inverter unit that generates, in accordance with the U-phase pulse modulation signal from the pulse modulation signal generation circuit and by using the predetermined DC voltage from the positive DC power supply unit and the negative DC power supply unit, an internal U-phase voltage having a phase, a frequency and an amplitude corresponding to the phase command value and the amplitude command value of the U-phase of the predetermined zero-phase-containing unbalanced three-phase voltage; the V-phase inverter unit that generates, in accordance with the V-phase pulse modulation signal from the pulse modulation signal generation circuit and by using the predetermined DC voltage from the positive DC power supply unit and the negative DC power supply unit, an internal V-phase voltage having a phase, a frequency and an amplitude corresponding to the phase command value and the amplitude command value of the V-phase of the predetermined zero-phase-containing unbalanced three-phase voltage; and the W-phase inverter unit that generates, in accordance with the W-phase pulse modulation signal from the pulse modulation signal generation circuit and by using the predetermined DC voltage from the positive DC power supply unit and the negative DC power supply unit, an internal W-phase voltage having a phase, a frequency and an amplitude corresponding to the phase command value and the amplitude command value of the W-phase of the predetermined zero-phase-containing unbalanced three-phase voltage, and in which the U-phase inverter unit, the V-phase inverter unit, and the W-phase inverter unit are connected between a positive electrode of the positive DC power supply unit and a negative electrode of the negative DC power supply unit, and output the internal zero-phase-containing unbalanced three-phase voltage including the internal U-phase voltage, the internal V-phase voltage, and the internal W-phase voltage as the U-phase voltage, the V-phase voltage, and the W-phase voltage, respectively, the three-phase transformation device is constituted as a three-phase transformer unit including a U-phase transformer of single-phase constituting the U-phase winding part, a V-phase transformer of single-phase constituting the V-phase winding part, and a W-phase transformer of single-phase constituting the W-phase winding part, and in which one end of a primary winding of the U-phase transformer, one end of a primary winding of the V-phase transformer, and one end of a primary winding of the W-phase transformer are connected in Y connection at a primary winding neutral point, and a secondary winding of the U-phase transformer, a secondary winding of the V-phase transformer, and a secondary winding of the W-phase transformer are connected in Y-connection at the secondary winding neutral point, and the primary winding neutral point is connected to the power supply neutral point of the DC power supply, the internal U-phase voltage, the internal V-phase voltage, and the internal W-phase voltage from the three-phase four-wired inverter are input to another end of the primary winding of the U-phase transformer, another end of the primary winding of the V-phase transformer, and another end of the primary winding of the W-phase transformer, respectively, and the external zero-phase-containing unbalanced three-phase voltage obtained by converting the internal zero-phase-containing unbalanced three-phase voltage according to a winding number ratio is output by the secondary winding of the U-phase transformer, the secondary winding of the V-phase transformer, and the secondary winding of the W-phase transformer, which are connected in Y-connection, and the secondary winding neutral point of the secondary windings, of the three-phase transformer unit.

6. The unbalanced three-phase power supply device according to claim 1, wherein the DC power supply includes a positive DC power supply unit and a negative DC power supply unit that are connected to each other in series at a power supply neutral point and each output a predetermined DC voltage, the three-phase inverter device is constituted as a three-phase four-wired inverter including: the U-phase inverter unit that generates, in accordance with the U-phase pulse modulation signal from the pulse modulation signal generation circuit and by using the predetermined DC voltage from the positive DC power supply unit and the negative DC power supply unit, an internal U-phase voltage having a phase, a frequency and an amplitude corresponding to the phase command value and the amplitude command value of the U-phase of the predetermined zero-phase-containing unbalanced three-phase voltage; the V-phase inverter unit that generates, in accordance with the V-phase pulse modulation signal from the pulse modulation signal generation circuit and by using the predetermined DC voltage from the positive DC power supply unit and the negative DC power supply unit, an internal V-phase voltage having a phase, a frequency and an amplitude corresponding to the phase command value and the amplitude command value of the V-phase of the predetermined zero-phase-containing unbalanced three-phase voltage; and the W-phase inverter unit that generates, in accordance with the W-phase pulse modulation signal from the pulse modulation signal generation circuit and by using the predetermined DC voltage from the positive DC power supply unit and the negative DC power supply unit, an internal W-phase voltage having a phase, a frequency and an amplitude corresponding to the phase command value and the amplitude command value of the W-phase of the predetermined zero-phase-containing unbalanced three-phase voltage, and in which the U-phase inverter unit, the V-phase inverter unit, and the W-phase inverter unit are connected between a positive electrode of the positive DC power supply unit and a negative electrode of the negative DC power supply unit, and output the internal zero-phase-containing unbalanced three-phase voltage including the internal U-phase voltage, the internal V-phase voltage, and the internal W-phase voltage as the U-phase voltage, the V-phase voltage, and the W-phase voltage, respectively, the three-phase transformation device is constituted as a three-phase five-legged iron core transformer including a three-phase five-legged iron core having a U-phase leg, a V-phase leg, a W-phase leg, and a pair of magnetic leakage legs, the U-phase winding part provided on the U-phase leg, the V-phase winding part provided on the V-phase leg, and the W-phase winding part provided on the W-phase leg, and in which one end of a primary winding of the U-phase winding part, one end of a primary winding of the V-phase winding part, and one end of a primary winding of the W-phase winding part are connected in Y connection at a primary winding neutral point, a secondary winding of the U-phase winding part, a secondary winding of the V-phase winding part, and a secondary winding of the W-phase winding part are connected in Y-connection at the secondary winding neutral point, and the primary winding neutral point is connected to the power supply neutral point of the DC power supply, the internal U-phase voltage, the internal V-phase voltage, and the internal W-phase voltage from the three-phase four-wired inverter are input to another end of the primary winding of the U-phase winding part, another end of the primary winding of the V-phase winding part, and another end of the primary winding of the W-phase winding part of the three-phase five-legged iron core transformer, respectively, and the external zero-phase-containing unbalanced three-phase voltage obtained by converting the internal zero-phase-containing unbalanced three-phase voltage according to a winding number ratio is output by the secondary winding of the U-phase winding part, the secondary winding of the V-phase winding part, and the secondary winding of the W-phase winding part, which are connected in Y-connection, and the secondary winding neutral point of the secondary windings, of the three-phase five-legged iron core transformer.

7. A power supply for evaluation, comprising the unbalanced three-phase power supply device according to claim 1, wherein the DC power supply is a converter that converts a three-phase voltage of a power system into a DC voltage, and the three-phase transformation device has a secondary side configured as an output terminal to which an evaluation target device is connected.

8. An unbalanced three-phase power supply device comprising:

a control circuit including: a current command generation unit that receives unbalanced three-phase current information including phase command values and amplitude command values of a U-phase, a V-phase, and a W-phase of a predetermined zero-phase-containing unbalanced three-phase current which is an unbalanced three-phase current containing a zero-phase component, and generates a U-phase current command, a V-phase current command, and a W-phase current command having phases, frequencies, and active component and reactive component amplitudes respectively corresponding to the phase command values and the amplitude command values of the U-phase, the V-phase and the W-phase of the predetermined zero-phase-containing unbalanced three-phase current on the basis of the unbalanced three-phase current information; and a pulse modulation signal generation circuit that outputs a U-phase pulse modulation signal, a V-phase pulse modulation signal, and a W-phase pulse modulation signal corresponding to the U-phase current command, the V-phase current command, and the W-phase current command that are generated in the current command generation unit; and a main circuit including: a direct current (DC) power supply that outputs a predetermined DC voltage or DC current; a three-phase inverter device that includes a U-phase inverter unit, a V-phase inverter unit, and a W-phase inverter unit, and in which, in accordance with the U-phase pulse modulation signal, the V-phase pulse modulation signal, and the W-phase pulse modulation signal from the pulse modulation signal generation circuit and by using the predetermined DC voltage or DC current from the DC power supply, the U-phase inverter unit, the V-phase inverter unit, and the W-phase inverter unit generate a U-phase current, a V-phase current, and a W-phase current having phases, frequencies, and amplitudes respectively corresponding to the phase command values and the active component and reactive component amplitude command values of the U-phase, the V-phase and the W-phase of the predetermined zero-phase-containing unbalanced three-phase current, to output an internal zero-phase-containing unbalanced three-phase current including the U-phase current, the V-phase current, and the W-phase current; and a three-phase transformation device that includes a U-phase winding part, a V-phase winding part, a W-phase winding part, and a secondary winding neutral point, and in which a secondary winding of the U-phase winding part, a secondary winding of the V-phase winding part, and a secondary winding of the W-phase winding part are connected in Y-connection, the secondary winding neutral point is a neutral point of the Y-connection, and the U-phase current, the V-phase current and the W-phase current of the internal zero-phase-containing unbalanced three-phase current from the three-phase inverter device are input to a primary winding of the U-phase winding part, a primary winding of the V-phase winding part, and a primary winding of the W-phase winding part, respectively, wherein the DC power supply, the three-phase inverter device, and the three-phase transformation device of the main circuit have respective forms and a mutual connection relationship that enable output of a zero-phase component of an external zero-phase-containing unbalanced three-phase current obtained by converting the internal zero-phase-containing unbalanced three-phase current according to a winding number ratio in the three-phase transformation device, and the external zero-phase-containing unbalanced three-phase current is output by the secondary winding of the U-phase winding part, the secondary winding of the V-phase winding part, and the secondary winding of the W-phase winding part connected in Y-connection, and the secondary winding neutral point, of the three-phase transformation device.

9. The unbalanced three-phase power supply device according to claim 8, wherein the main circuit includes a current sensor unit that detects currents of the U-phase, the V-phase, and the W-phase of the internal zero-phase-containing unbalanced three-phase current or the external zero-phase-containing unbalanced three-phase current, the control circuit further includes a current feedback control unit, the current command generation unit includes:

a phase command value generation unit that adds the phase command values of the U-phase, the V-phase and the W-phase of the predetermined zero-phase-containing unbalanced three-phase current to respective phases of the U-phase, the V-phase and the W-phase of a reference internal three-phase sine wave, respectively, and outputs a U-phase phase command value, a V-phase phase command value, and a W-phase phase command value obtained by the addition;

a three-phase sine wave generation unit that collates the U-phase phase command value, the V-phase phase command value, and the W-phase phase command value generated by the phase command value generation unit and respective input timings of the U-phase phase command value, the V-phase phase command value, and the W-phase phase command value with a sin table, and thereby generates a U-phase sine wave, a V-phase sine wave, and a W-phase sine wave having frequencies and reference amplitudes corresponding to the U-phase phase command value, the V-phase phase command value, and the W-phase phase command value, respectively;

a three-phase cosine wave generation unit that collates the U-phase phase command value, the V-phase phase command value, and the W-phase phase command value generated by the phase command value generation and respective input timings of the U-phase phase command value, the V-phase phase command value, and the W-phase phase command value unit with a cos table, and thereby generates a U-phase cosine wave, a V-phase cosine wave, and a W-phase cosine wave having phases, frequencies and reference amplitudes corresponding to the U-phase phase command value, the V-phase phase command value, and the W-phase phase command value, respectively;

a sine wave amplitude determination unit that determines an amplitude of the U-phase sine wave, an amplitude of the V-phase sine wave, and an amplitude of the W-phase sine wave by multiplying an amplitude value of the U-phase sine wave, an amplitude value of the V-phase sine wave, and an amplitude value of the W-phase sine wave generated by the three-phase sine wave generation unit by active component amplitude command values of the U-phase, the V-phase, and the W-phase of the predetermined zero-phase-containing unbalanced three-phase current, respectively, to generate the U-phase sine wave command, the V-phase sine wave command, and the W-phase sine wave command;

a cosine wave amplitude determination unit that determines an amplitude of the U-phase cosine wave, an amplitude of the V-phase cosine wave, and an amplitude of the W-phase cosine wave by multiplying an amplitude value of the U-phase cosine wave, an amplitude value of the V-phase cosine wave, and an amplitude value of the W-phase cosine wave generated by the three-phase cosine wave generation unit by reactive component amplitude command values of the U-phase, the V-phase, and the W-phase of the predetermined zero-phase-containing unbalanced three-phase current, respectively, to generate the U-phase cosine wave command, the V-phase cosine wave command, and the W-phase cosine wave command; and a current command amplitude determination unit that generates the U-phase current command, the V-phase current command, and the W-phase current command by adding the U-phase cosine wave command, the V-phase cosine wave command, and the W-phase cosine wave command generated by the cosine wave amplitude determination unit to the U-phase sine wave command, the V-phase sine wave command, and the W-phase sine wave command generated by the sine wave amplitude determination unit, respectively, the current feedback control unit includes:

a current error generation unit that generates a U-phase current error, a V-phase current error, and a W-phase current error that are errors of currents of the U-phase, the V-phase, and the W-phase of the internal zero-phase-containing unbalanced three-phase current or the external zero-phase-containing unbalanced three-phase current detected by the current sensor unit, the error being generated with respect to the U-phase current command, the V-phase current command, and the W-phase current command generated by the current command amplitude determination unit; and a current compensation unit that generates a U-phase current manipulated variable, a V-phase current manipulated variable, and a W-phase current manipulated variable by respectively applying compensation to the U-phase current error, the V-phase current error, and the W-phase current error generated by the current error generation unit, and the pulse modulation signal generation circuit is constituted as a circuit that generates the U-phase pulse modulation signal, the V-phase pulse modulation signal, and the W-phase pulse modulation signal respectively corresponding to the U-phase current manipulated variable, the V-phase current manipulated variable, and the W-phase current manipulated variable generated by the current compensation unit.

10. The unbalanced three-phase power supply device according to claim 8, wherein the DC power supply includes a U-phase DC power supply unit, a V-phase DC power supply unit, and a W-phase DC power supply unit that respectively output the predetermined DC voltage or DC current, the three-phase inverter device is constituted as a three-phase inverter unit including: a U-phase inverter of single-phase that constitutes the U-phase inverter unit, and in accordance with the U-phase pulse modulation signal from the pulse modulation signal generation circuit and by using the predetermined DC voltage or DC current from the U-phase DC power supply unit, generates an internal U-phase current having a phase, a frequency and an amplitude corresponding to the phase command value and the amplitude command value of the U-phase of the predetermined zero-phase-containing unbalanced three-phase current; a V-phase inverter of single-phase that constitutes the V-phase inverter unit, and in accordance with the V-phase pulse modulation signal from the pulse modulation signal generation circuit and by using the predetermined DC voltage or DC current from the V-phase DC power supply unit, generates an internal V-phase current having a phase, a frequency and an amplitude corresponding to the phase command value and the amplitude command value of the V-phase of the predetermined zero-phase-containing unbalanced three-phase current; and a W-phase inverter of single-phase that constitutes the W-phase inverter unit, and in accordance with the W-phase pulse modulation signal from the pulse modulation signal generation circuit and by using the predetermined DC voltage or DC current from the W-phase DC power supply unit, generates an internal W-phase current having a phase, a frequency and an amplitude corresponding to the phase command value and the amplitude command value of the W-phase of the predetermined zero-phase-containing unbalanced three-phase current, and in which the U-phase inverter, the V-phase inverter, and the W-phase inverter output the internal zero-phase-containing unbalanced three-phase current including the internal U-phase current, the internal V-phase current, and the internal W-phase current as the U-phase current, the V-phase current, and the W-phase current, respectively, the three-phase transformation device is constituted as a three-phase transformer unit including a U-phase transformer of single-phase constituting the U-phase winding part, a V-phase transformer of single-phase constituting the V-phase winding part, and a W-phase transformer of single-phase constituting the W-phase winding part, and in which a secondary winding of the U-phase transformer, a secondary winding of the V-phase transformer, and a secondary winding of the W-phase transformer are connected in Y-connection and a neutral point of the Y-connection is the secondary winding neutral point, the internal U-phase current, the internal V-phase current, and the internal W-phase current from the three-phase inverter unit are input to a primary winding of the U-phase transformer, a primary winding of the V-phase transformer, and a primary winding of the W-phase transformer, respectively, and the external zero-phase-containing unbalanced three-phase current obtained by converting the internal zero-phase-containing unbalanced three-phase current according to a winding number ratio is output by the secondary winding of the U-phase transformer, the secondary winding of the V-phase transformer, and the secondary winding of the W-phase transformer, which are connected in Y-connection, and the secondary winding neutral point of the secondary windings, of the three-phase transformer unit.

11. The unbalanced three-phase power supply device according to claim 8, wherein the DC power supply includes a U-phase DC power supply unit, a V-phase DC power supply unit, and a W-phase DC power supply unit that respectively output the predetermined DC voltage or DC current, the three-phase inverter device is constituted as a three-phase inverter unit including: a U-phase inverter of single-phase that constitutes the U-phase inverter unit, and in accordance with the U-phase pulse modulation signal from the pulse modulation signal generation circuit and by using the predetermined DC voltage or DC current from the DC power supply, generates an internal U-phase current having a phase, a frequency and an amplitude corresponding to the phase command value and the amplitude command value of the U-phase of the predetermined zero-phase-containing unbalanced three-phase current; a V-phase inverter of single-phase that constitutes the V-phase inverter unit, and in accordance with the V-phase pulse modulation signal from the pulse modulation signal generation circuit and by using the predetermined DC voltage or DC current from the DC power supply, generates an internal V-phase current having a phase, a frequency and an amplitude corresponding to the phase command value and the amplitude command value of the V-phase of the predetermined zero-phase-containing unbalanced three-phase current; and a W-phase inverter of single-phase that constitutes the W-phase inverter unit, and in accordance with the W-phase pulse modulation signal from the pulse modulation signal generation circuit and by using the predetermined DC voltage or DC current from the DC power supply, generates an internal W-phase current having a phase, a frequency and an amplitude corresponding to the phase command value and the amplitude command value of the W-phase of the predetermined zero-phase-containing unbalanced three-phase current, and in which the U-phase inverter, the V-phase inverter, and the W-phase inverter output the internal zero-phase-containing unbalanced three-phase current including the internal U-phase current, the internal V-phase current, and the internal W-phase current as the U-phase current, the V-phase current, and the W-phase current, respectively, the three-phase transformation device is constituted as a three-phase five-legged iron core transformer including a three-phase five-legged iron core having a U-phase leg, a V-phase leg, a W-phase leg, and a pair of magnetic leakage legs, the U-phase winding part provided on the U-phase leg, the V-phase winding part provided on the V-phase leg, and the W-phase winding part provided on the W-phase leg, and in which a secondary winding of the U-phase winding part, a secondary winding of the V-phase winding part, and a secondary winding of the W-phase winding part are connected in Y-connection and a neutral point of the Y-connection is the secondary winding neutral point, the internal U-phase current, the internal V-phase current, and the internal W-phase current from the three-phase inverter unit are input to a primary winding of the U-phase winding part, a primary winding of the V-phase winding part, and a primary winding of the W-phase winding part of the three-phase five-legged iron core transformer, respectively, and the external zero-phase-containing unbalanced three-phase current obtained by converting the internal zero-phase-containing unbalanced three-phase current according to a winding number ratio is output by the secondary winding of the U-phase winding part, the secondary winding of the V-phase winding part, and the secondary winding of the W-phase winding part, which are connected in Y-connection, and the secondary winding neutral point of the secondary windings, of the three-phase five-legged iron core transformer.

12. The unbalanced three-phase power supply device according to claim 8, wherein the DC power supply includes a positive DC power supply unit and a negative DC power supply unit that are connected to each other in series at a power supply neutral point and each output a predetermined DC voltage or DC current, the three-phase inverter device is constituted as a three-phase four-wired inverter including: the U-phase inverter unit that generates, in accordance with the U-phase pulse modulation signal from the pulse modulation signal generation circuit and by using the predetermined DC voltage or DC current from the positive DC power supply unit and the negative DC power supply unit, an internal U-phase current having a phase, a frequency and an amplitude corresponding to the phase command value and the amplitude command value of the U-phase of the predetermined zero-phase-containing unbalanced three-phase current; the V-phase inverter unit that generates, in accordance with the V-phase pulse modulation signal from the pulse modulation signal generation circuit and by using the predetermined DC voltage or DC current from the positive DC power supply unit and the negative DC power supply unit, an internal V-phase current having a phase, a frequency and an amplitude corresponding to the phase command value and the amplitude command value of the V-phase of the predetermined zero-phase-containing unbalanced three-phase current; and the W-phase inverter unit that generates, in accordance with the W-phase pulse modulation signal from the pulse modulation signal generation circuit and by using the predetermined DC voltage or DC current from the positive DC power supply unit and the negative DC power supply unit, an internal W-phase current having a phase, a frequency and an amplitude corresponding to the phase command value and the amplitude command value of the W-phase of the predetermined zero-phase-containing unbalanced three-phase current, and in which the U-phase inverter unit, the V-phase inverter unit, and the W-phase inverter unit are connected between a positive electrode of the positive DC power supply unit and a negative electrode of the negative DC power supply unit, and output the internal zero-phase-containing unbalanced three-phase current including the internal U-phase current, the internal V-phase current, and the internal W-phase current as the U-phase current, the V-phase current, and the W-phase current, respectively, the three-phase transformation device is constituted as a three-phase transformer unit including a U-phase transformer of single-phase constituting the U-phase winding part, a V-phase transformer of single-phase constituting the V-phase winding part, and a W-phase transformer of single-phase constituting the W-phase winding part, and in which one end of a primary winding of the U-phase transformer, one end of a primary winding of the V-phase transformer, and one end of a primary winding of the W-phase transformer are connected in Y connection at a primary winding neutral point, and a secondary winding of the U-phase transformer, a secondary winding of the V-phase transformer, and a secondary winding of the W-phase transformer are connected in Y-connection at the secondary winding neutral point, and the primary winding neutral point is connected to the power supply neutral point of the DC power supply, the internal U-phase current, the internal V-phase current, and the internal W-phase current from the three-phase four-wired inverter are input to the primary winding of the U-phase transformer, the primary winding of the V-phase transformer, and the primary winding of the W-phase transformer, respectively, and the external zero-phase-containing unbalanced three-phase current obtained by converting the internal zero-phase-containing unbalanced three-phase current according to a winding number ratio is output by the secondary winding of the U-phase transformer, the secondary winding of the V-phase transformer, and the secondary winding of the W-phase transformer, which are connected in Y-connection, and the secondary winding neutral point of the secondary windings, of the three-phase transformer unit.

13. The unbalanced three-phase power supply device according to claim 8, wherein the DC power supply includes a positive DC power supply unit and a negative DC power supply unit that are connected to each other in series at a power supply neutral point and each output a predetermined DC voltage or DC current, the three-phase inverter device is constituted as a three-phase four-wired inverter including: the U-phase inverter unit that generates, in accordance with the U-phase pulse modulation signal from the pulse modulation signal generation circuit and by using the predetermined DC voltage or DC current from the positive DC power supply unit and the negative DC power supply unit, an internal U-phase current having a phase, a frequency and an amplitude corresponding to the phase command value and the amplitude command value of the U-phase of the predetermined zero-phase-containing unbalanced three-phase current; the V-phase inverter unit that generates, in accordance with the V-phase pulse modulation signal from the pulse modulation signal generation circuit and by using the predetermined DC voltage or DC current from the positive DC power supply unit and the negative DC power supply unit, an internal V-phase current having a phase, a frequency and an amplitude corresponding to the phase command value and the amplitude command value of the V-phase of the predetermined zero-phase-containing unbalanced three-phase current; and the W-phase inverter unit that generates, in accordance with the W-phase pulse modulation signal from the pulse modulation signal generation circuit and by using the predetermined DC voltage or DC current from the positive DC power supply unit and the negative DC power supply unit, an internal W-phase current having a phase, a frequency and an amplitude corresponding to the phase command value and the amplitude command value of the W-phase of the predetermined zero-phase-containing unbalanced three-phase current, and in which the U-phase inverter unit, the V-phase inverter unit, and the W-phase inverter unit are connected between a positive electrode of the positive DC power supply unit and a negative electrode of the negative DC power supply unit, and output the internal zero-phase-containing unbalanced three-phase current including the internal U-phase current, the internal V-phase current, and the internal W-phase current as the U-phase current, the V-phase current, and the W-phase current, respectively, the three-phase transformation device is constituted as a three-phase five-legged iron core transformer including a three-phase five-legged iron core having a U-phase leg, a V-phase leg, a W-phase leg, and a pair of magnetic leakage legs, the U-phase winding part provided on the U-phase leg, the V-phase winding part provided on the V-phase leg, and the W-phase winding part provided on the W-phase leg, and in which one end of a primary winding of the U-phase winding part, one end of a primary winding of the V-phase winding part, and one end of a primary winding of the W-phase winding part are connected in Y connection at a primary winding neutral point, a secondary winding of the U-phase winding part, a secondary winding of the V-phase winding part, and a secondary winding of the W-phase winding part are connected in Y-connection at the secondary winding neutral point, and the primary winding neutral point is connected to the power supply neutral point of the DC power supply, the internal U-phase current, the internal V-phase current, and the internal W-phase current from the three-phase four-wired inverter are input to the primary winding of the U-phase winding part, the primary winding of the V-phase winding part, and the primary winding of the W-phase winding part of the three-phase five-legged iron core transformer, respectively, and the external zero-phase-containing unbalanced three-phase current obtained by converting the internal zero-phase-containing unbalanced three-phase current according to a winding number ratio is output by the secondary winding of the U-phase winding part, the secondary winding of the V-phase winding part, and the secondary winding of the W-phase winding part, which are connected in Y-connection, and the secondary winding neutral point of the secondary windings, of the three-phase five-legged iron core transformer.

14. A power supply for evaluation, comprising the unbalanced three-phase power supply device according to claim 8, wherein the DC power supply is a converter that converts a three-phase voltage or three-phase current of a power system into a DC voltage or DC current, and the three-phase transformation device has a secondary side configured as an output terminal to which an evaluation target device is connected.

* * * * *